United States Patent [19]

Yeung

[11] Patent Number: 5,588,033

[45] Date of Patent: Dec. 24, 1996

[54] METHOD AND APPARATUS FOR THREE DIMENSIONAL IMAGE RECONSTRUCTION FROM MULTIPLE STEREOTACTIC OR ISOCENTRIC BACKPROJECTIONS

[75] Inventor: Kah T. D. Yeung, Cordova, Tenn.

[73] Assignee: St. Jude Children's Research Hospital, Memphis, Tenn.

[21] Appl. No.: 466,829

[22] Filed: Jun. 6, 1995

[51] Int. Cl.$^6$ .................................................. G01N 23/083
[52] U.S. Cl. .................. 378/4; 364/413.14; 364/413.15; 364/413.10; 364/413.21; 378/901
[58] Field of Search ......................... 364/413.14, 413.15, 364/413.16, 413.21; 250/363.02, 363.04, 363.09; 378/4, 10, 901

[56] References Cited

U.S. PATENT DOCUMENTS

| | | | |
|---|---|---|---|
| Re. 30,947 | 5/1982 | Boyd | 364/413.16 |
| 4,329,588 | 5/1982 | Barrett et al. | 378/4 |
| 4,341,220 | 7/1982 | Perry | 128/630 |
| 4,439,866 | 3/1984 | Kato et al. | 378/19 |
| 4,608,977 | 9/1986 | Brown | 128/303 B |
| 4,618,978 | 10/1986 | Cosman | 378/164 |
| 5,230,623 | 7/1993 | Guthrie et al. | 433/72 |
| 5,333,165 | 7/1994 | Sun | 378/10 |
| 5,442,672 | 8/1995 | Bjorkholm et al. | 378/4 |

OTHER PUBLICATIONS

Yeung et al., "Systematic Analysis of Errors in Target Localization and Treatment Delivery in Stereotactic Radiosurgery (SRS)", *Int. J. Radiation Oncology Biol., Phys.*, vol. 28, pp. 493–498, 1993.

Bova et al., "Stereotaxic Angiography: An Inadequate Database for Radiosurgery?", *Int. J. Radiation Oncology Biol., Phys.*, vol. 20, pp. 891–895, 1991.

Schad et al., "Correction of Spatial Distortion in Magnetic Resonance Angiography for Radiosurgical Treatment of Cerebral Arteriovenous Malformations", *Magnetic Resonance Imaging*, vol. 10, pp. 609–621, 1992.

Blatt et al., "Modifications Based on Computed Tomographic Imaging in Planning the Radiosurgical Treatment of Arteriovenous Malformations", *Neurosurgery*, vol. 33, No. 4, Oct. 1993.

Radionics brochure, "BRW Stereotactic System", 1988.

Radionics, Inc., Neurosurgical Instruments brochure, "Type SGV–AL Angiographic and X–Ray Localizer System", 1990.

"Instruction Manual and Service Manual for the Model BRW Brown–Roberts–Wells Stereotactic System", Radionics, Inc., Doc. No. BRW–MAN Rev. A, Dec. 1990.

R. Siddon et al., "Sereotaxic Localization of Intracranial Targets", *Int. J. Radiation Oncology Biol., Phys.*, vol. 13, pp. 1241–1246, 1987.

(List continued on next page.)

*Primary Examiner*—David P. Porta
*Assistant Examiner*—David Vernon Bruce
*Attorney, Agent, or Firm*—Sterne, Kessler, Goldstein & Fox, P.L.L.C.

[57] ABSTRACT

A method and apparatus for reconstructing a three dimensional image of an object from a plurality of two dimensional radiographic images includes the steps of performing radiography of the object from a point source to produce a two dimensional image on a film, backprojecting the two dimensional image through a reconstruction volume to the point source to produce a backprojected image, repeating these steps for a plurality of viewing angles and determining the intersection of the backprojected images and the reconstruction volume. This intersection defines a three dimensional, reconstructed image of the object for each view. Upon superimposition of these three dimensional reconstructed images, the voxels that all the images have in common define a final reconstructed image of the object. Additionally, the present invention includes a stereotactic localizer frame that has eight sides for providing at least four views of the object. The eight faces allow radiography of the object to be performed at almost any viewing angle. This method can be used in clinical applications for the reconstruction of three dimensional structures within the patient's body through multiple two dimensional radiographic views of the patient.

16 Claims, 15 Drawing Sheets

OTHER PUBLICATIONS

W. Lutz et al., "A System for Stereotactic Radiosurgery With a Linear Accelerator", *Int. J. Radiation Oncology Biol., Phys.*, vol. 14, pp. 373–381, 1988.

W. Saunders, "Radiosurgery for Arteriovenous Malformations of the Brain Using a Standard Linear Accelerator: Rational and Technique", *Int. J. Radiation Oncology Biol., Phys.*, vol. 15, pp. 441–447, 1988.

R. Siddon, "Fast Calculation of the Exact Radiological Path For A Three–Dimensional CT Array", *Med. Phys.*, 12(2), Mar./Apr. 1985, pp. 252–255.

D. Vandermeulen et al., "A New Software Package for the Microcomputer Based BRW Stereotactic System: Integrated Stereoscopic Views of CT Data and Angiograms", SPIE, vol. 593, *Medical Image Processing,* 1985, pp. 103–114.

M. Bergstrom et al., "A Method of Stereotaxic Localization Adopted for Conventional and Digital Radiography", Neuroradiology, 1986, 28:100–104.

R. Siddon, "Solution to Treatment Planning Problems Using Coordinate Transformations", Med. Phys 8(6) Nov./Dec. 1981, pp. 766–774.

A. Rosenfield et al., *Digital Picture Processing,* 2 Ed. vol. 1, Chapter 8, Academic Press Inc., 1982, pp. 353–430.

S. Harrington, *Computer Graphics: A Programming Approach,* Chapter 3, McGraw–Hill International Book Company, 1983, pp. 59–81.

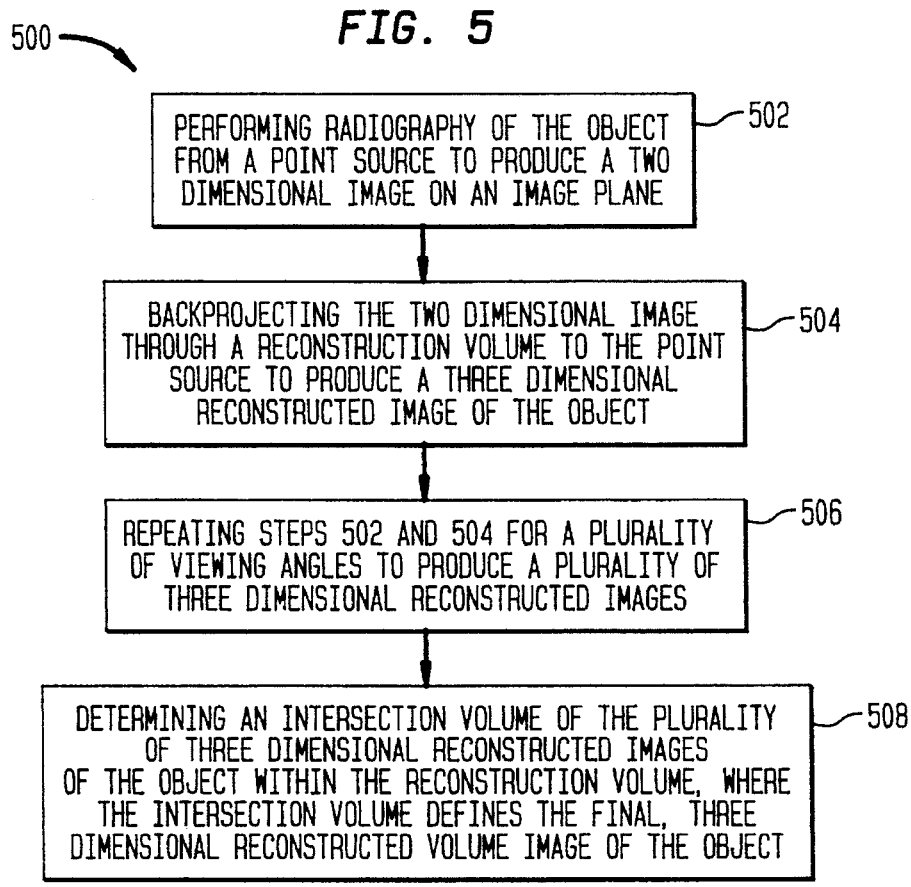
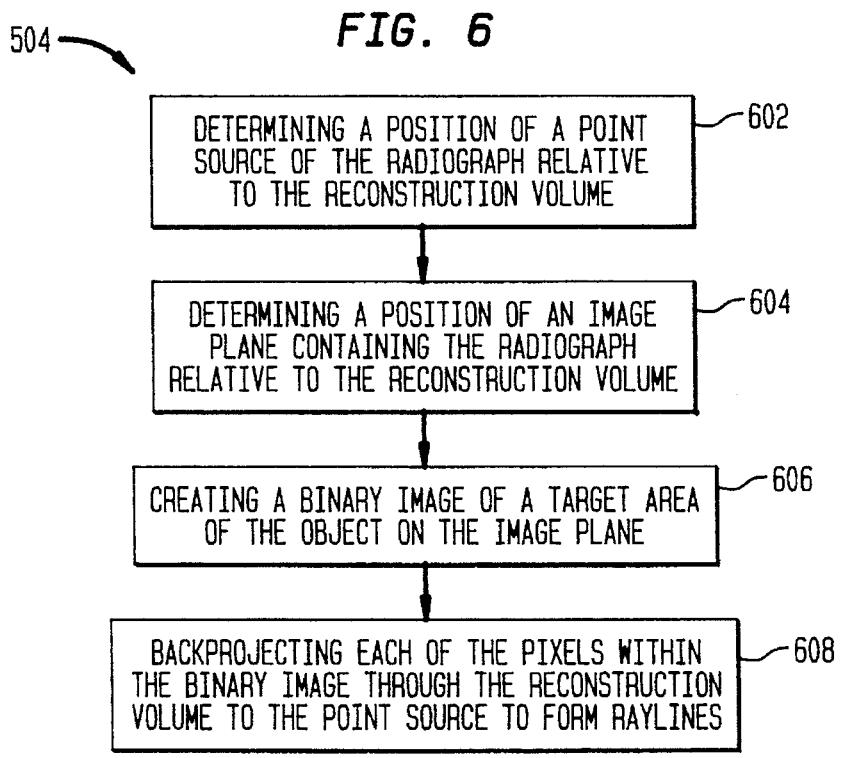

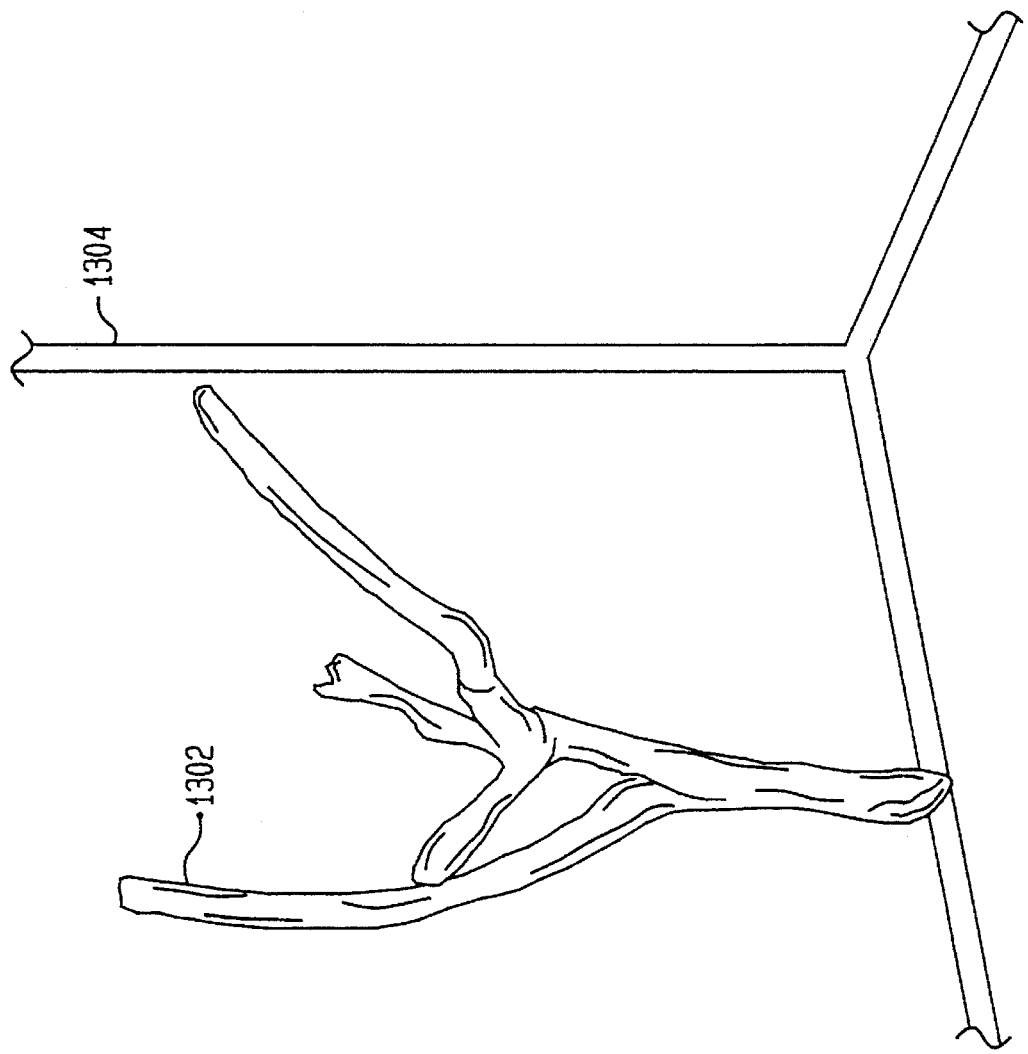

METHOD AND APPARATUS FOR THREE DIMENSIONAL IMAGE RECONSTRUCTION FROM MULTIPLE STEREOTACTIC OR ISOCENTRIC BACKPROJECTIONS

NOTICE OF COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to a method and apparatus for three dimensional image reconstruction. In particular, the present invention relates to a method and apparatus for reconstructing a three dimensional image of anatomical structures or regions of interest within a patient's body using stereotactic or isocentric backprojections.

2. Related Art

Three dimensional reconstruction of anatomical structures or regions of interest within a patient's body has always been important in many medical applications. Such information is used either alone or in conjunction with other clinical findings to reach a diagnosis or to formulate a treatment strategy. Many imaging devices and computer algorithms have been developed to provide such a capability with adaptations to the unique requirements of each clinical application. One example is Computed Tomography (CT) in which an X-ray source and detector assembly measure absorption profiles through a body from multiple directions. An algorithm based on the Fourier theorem is used in CT imaging to reconstruct the three dimensional anatomical structures as a sequence of two dimensional image slices.

Stereotactic radiography has long been established as the imaging modality for the precise localization and radiosurgical treatment of point targets within a patient's body. One example, in which stereotactic radiography is useful, is the application of stereotactic angiography in the diagnosis and treatment of arteriovenous malformations (AVM) in the brain. It has been noted that the present known angiography technique fails to provide a mechanism for accurate determination of the three dimensional shape or volume of the AVM. This deficiency leads to an overestimation of the size of the AVM, leading to radiation treatment of healthy brain tissue.

It has been suggested that if one can identify unique points of the AVM nidus on both the anterior-posterior (AP) and left-right (LATERAL) views of the AVM simultaneously, then the AVM can be reconstructed point by point in three dimensional space. Matching of such points of the nidus on both views, however, is almost impossible clinically. Significant research efforts have been dedicated to find an alternative approach for three dimensional visualization of the AVM. These efforts include contrast enhanced CT and Magnetic Resonance Angiography (MRA) for direct imaging of the AVM nidus.

CT angiography may often highlight the AVM, but it cannot clearly differentiate the feeding and draining vessels and the nidus containing the abnormal vascular shunts. It is critical to differentiate these components of the AVM for proper treatment. Early results from MRA are promising but there are several problems remaining in this process, such as geometric distortion associated with magnetic field inhomogeneities, gradient nonlinearities, susceptibility, chemical shift and flow shifts, that have not been fully addressed. Three dimensional visualization of vessel anatomy from MR datasets also remains restricted because of the inherent difficulty for automatic segmentation.

Conventional angiography, despite its limitations, provides temporal and spatial resolution of the AVM superior to that of CT and MR angiography. In fact, it is the only technique capable of resolving components of the AVM, such as the feeding artery, nidus and draining vein. The present invention is a new method which takes advantage of the precision of stereotactic angiography, and provides accurate three dimensional reconstruction of the AVM. Additionally, the present invention can be used in many other clinical applications to faithfully reconstruct an image of a region of interest within a patient's body.

SUMMARY OF THE INVENTION

The present invention presents a three dimensional reconstruction technique using backprojections of multiple, two dimensional projection images. The invention may be applied to a variety of clinical applications.

The present method for three dimensional reconstruction of an object from a stereotactic or isocentric backprojection includes the step of performing radiography of the object to produce a two dimensional image of the object on film or a digital image if digital radiography is used. The two dimensional image is then backprojected through a reconstruction volume.

The process of backprojection consists of determining the position of the point source and the image plane of the radiograph relative to the reconstruction volume. The target area on the radiograph is then determined. Each pixel within the target area is backprojected through the reconstruction volume to its point source. The line formed between each pixel and the point source is referred to as a rayline. The reconstruction volume is divided into cubic units called voxels. Each rayline, as it is formed during backprojection, intersects several of the voxels in the reconstruction volume. The combination of all of the intersected voxels for a particular view defines the a three dimensional image of the object for that view.

Radiographs are taken of the object from several different view angles. The process of backprojection is repeated for each view of the object to produce a three dimensional, reconstructed image of the object for each view. All of the three dimensional reconstructed images are then superimposed on each other, and values associated with their voxels are summed. After superimposing the images, those voxels found in all of the three dimensional reconstructed images define the final, three dimensional reconstructed volume image of the object.

A stereotactic localizer frame design that enhances the reconstruction technique is also described. The stereotactic localizer frame includes eight X-ray transparent, rigid plates which are securely fastened to a base and top portion of the frame. One face of each plate has four radiopaque fiducial marks disposed on it. These fiducial marks are used during the process of reconstruction to determine the position of the point source and the image plane relative to the reconstruction volume.

The present stereotactic localizer frame provides a wider range of viewing angles than a conventional localizer frame. Thus, during radiography, two dimensional images of the object may be obtained from more view angles, so that the actual three dimensional shape of the object can be reconstructed with greater accuracy than with a conventional localizer frame.

This method can be used in a variety of clinical applications, including the treatment of AVM, three dimensional dosimetry in brachytherapy, the reconstruction of a cerebral arterial tree, and potentially any other clinical application in which reconstruction of a three dimensional image of anatomical structures or regions of interest within a patient's body is desired.

BRIEF DESCRIPTION OF THE FIGURES

The foregoing and other features and advantages of the invention will be apparent from the following, more particular description of a preferred embodiment of the invention, as illustrated in the accompanying drawings.

FIG. 5 shows a flow chart for the method of three dimensional reconstruction of the object from stereotactic backprojections.

FIG. 6 shows a flow chart for the backprojecting step 504 of the method in FIG. 5.

FIG. 13 shows a tree branch disposed within a stereotactic localizer frame of the present invention.

DETAILED DESCRIPTION OF THE PREFERRED EMBODIMENTS

Overview

Stereotactic radiography is a well established technique for precise localization of target points. One example of its conventional clinical application is in localization of arteriovenous malformations for radiosurgical treatment.

Figure 1:
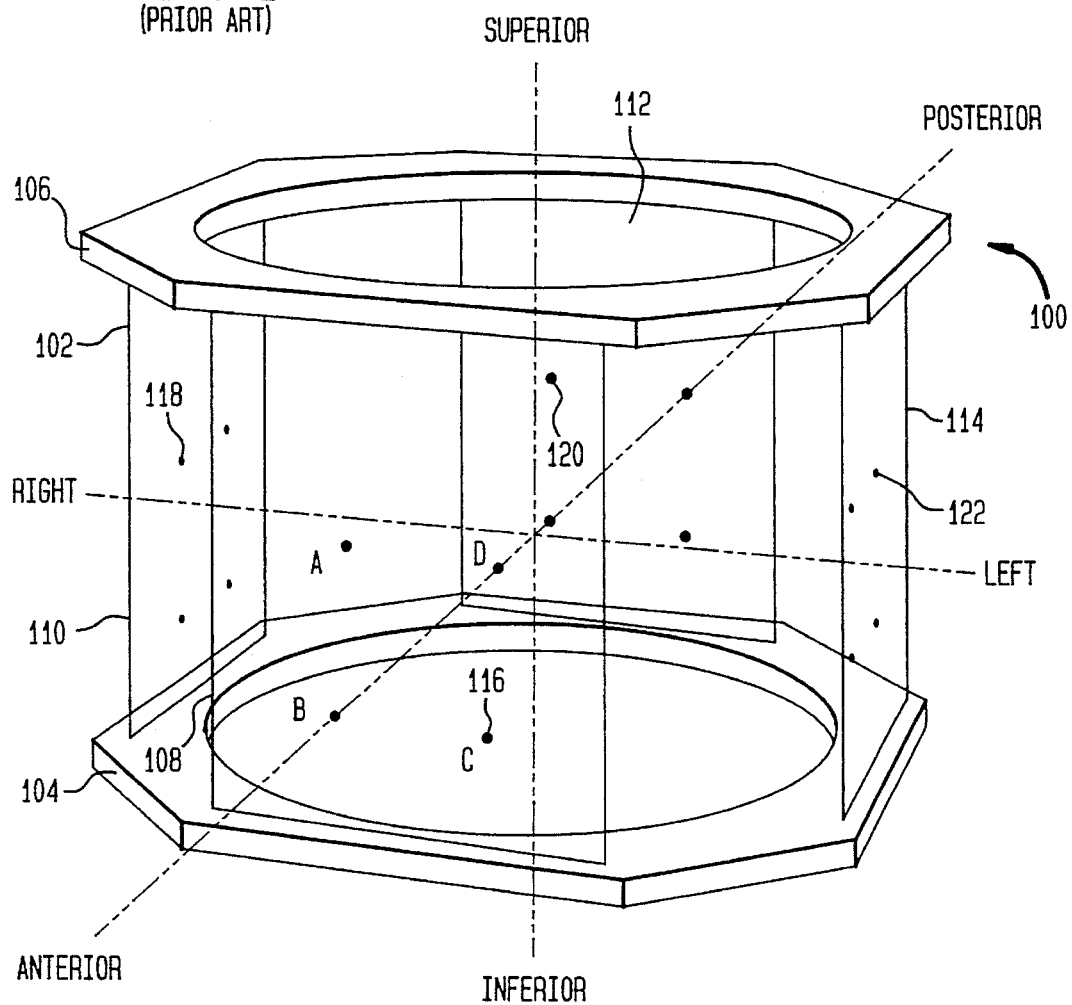
FIG. 1 shows a perspective view of a conventional, stereotactic frame used in radiography.

Most commercial and in-house developed stereotactic localizer frames for radiography share the same basic design and mathematical principle for localization. FIG. 1 shows a perspective view of a conventional, stereotactic localizer frame 100 used in radiography. In a conventional stereotactic angiography procedure, a stereotactic head frame, such as a Brown, Roberts and Wells (BRW) or a Cosman, Roberts, and Wells (CRW) head ring (not shown), is affixed to a patient's cranium, normally through a set of fixation screws anchored to the outer table of the skull. Stereotactic localizer frame 100 is then attached to the head frame. Stereotactic localizer frame 100 includes a rigid, X-ray transparent shell structure 102, typically made from a durable plastic. Shell 102 has a base portion 104 and a top portion 106 disposed parallel relative to each other. Base portion 104 is configured to be rigidly and securely fastened to the head ring. Conventional stereotactic localizer frame 100 has four faces 108, 110, 112, and 114. Faces 108 and 112 are parallel to each other and represent the anterior-posterior (AP) view. Faces 110 and 114 are parallel to each other and represent the left-right (LATERAL) view. Faces 108, 112 are preferably orthogonal to faces 110, 114.

Each face 108–114 contains a set 116, 118, 120, 122, respectively, of four fiducial marks. Sets 116–122 of fiducial marks are radiopaque so that they are visible on a radiograph. All four sets of fiducial marks are labeled so that they can be easily identified on the radiograph. For example, in FIG. 1 the fiducial marks of set 116 are labeled A, B, C, and D.

Figure 2:
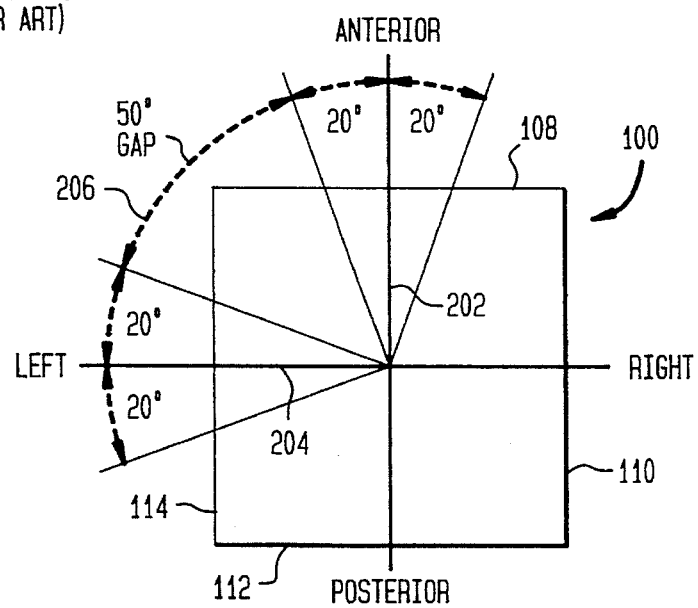
FIG. 2 shows a top view of the view angles available when using the frame of FIG. 1.

Once stereotactic localizer frame 100 is securely attached to the head ring, a pair of radiographs are taken. A neuroradiologist chooses specific angulations and parameters for optimal visualization of the AVM. However, the view angles which can be used for imaging the AVM are limited because the two corresponding sets of fiducial marks 116, 120 or 118, 122 must appear in each radiograph. As shown in FIG. 2, the film angulations are limited to the AP direction, having an axis 202, and the LATERAL direction, having an axis 204, or ±20 degrees off axes 202 and 204, so that all of the fiducial marks on opposing faces of stereotactic localizer frame 100 are captured on each radiograph.

For example, when taking a radiograph from the AP view, all of the fiducial marks located on the anterior and posterior faces 108, 112 must be visible in the radiograph. Similarly, from the LATERAL view, all of the fiducial marks located on the left and right faces 110, 114 must be visible. Thus, stereotactic localizer frame 100 has the disadvantage of creating a 50° gap 206 between available view angles on adjacent faces 108–112 as shown in FIG. 2. Gap 206 prevents radiographs from being taken over a large area of the AVM, thus making it difficult to accurately predict the three dimensional shape of the AVM. Without an accurate prediction of the shape of the AVM, the size of the AVM may be overestimated. As a result, healthy brain tissue may be unnecessarily treated with radiation.

Figure 3:
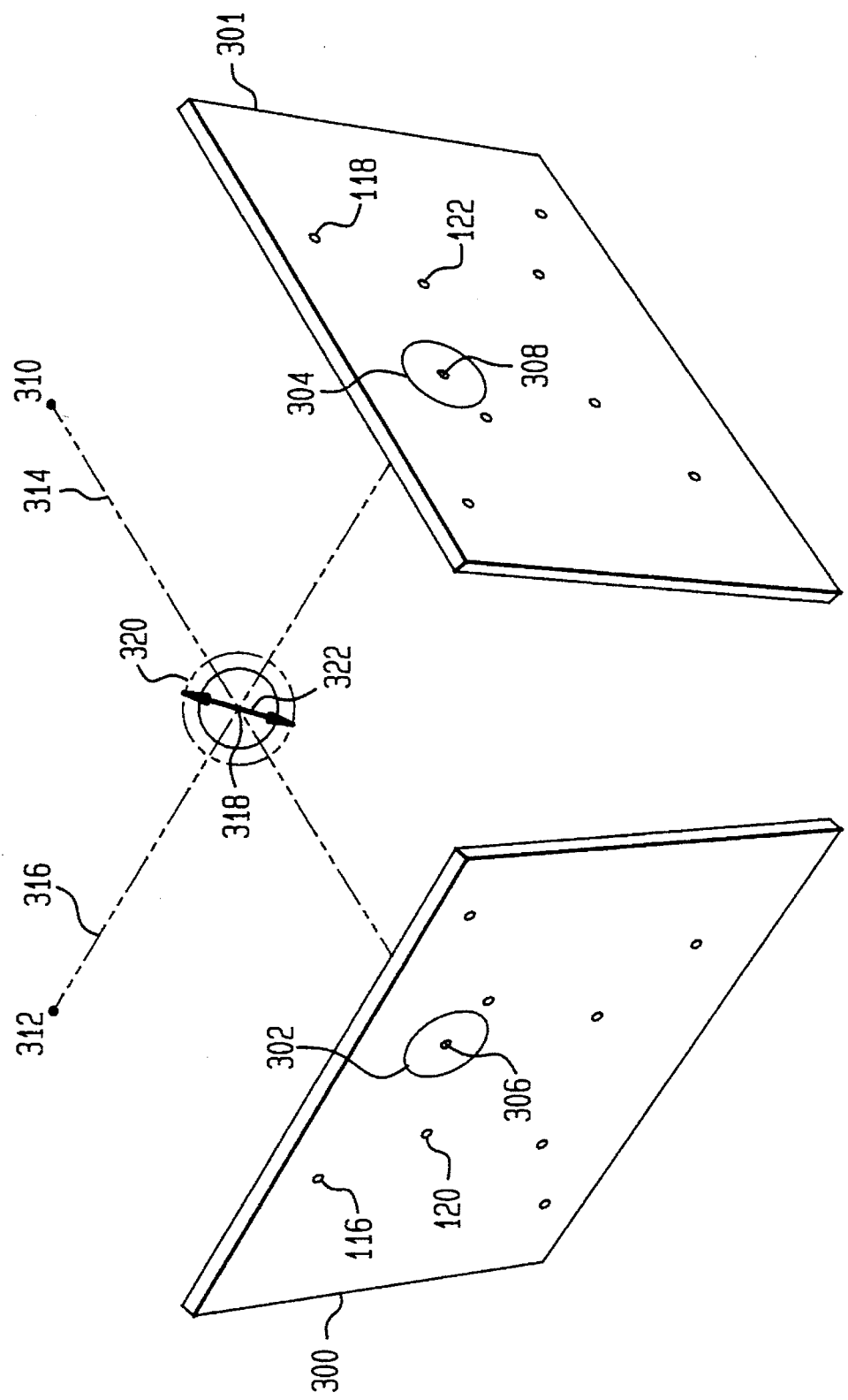
FIG. 3 shows the relationship between a two dimensional image of the object and the three dimensional coordinate system employed in a conventional method for reconstruction of the target center of the object.

FIG. 3 shows example AP and LATERAL films 300 and 301 for the conventional stereotactic radiography procedure, each having a point source 310 and 312, respectively. Target areas 302 and 304 for radiation treatment are located on AP and LATERAL films 300 and 301, respectively. A geometric center 306 is determined for target area 302, and a geometric center 308 is determined for target area 304. Geometric centers 306 and 308 are projected back to their respective point sources 310 and 312. These backprojections create raylines 314 and 316 as shown in FIG. 3. For a fixed object point relative to stereotactic localizer frame 100, raylines 314 and 316 can be mathematically reconstructed in three dimensional space. The intersection of these two raylines 314, 316 defines a target center 318 of the AVM. In practice, the two raylines will almost never intersect exactly due to finite accuracy, but the target center can generally still be located to an accuracy of ±0.3 mm.

Additionally in conventional stereotactic radiography, the superior-inferior extent, anterior-posterior extent and left-right extent of the AVM are determined from target areas 302 and 304. Sets of fiducial marks 116–122 (as shown in FIG. 3 projected onto films 300 and 301) and geometric centers 306, 308 are digitized and used to determine the spatial location of target center 318 relative to stereotactic localizer frame 100 (not shown in FIG. 3). The spatial location of target center 318 may be determined using the algorithm described in Siddon, R. L., et al., "Stereotaxic localization of intracranial targets," *Int. J. Radiat. Oncol. Biol. Phys.* 13:1241–1246, 1987, which is incorporated herein by reference. Radiosurgical treatment is then delivered to target center 318 and to a spherical field 320 surrounding target center 318 having a diameter 322 estimated by the clinician to be large enough to cover the largest dimension of the target volume. This estimation is based on the target areas drawn on the AP and LATERAL films.

This conventional treatment approach is unsatisfactory when the AVM is, for example, oblong in shape. The treatment delivery of a single, spherical dose volume needed to cover an oblong-shaped AVM will result in the unnecessary treatment of a larger amount of normal healthy brain tissue. One solution is to apply treatment to multiple target centers having smaller spherical fields and strategically placing target centers within the target volume for optimal coverage. However, this treatment requires knowledge of both the three dimensional shape and volume of the AVM. Conventional stereotactic angiography methods are not capable of producing such knowledge. Although MR angiography can provide information concerning the three dimensional shape and volume of the AVM, it cannot clearly show the critical components of the AVM necessary for effective treatment.

Method of the Invention

Figure 4:
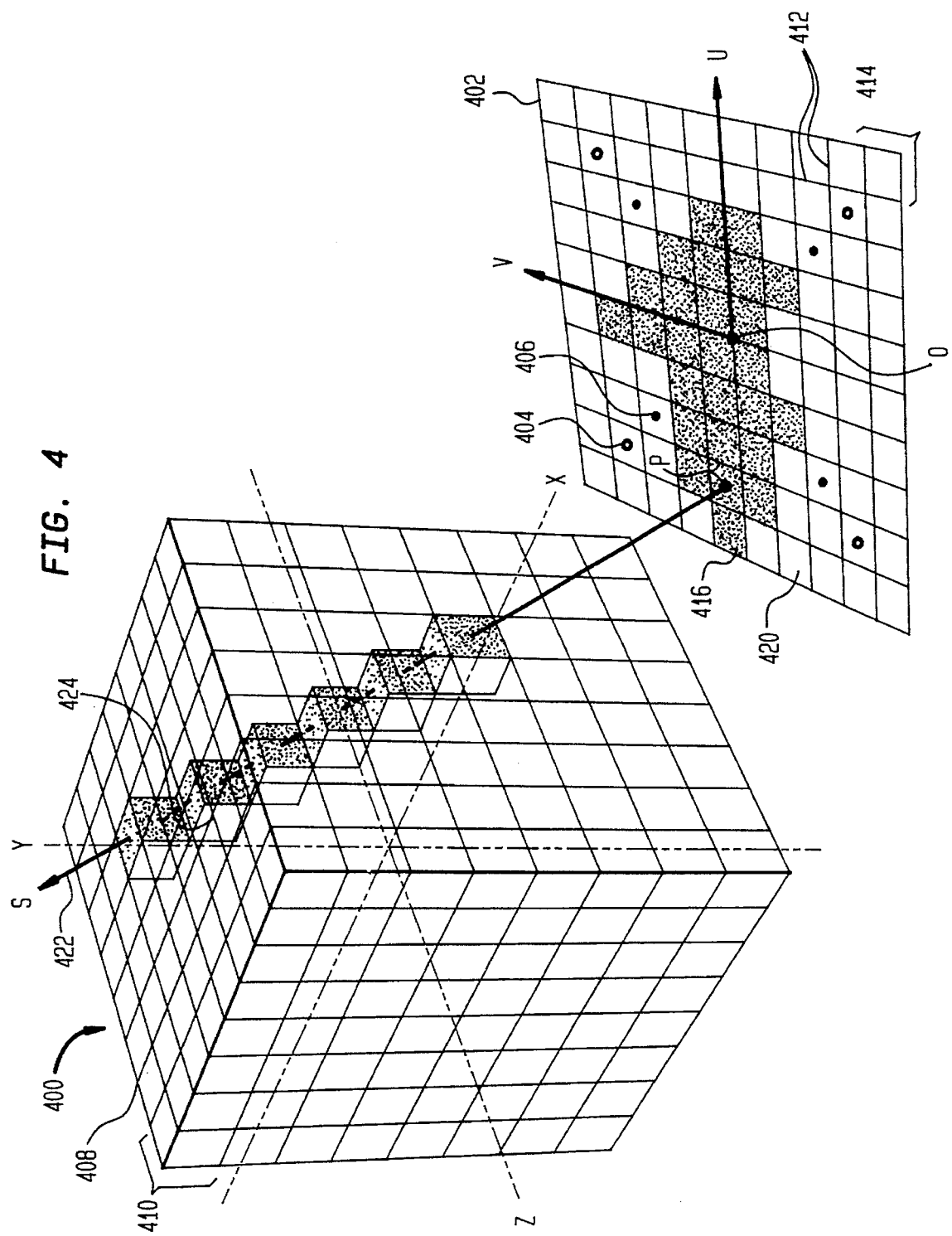
FIG. 4 shows the relationship between a two dimensional image plane and a three dimensional reconstruction volume of the present invention in stereotactic localization.

FIG. 4 shows a method 400 for reconstructing a three dimensional target volume of the AVM for radiosurgical treatment for one view of the AVM, according to the present invention. Method 400 is based on three dimensional reconstruction from multiple stereotactic backprojections. To simplify the mathematical construct, two coordinate systems, both cartesian, are defined. The first is a three dimensional coordinate system $\Re_{xyz}$ defined relative to a head ring frame (not shown in FIG. 4). An example of the head ring frame is the BRW system where the coordinate axes are defined with respect to a patient's orientation, +X:Right, −X:Left, +Y:Anterior, −Y:Posterior, +Z:Superior, −Z:Inferior. A second, two dimensional coordinate system $\wp_{uv}$, is defined with respect to an image plane 402.

The reconstruction algorithm begins by taking a radiograph (not shown) of the AVM. The radiograph lies in image plane 402. The two dimensional coordinates of two sets of projected fiducial marks 404, 406 (as projected on image plane 402) are digitized. An algorithm, as described in the article by Siddon, R. L., et al., incorporated by reference herein earlier in this application, is used to determine both the source position S (x,y,z) (denoted by an "S" in FIG. 4) and the position of each of the projected fiducial marks in sets 404, 406. The projected fiducial marks from sets 404, 406 are used to define mathematically image plane 402 as follows.

For each radiograph, the actual fiducial marks (not shown in FIG. 4) in three dimensional space are denoted as $F_i$ (x,y,z), i=1,2, ..., 8 and the corresponding projected fiducial marks from sets 404, 406 as $F'_i$ (x,y,z), where the bold face type connotes a vector. Projected fiducial marks from sets 404, 406 are also defined in two dimensional space as $F''_i$ (u,v). The unit vectors in the two dimensional image plane are U (1,0) and V (0,1). In three dimensional space, these two unit vectors are U' $(x_u, y_u, z_u)$ and V' $(x_v, y_v, z_v)$ which can be determined by solving the quadratic equation:

$$\begin{bmatrix} A_{ij} & B_{ij} \\ A_{i'j'} & B_{i'j'} \end{bmatrix} \begin{bmatrix} U_k \\ V_k \end{bmatrix} = \begin{bmatrix} C_{ijk} \\ C_{i'j'k} \end{bmatrix}$$

where A, B, C, D, U' and V' are scalars and are defined as follows:

defining the vectors $$G^{ij} = F_i'' - F_j''$$

and $$H^{ij} = F_i' - F_j'$$

where i,j ∈ {1,2, ...,8} and i≠j, and $G^{ij}_m$, m=1,2 as the mth scalar component of $G^{ij}$, and $H^{ij}_k$, k=1,2,3 as the kth scalar component of $H^{ij}$, then $A_{ij} = G^{ij}_1$, $B_{ij} = G^{ij}_2$ and similarly for $A_{i'j'}$ and $B_{i'j'}$, where i', j' ∈ {1,2, ...,8} and i≠j'≠i≠j and $C_{ijk} = H^{ij}_k$, and $U'_k$, $V'_k$, k=1,2,3 are simply the kth scalar component of the corresponding vectors.

Any four projected fiducial marks from sets 404 and 406 are chosen, provided the resulting matrix equation described above is non-singular, to define the scalars A, B and C to solve the quadratic equation for U' and V'. With eight projected fiducial marks 404, 406, two independent calculations can be made and the unit vectors U', V' are accurately determined by the normalized and mean values.

To perform backprojection, a reconstruction volume 408 with desirable resolution is defined in three dimensional space. The resolution of reconstruction volume 408 depends on the specific clinical application for which the method is applied. Each unit of reconstruction volume 408 is referred to as a voxel 410 (i.e., a volumetric analog of a pixel). Similarly, an image grid 412 with a desirable resolution is defined in two dimensional image plane 402. Each unit in image grid 412 is referred to as a pixel 414.

In the preferred embodiment, the image of the AVM on the radiograph is digitized. For each non zero pixel (denoted by a "P" in FIG. 4), its two dimensional coordinates $P(u_p, v_p)$ are used to calculate its position $P'(x_p, y_p, z_p)$ in three dimensional space, $$P'_k = u_p * U'_k + v_p * V'_k + O_k,$$

where $P'_k$, k=1,2,3 is the kth scalar component of P', and $O_k$ is the kth component of O(x,y,z), the origin of the image plane.

A rayline 422, a line that traces one of the non-zero pixels P in image plane 402 back to its point source S, is backprojected through reconstruction volume 408 to define intercepted voxels 424 in reconstruction volume 408. This backprojection process is completed using a version of the algorithm disclosed in Siddon, R. L., "Fast Calculation of the exact radiological path for a three-dimensional CT array." *Medical Phys.* 12:252–255, 1985, incorporated herein by reference. All intercepted voxels 424 are assigned a value of N=1. This process is continued for all non-zero pixels P in image plane 402. The resulting collection of intercepted voxels (not shown) is a three dimensional backprojected image (not shown) of the target area 416 of image plane 402.

The above process is then repeated for all the other radiographs. All of the resulting reconstructed three dimensional images are then superimposed on each other, and the value of the voxels are summed. After superimposing all of the three dimensional images, the voxels that define the final reconstructed three dimensional volume image of the object must have a value of N, where N is the number of views used. For example, if four views were used, N=4, the voxels that define the final volume image of the object should be present in each three dimensional reconstructed image of the object. Thus, when the four reconstructed images are superimposed, the sum of the values of the voxels within the final volume image equals four. Accordingly, the spatial boundary of the AVM in three dimensions is defined by the region corresponding to the intersection of all the backprojections.

Figure 7:
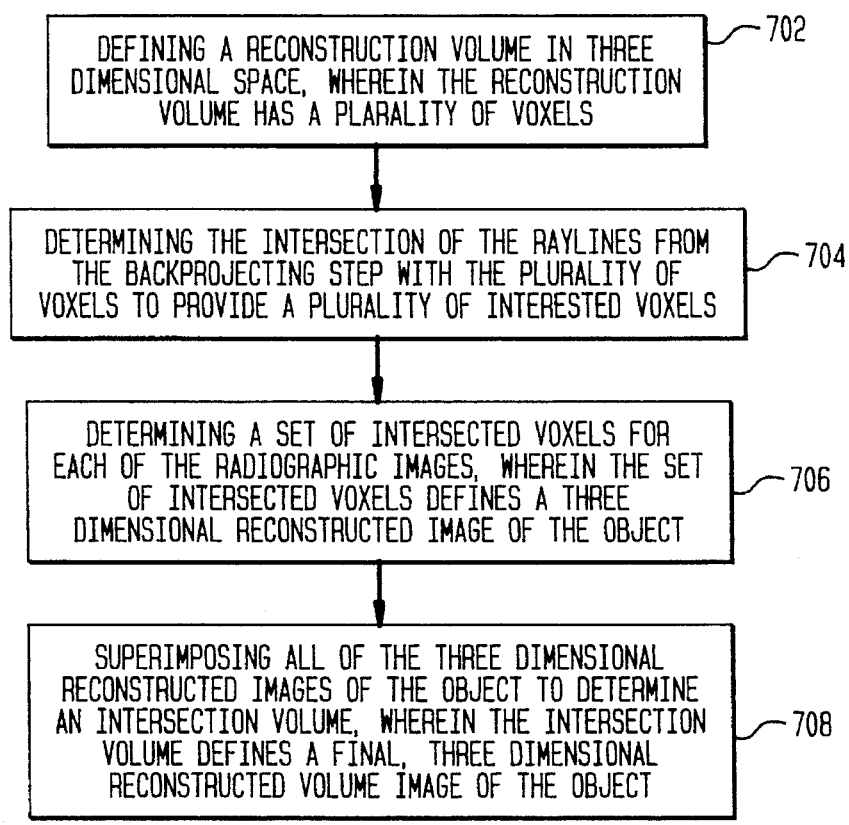
FIG. 7 shows a flow chart for the step 508 of determining the intersection of a reconstruction volume and raylines as shown in FIG. 5.

The above-described method is illustrated in the flow charts in FIGS. 5–7. FIG. 5 shows a high level flow chart of the method 500 for three dimensional reconstruction of an image of an object from two dimensional images using backprojections. Step 502 illustrates the step of performing the radiography of the object from point source P to produce a two dimensional image, the radiograph, on image plane 402. Step 504 illustrates the step of backprojecting the two dimensional image through reconstruction volume 408 to point source P to produce a three dimensional reconstructed image. Step 506 illustrates the step of repeating the radiography and backprojecting steps for multiple views of the object. In the preferred embodiment, at least six views are used. Step 508 illustrates the step of determining an intersection volume in reconstruction volume 408 for all of the three dimensional reconstructed images. This intersection volume defines the final three dimensional, reconstructed volume image of the object.

FIG. 6 provides a more detailed flow chart of backprojecting step 504. Backprojecting step 504 begins with a step 602 to determine the position of point source P relative to reconstruction volume 408. Step 604 then determines the position of image plane 402 relative to reconstruction volume 408. A digitized, binary image of a target area of the object is then created in step 606. In step 608, each of the pixels within the target area are backprojected through reconstruction volume 408 to point source P to form raylines 422, where the intersection of raylines 422 and reconstruction volume 408 define a three dimensional image of the object for a particular view.

FIG. 7 provides a more detailed flow chart of step 508 of FIG. 5. Step 702 defines reconstruction volume 408 in three dimensional space, where reconstruction volume 408 is divided into a plurality of voxels 410. Step 704 illustrates the step of determining the intersection of rayline 422 and voxels 410 to define a set of intersected voxels 424. Step 706 determines a set of intersected voxels 424 for each of the radiographs taken from multiple views. Each set of intersected voxels defines a three dimensional image of the object for that view. Step 708 then superimposes all of the images to determine an intersection volume. The intersection volume defines the three dimensional reconstructed volume image of the object.

Because the mathematics involved in stereotactic localization and raytracing for backprojection are both very precise, sub-millimeter accuracy can be achieved with this reconstruction technique. The number of views required depends on the complexity of the object, but six to eight views with feasible angulations appear adequate to create an accurate three dimensional reconstructed image of the object. However, structures that are always obscured in every single view, such as concavity, cannot be faithfully reconstructed. This will lead to an overestimation of the object size, but for the very same reason, this technique has the desirable clinical feature that it will never underestimate the actual target volume. This technique will provide a better spatial and volumetric definition of the AVM than with the estimation based on the largest dimension from the AP and LATERAL films alone.

Apparatus of the Invention

Figure 8:
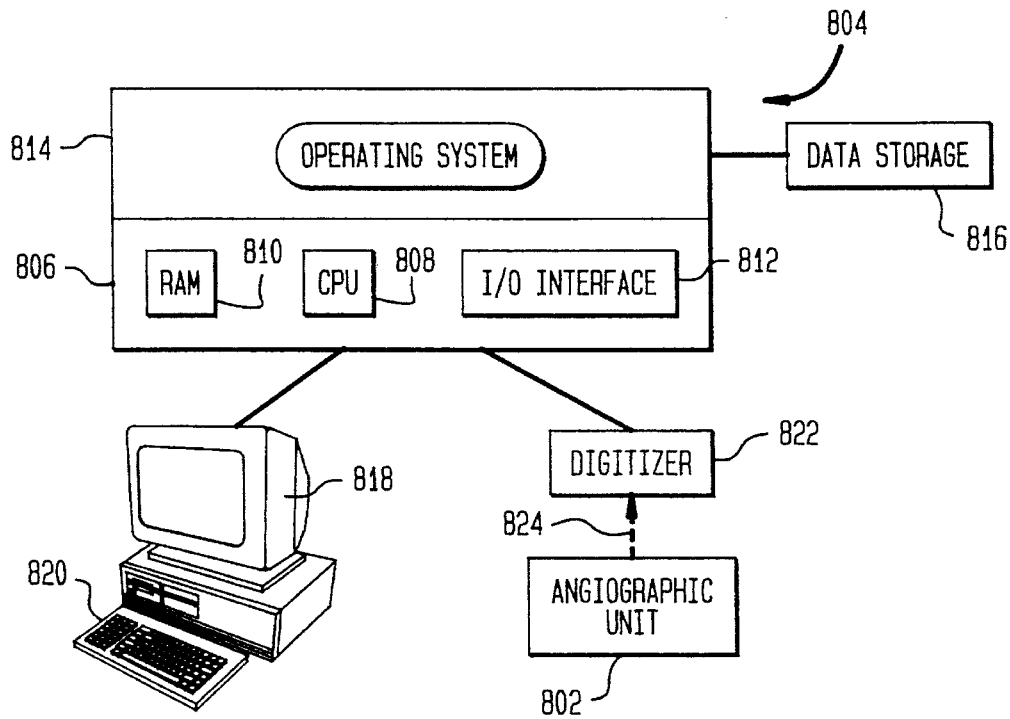
FIG. 8 shows an apparatus used to perform the method of the invention as shown in FIGS. 5–7.

The preferred embodiment of the apparatus used to perform the method of the invention is shown in FIG. 8. The apparatus includes a computer platform 804. Steps 504 and 508 are performed using a software program written in C Programming language, embodied on a computer readable medium, such as a floppy disk. Subroutines of the source code of the preferred embodiment are included herewith. It is believed that any skilled programmer would have no difficulty writing the source code necessary to perform the steps of this invention.

Computer platform 804 includes a hardware unit 806 which includes a central processing unit (CPU) 808, a random access memory (RAM) 810, and an input/output interface 812. RAM 810 is also called a main memory. Computer platform 804 also typically includes an operating system 814. In addition, a data storage device 816 may be included. Storage device 816 may include an optical disk or a magnetic tape drive or disk.

Various peripheral components may be connected to computer platform 804, such as a terminal 818, a keyboard 820, and a digitizer 822. Digitizer 822 is used to digitize the images from the radiographs. Radiographs may be obtained by using a commercially available angiographic unit 802, such as Siemens "Angiostar" or "Neurostar", manufactured by Siemens Medical System, New Jersey. A dashed line 824 connecting digitizer 822 and angiographic unit 802 represents a manual step in which the image on the radiograph is transferred from the film to digitizer 1622. The image can be digitized through two different types of digitizers, either a laser scanner or a digitizing tablet.

Using the first type of digitizer, the radiograph is placed on a film scanner such as the "Lumiscan100" Laser Film Digitizer, manufactured by Lureisys, Sunnyvale, Calif. Digitizer 822 is linked with computer platform 802. The film is scanned and a digital image of the film is captured and saved in the computer. With a mouse (not shown) and a software program, the outline of target area 416, representing the AVM, is marked on the digital image. The positions of the fiducial marks are similarly marked.

In the preferred embodiment, the binary image is created using a thresholding technique, based on the intensity of the pixels. Target area 416 is physically darkened on the radiograph and thus provides the pixels that define target area 416 with a low intensity value. Any pixels below a threshold value of intensity are given a binary value of 1 (shown in FIG. 4 by light colored pixels). Background pixels 420 were given a binary value of 0. Darkened pixels 418 within the target area represent the projection or shadow of the three dimensional AVM onto image plane 402.

The binary image may include pixels corresponding to vessels that are outside of the AVM, representing other regions of interest. If the only region of interest is the AVM, those pixels can be forced to zero (turned into background) after the thresholding is applied. Alternatively, an algorithm, as described in Harrington, S., *Computer graphics, a programming approach*, Ch. 3, McGraw Hill, 1983, which is incorporated herein by reference, can be used to fill in the interior of the outlined area to form a binary image of the AVM.

In another embodiment, the radiograph may be scanned into the computer without marking the outline of the AVM. An algorithm is then used to differentiate between the AVM and the background and remove the background from the image on the computer.

The background may also be eliminated by using digital or film subtraction. In angiography, radiographs are normally taken at several frames per second during which a contrasting agent is injected into the patient's bloodstream. The first film is taken before the contrasting agent reaches the area of interest. This film is referred to as a mask. The mask shows the anatomical areas, such as the skull and other vessels, that make up the background. A second film, chosen from among the remaining radiographs, is used to illustrate the area of interest highlighted by the contrasting agent, and to show the anatomical areas surrounding the AVM. The mask is "subtracted" from the second film, to eliminate the common anatomical areas or "background" and leave behind a clear view of the area of interest.

Using the second type of digitizer, the radiograph is placed on a digitizing tablet, such as "AccuGrid", model number A110HBL, manufactured by Numonics Corporation, Montgomery, Penn. The digitizing tablet is a light box, with a special pen or tracker with a cursor and cross-hairs. The pen or tracker is used to mark points of interest on the film, and each marked point is digitized. This method is useful if only the outline of the AVM nidus is being marked. However, if other, more detailed components of the AVM, such as the feeding artery and the draining vein, are being digitized, this method may be time consuming.

An alternate embodiment of the apparatus for implementing method 400 is to perform digital radiography using an image capture device, part of angiographic unit 802, to provide a two dimensional digital image of the AVM. Angiographic units such as, Siemens "Angiostar" or "Neurostar", manufactured by Siemens Medical System, New Jersey, have digital options. The digital image is then directly downloaded to the computer, thus eliminating the need for digitizer 822. This data is presented in a standard file format referred to as "DICOM V3.0".

Digital images from digital radiography inherently contain distortion of the object, known as image warping. This distortion may often be corrected. Standard film radiographs are not subject to this image warping. Accordingly, in the preferred embodiment, film radiographs were digitized by means of a laser scanner and thresholding algorithm.

Stereotactic Localizer Frame Design

Figure 9:
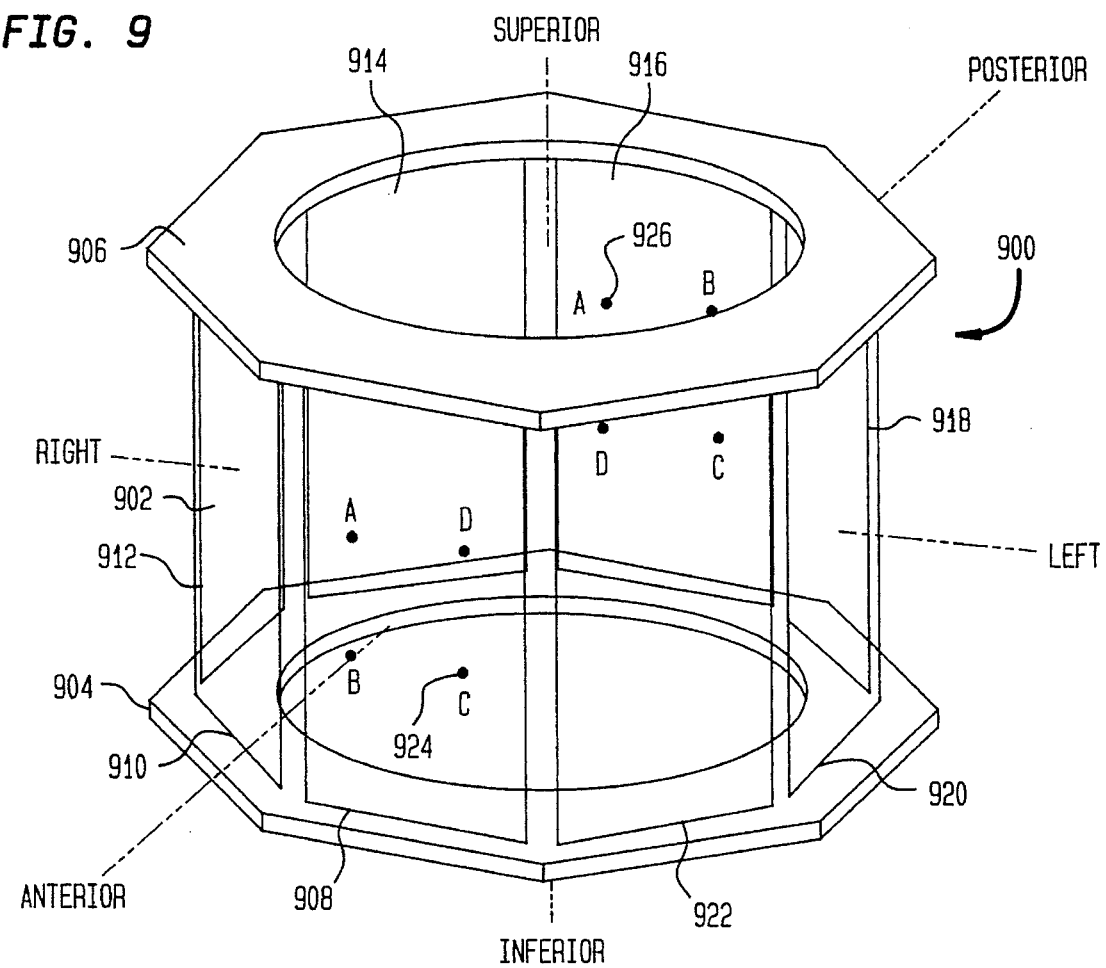
FIG. 9 shows a perspective view of a stereotactic frame of the present invention.

The quality of the reconstruction can be compromised if details of the AVM nidus (or any three dimensional object of interest) are obscured in the stereotactic views. With the limited view angles permitted using the conventional stereotactic localizer frame, obscured structures that are in front of or behind the region of interest may be unavoidable. To alleviate this problem, the invention includes a new stereotactic localizer frame 900 that will provide almost unlimited view angles along the axial plane, as shown in FIG. 9.

Stereotactic localizer frame 900 is configured to be rigidly attached to a head frame, as described above. Stereotactic localizer frame 900 includes a rigid, X-ray transparent shell structure 902, typically made from a durable plastic. Shell 902 has a base portion 904 and a top portion 906 disposed parallel relative to each other. Base portion 904 is configured to be rigidly and securely fastened to the head ring. In the preferred embodiment, stereotactic localizer frame 900 has eight faces 908–922, arranged to form an octagonal cross-section. Faces 908–922 are disposed such that the angle between neighboring faces will be reduced from 90° to 45°. Any number of faces could be used, for example, six faces, arranged in the form of a hexagon would reduce the angle between neighboring faces to 60°.

Faces 908–922 are separated into pairs of two opposing faces, in which each pair of opposing faces are parallel to each other. For example, faces 908 and 916 are parallel to each other. Faces 908 and 916 represent the AP view, faces 912 and 920 represent the LATERAL view and the remaining faces represent the oblique views.

Each face has a set of four fiducial marks. For example, FIG. 9 illustrates two sets 924 and 926, respectively, of fiducial marks for faces 908 and 916. Similarly, other sets of fiducial marks (not shown) are disposed on each of the faces of the stereotactic localizer frame 900. All eight sets of fiducial marks are radiopaque so that they are visible on the radiograph. In addition, the fiducial marks are labeled so that they can be easily identified on the radiograph. For example, in the preferred embodiment, set 924 of fiducial marks is labeled A, B, C, and D, and set 926 of fiducial marks is labeled a, b, c, and d. In the preferred embodiment, sets of fiducial marks on the opposing faces are labeled with capital and lower case letters to make it easier to compare the projections of the fiducial marks on the film for analysis. In the preferred embodiment, stereotactic localizer frame 900 has a diameter of 27 cm. Although the number of faces has doubled from a conventional stereotactic localizer frame, the faces are large enough to place the fiducial marks at corners of a 6 cm square. The farther apart the fiducial marks are, the more accurately the process of reconstruction can be performed. Thus, the preferred embodiment uses eight faces to achieve the maximum range of viewing angles with a wide enough separation between the fiducial marks to render an accurate three dimensional reconstructed image of the object. In an alternate embodiment, six faces could be used to allow for more distance between fiducial marks, thus providing further accuracy. However, in this embodiment, a slightly smaller range viewing angles is available.

Once stereotactic localizer frame 900 is securely attached to the head ring, a pair of radiographs are taken. A neuroradiologist chooses specific angulations and parameters for optimal visualization of the object. The view angles which can be used for imaging the object are not as limited as in the conventional stereotactic localizer frame 100 because the angle between adjacent faces has been reduced in half with respect to the conventional frame design.

Figure 10:
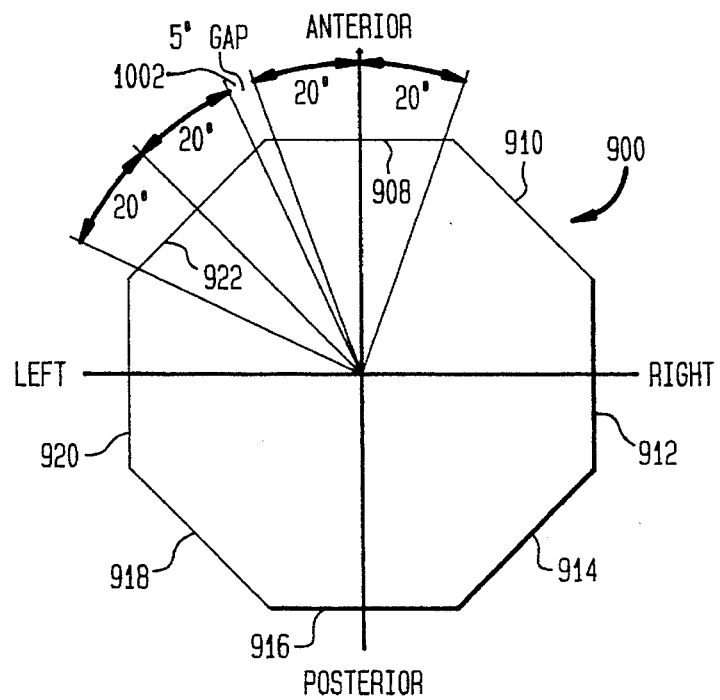
FIG. 10 shows a top view of the view angles available when using the frame of FIG. 9.
Figure 11A:
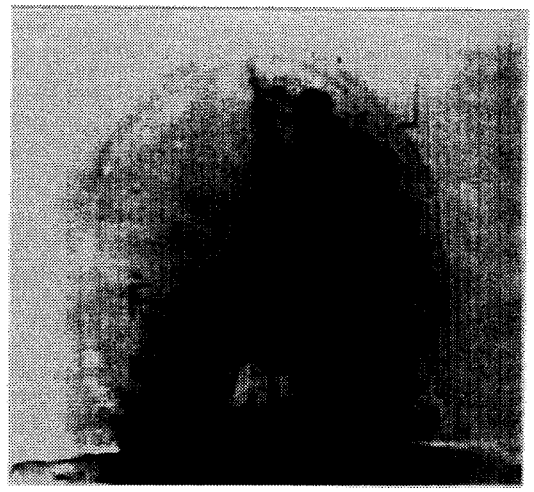
FIGS. 11A–11F show six angiograms of an AVM taken during a clinical application of the present invention.
Figure 11B:
Figure 11C:
Figure 11D:
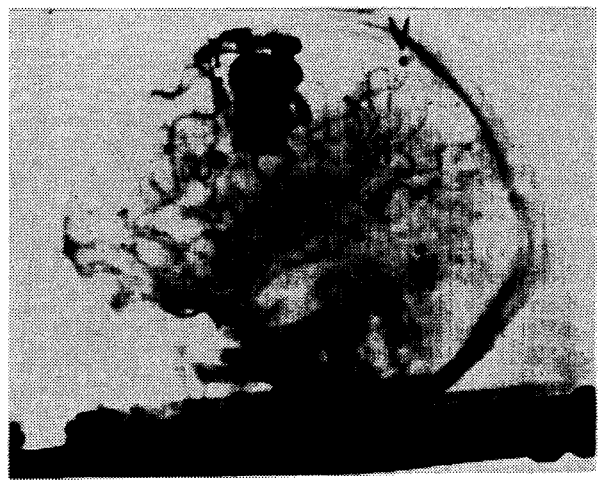
Figure 11E:
Figure 11F:
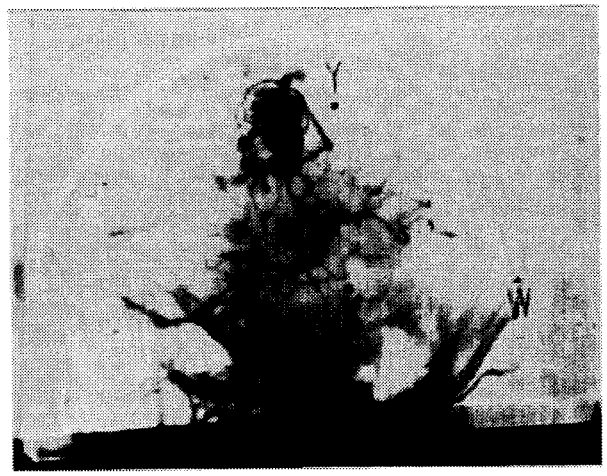

As shown in FIG. 10, the fiducials marks on opposing faces can be captured on the same film when the view angle is within ±20° from the perpendicular to the face. Thus, a maximum gap 1002 between the view angles that can be reached from the oblique faces and those from the AP and LATERAL faces will not be greater than 5°. This is in contrast to the 50° gap 206 between the view angles in conventional stereotactic localizer frame 100. Gap 1002 in the view angles can be eliminated by further increasing the number of faces, but the additional gain will not be clinically significant. This stereotactic localizer frame design, either used alone or in conjunction with the reconstruction technique, will be clinically useful for the stereotactic angiography procedure.

Clinical Application of the Method to AVM

Multiple stereotactic angiograms of two patients undergoing radiosurgical treatment of AVM were taken for clinical evaluation of this reconstruction technique. Six views, with angles along the AP and LATERAL directions and ±15° off axis were used. The target area of the AVM in each film after subtraction of the mask were marked by a neuroradiologist. The fiducial marks and outline of the target area on each film were digitized and used to perform the three dimensional reconstruction process of the present invention.

The six angiograms (after subtraction of the mask) are shown in FIG. 11. The solid outline in each film represents the target area of the AVM marked by the physician. The dimensions of the AVM as derived from the LATERAL and AP views (films 11A and 11D) are approximately 3.0 cm superior to inferior, 2.0 cm left to right and 1.8 cm anterior to posterior. In FIG. 11A, the larger target area delineated by the dotted outline (at the inferior and left regions) represents a "correction" made by the physician after reviewing the additional oblique views several days later. There is some ambiguity whether this area is also part of the AVM. The re-marking of the target area was motivated by the apparently larger presentation in FIG. 11C which was taken with a slight off-axis angle. At a more oblique view (FIG. 11B), however, the AVM was presented to have a significantly smaller area at this region.

Figure 12A:
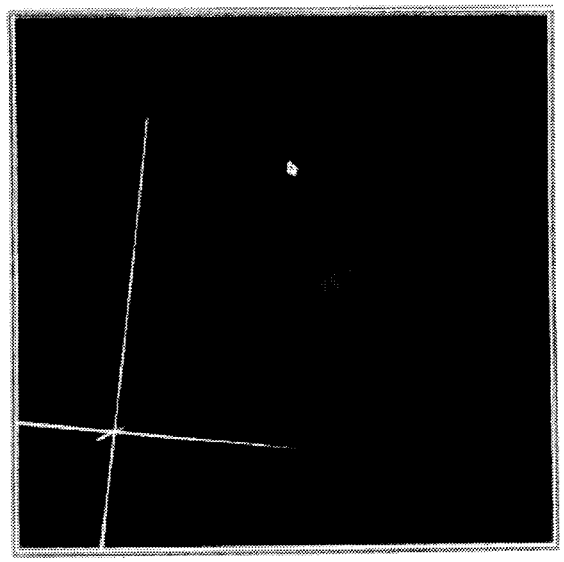
FIGS. 12A and 12B show three dimensional reconstructed images of the AVM shown in FIG. 11.
Figure 12B:
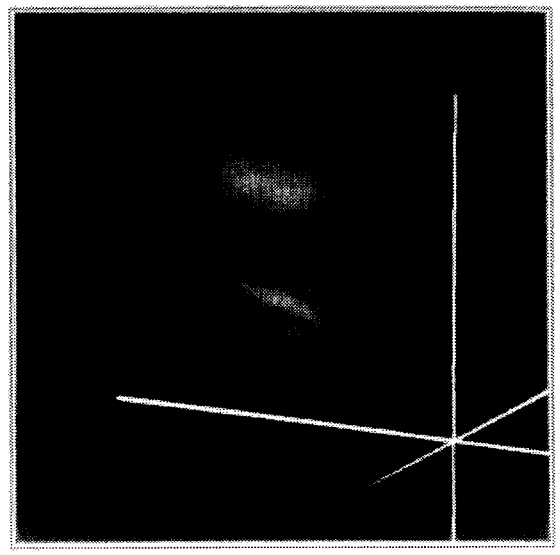

The three dimensional reconstruction of the target volume of the AVM is shown in FIGS. 12A and 12B. This reconstruction was performed using a 256×256 matrix (0.25 mm pixel size) and with 128 slices at a thickness of 0.5 mm. An AP view of the three dimensional reconstruction, shown in FIG. 12A, indicates that the lateral dimension of the inferior and lower region is significantly smaller than those marked on the FIGS. 11A and 11C.

Other Clinical Applications and Examples

In addition to the radiosurgical treatment of AVM, three dimensional reconstruction from stereotactic backprojections will also be useful for many other clinical applications. One such application is the reconstruction of a cerebral arterial tree, as shown by way of example in FIGS. 13–17. In this example a tree branch was used to mimic the cerebral arterial tree. FIG. 13 shows a tree branch 1302 disposed within a stereotactic localizer frame 1304. Multiple stereotactic angiograms of tree branch 1302 were taken.

Figure 14:
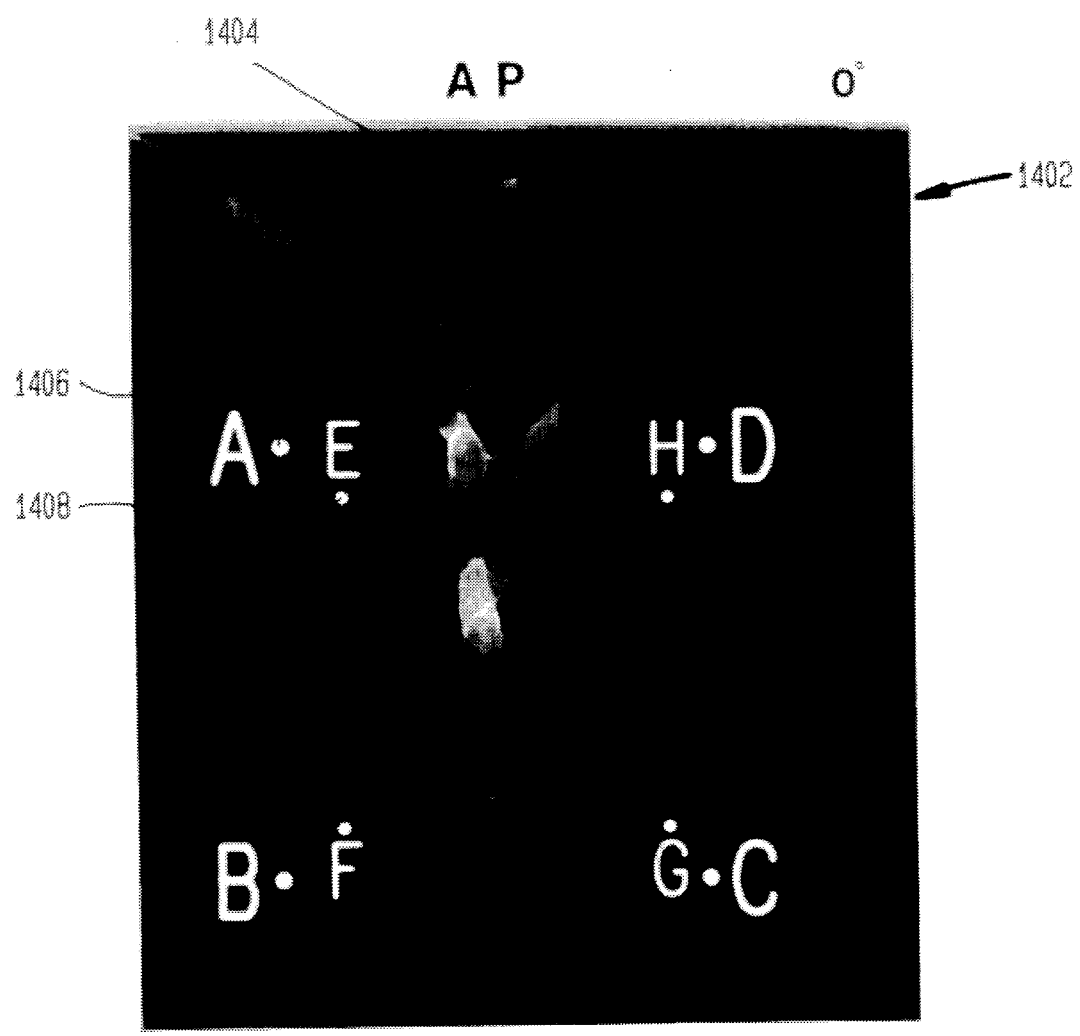
FIG. 14 shows a radiograph taken from the anterior-posterior view of the tree branch shown in FIG. 13.
Figure 15:
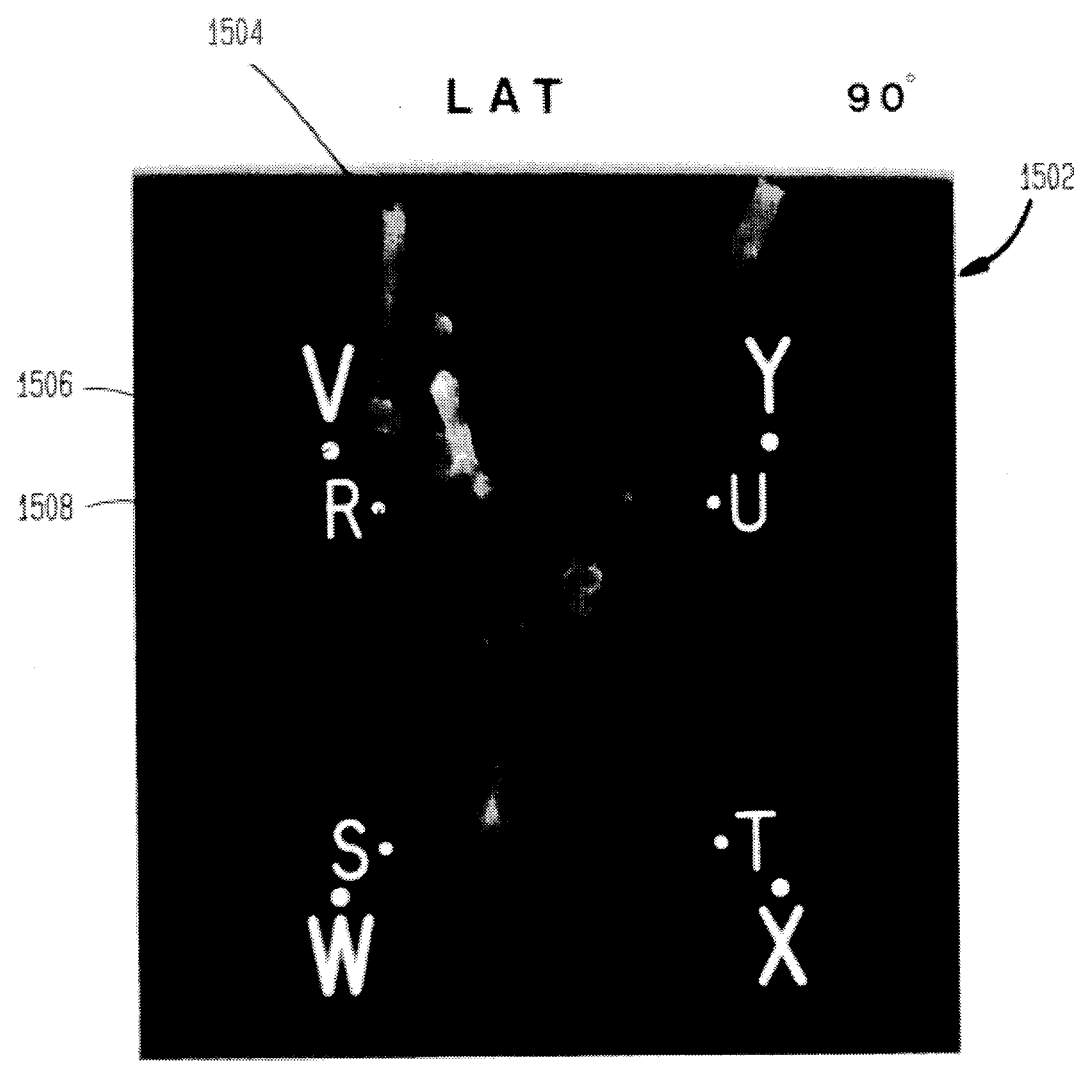
FIG. 15 shows a radiograph taken from the lateral view of the tree branch shown in FIG. 13.

FIGS. 14 and 15 show radiographs 1402 and 1502 which provide AP and LATERAL views, respectively, of tree branch 1302. Radiograph 1402 includes a two dimensional image 1404 of the AP view of tree branch 1302. Radiograph 1402 also shows two sets of fiducial marks 1406 and 1408, as projected onto radiograph 1402. Set 1406 includes fiducial marks A, B, C, and D, and set 1408 includes fiducial marks E, F, G, and H. Using the geometric relationship between set 1406 and set 1408, the position of a point source (not shown) of radiograph 1402 was determined with respect to stereotactic localizer frame 1304. Additionally, projected sets 1406 and 1408 were used to locate a position of the plane of radiograph 1402 with respect to stereotactic localizer frame 1304.

Radiograph 1502 includes a two dimensional image 1504 of the LATERAL view of tree branch 1302. Radiograph 1502 also shows two sets of fiducial marks 1506 and 1508, as projected onto radiograph 1502. Set 1506 includes fiducial marks V, W, X, and Y, and set 1508 includes fiducial marks R, S, T, and U. Sets 1506 and 1508 were also used to determine the positions of a point source (not shown) of radiograph 1502 and the plane of radiograph 1502 with respect to stereotactic localizer frame 1304.

The outline of the projection or shadow of tree branch 1302 in radiographs 1402 and 1502, along with four other radiographs (not shown) taken from different view angles, were digitized using a high resolution digitizer.

Figure 16:
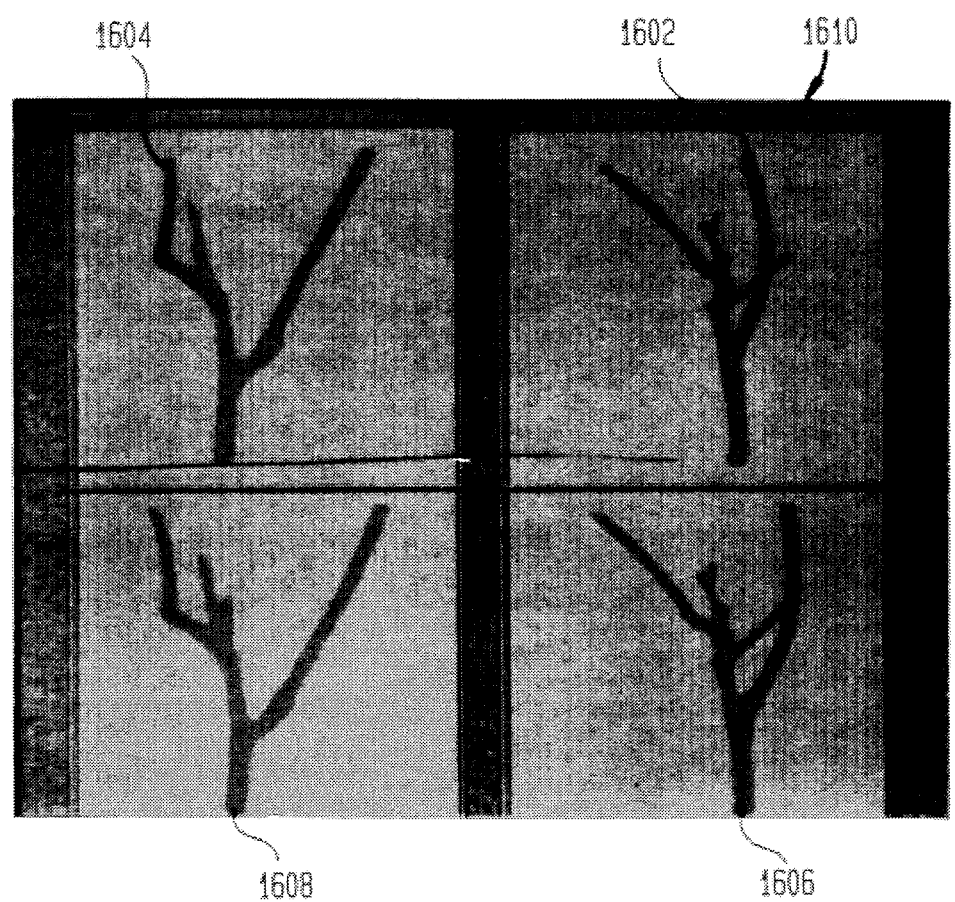
FIG. 16 shows four binary images of the tree branch reproduced from the radiographic images taken of the tree branch shown in FIG. 13 from multiple view angles.
Figure 17:
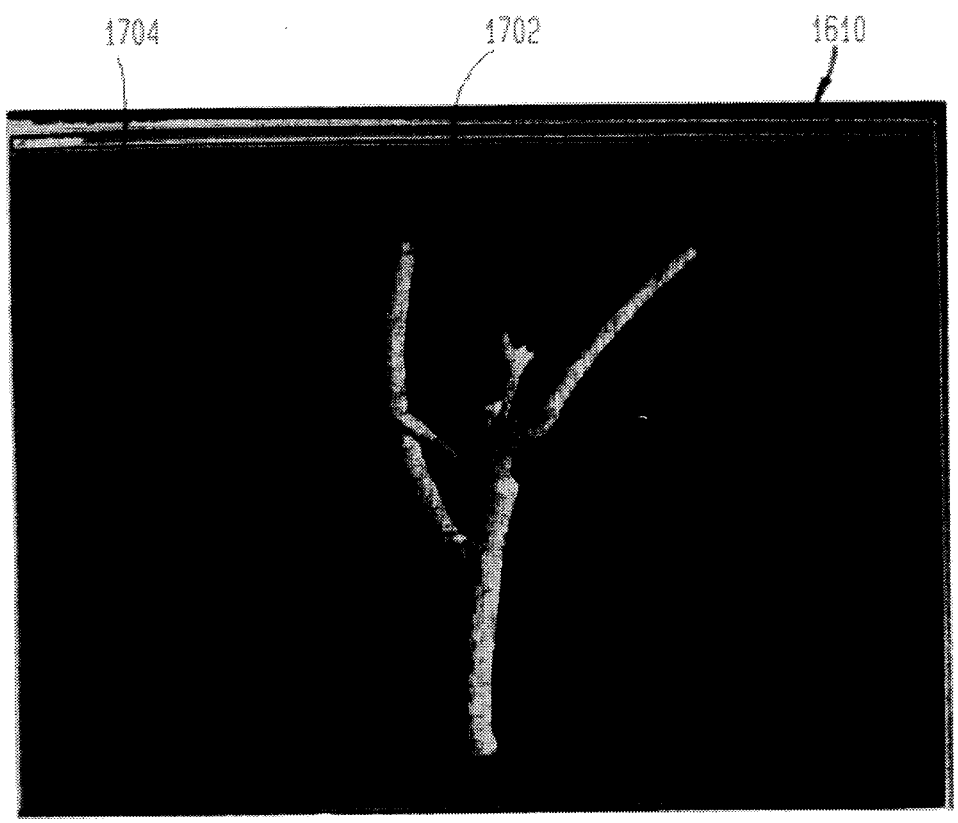
FIG. 17 shows a three dimensional reconstructed image of the tree branch shown in FIG. 13 according to the present invention.

Image processing algorithms were then applied to the digitized images to generate a binary image of each view of tree branch 1302. These algorithms eliminated unwanted background information and produced images, (four of the six images are shown in FIG. 16). FIG. 16 shows an AP 1602, a LATERAL 1604 and two OBLIQUE 1606, 1608 images of tree branch 1302, as shown on computer monitor 818. Computer 804 backprojects each pixel of images 1602–1608, using the backprojection algorithm described above to reconstruct a three dimensional image 1702 of tree branch 1302, as shown in FIG. 17. Image 1702 of tree branch 1302 is shown on computer monitor 818. Image 1702 is shown disposed inside a frame 1704, shown in this example as a cube.

Preliminary studies indicate that even minute blood vessels with sub-millimeter diameters can be faithfully reconstructed using the present method. This has several important potential applications related to multi-axial arterial display and visualization for angio diagnosis and treatment planning. Such a system could enhance detection and characterization of intracranial, structural, vascular abnormalities, including aneurysms and arteriovenous malformations. Currently, angio diagnosis is impaired by frequent overlap of adjacent vessels. Accurate three dimensional reconstruction could serve to resolve uncertainties in this regard. This may be particularly important in differentiating a vascular loop from an aneurysm, or in distinguishing arterial from venocomponents in arteriovenous malformations.

Surgical treatment may also benefit from such a system by providing a better "roadmap" to guide surgical approaches and establish the precise relationship of involved vascular structures to adjacent soft tissues. This type of roadmapping would be applicable to endovascular therapeutic approaches as well, serving to resolve the true course of adjacent arteries and hence guide catheter placement. Actual angiographic reconstruction would permit correlation with other imaging technologies which typically employ this type of display capability, including computerized tomography and magnetic resonance imaging. Such relation would serve to validate conclusions derived from these modalities and increase overall accuracy of imaging diagnosis.

Application can be extended to other sites of the body by constructing a larger radiographic frame. However, the inherent motions associated with certain functions which occur in other areas of the body (e.g., respiration, heart beat, etc.) must be compensated for during application of the present reconstruction technique. These motions can be somewhat compensated by gating. The accuracy will likely be in the mm range but such three dimensional reconstructions will still be very useful in certain clinical applications.

Another potential area of clinical application is brachytherapy. Implanted radioactive seeds can be localized stereotactically. With contrast enhancement, certain critical structures or tumors can be visualized on films. They can then be reconstructed by stereotactic backprojection to allow three dimensional dosimetry and volumetric analysis for the planning and evaluation of the treatment.

An example in which three dimensional dosimetry is applicable is in cancer treatment of the uterus. Radiopaque ovoids and tandem (where the radioactive sources are located) of the treatment applicator can be digitized on each film and reconstructed in three dimensions. With the use of a contrasting agent, the bladder and rectal wall (critical structures) can be similarly reconstructed. Three dimensional treatment plans can then be performed and evaluated to determine the optimal configuration of the radioactive sources for the actual treatment.

Other Embodiments

The above reconstruction technique can be generalized to remove the need for a stereotactic frame when the requirement of spatial accuracy is not as stringent. For example, X-ray units capable of isocentric rotation can be used, and coordinate transformations can be performed to establish the spatial relationship between different views so that all the backprojections will be registered spatially.

Figure 18:
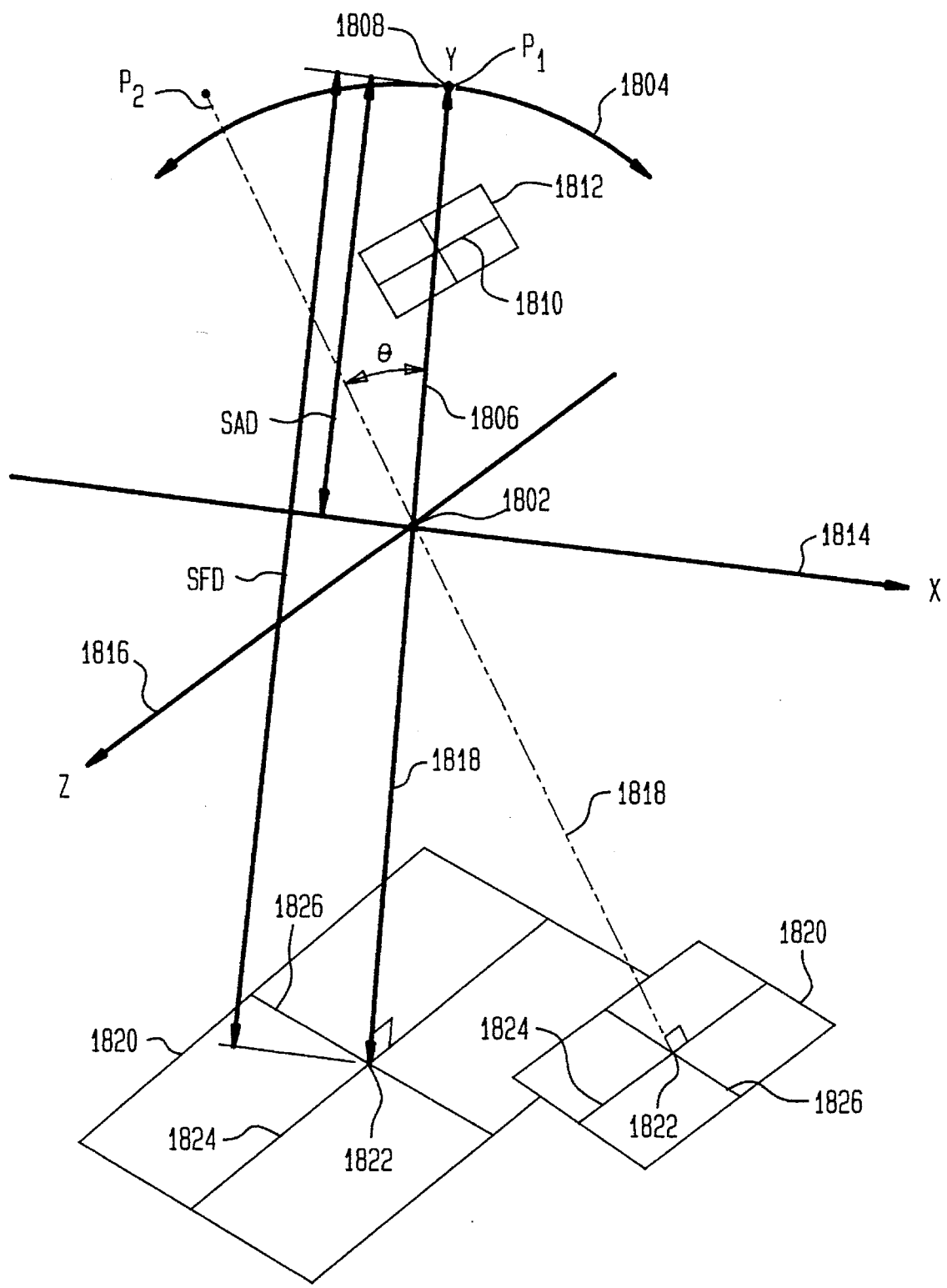
FIG. 18 shows the relationship between a two dimensional image plane and a three dimensional reconstruction volume of the present invention in isocentric localization.

The present invention may be applied to isocentric backprojections, as shown in FIG. 18. To simplify the mathematical construct, an isocenter 1802 of gantry rotation 1804 of a machine is selected as the origin of the three dimensional reconstruction volume. Coordinate axes are defined with respect to the 0° gantry position (in principle, any arbitrary gantry angle can be used). The +Y axis is defined by line 1806 from isocenter 1802 to source 1808. A crosshair 1810 in reticle 1812 (part of an accessory) is used to define an X axis 1814 and a Z axis 1816, forming a three dimensional cartesian coordinate system. A source to axis distance of the machine is referred to as SAD, where the source position at 0° gantry is S(0,SAD,0). Since a film cassette holder (not shown) is perpendicular to a beam axis 1818, a two dimensional coordinate system can be easily defined on film plane 1820. An origin 1822 of film plane 1820 is defined by the point where beam axis 1818 intercepts film plane 1820. An X axis 1824 and a Z axis 1826 are defined by the projections of cross-hair 1810 onto film plane 1820. Thus, at 0° gantry, film plane 1820 is at the plane $y=y_f=-(SFD-SAD)$, where SFD is the source to film distance. For each point $P(u,v)$ on the film plane, the corresponding three dimensional coordinates will be $P'(x,y,z)$ or $P'(u,y_f,v)$. For any other gantry angle, the three dimensional coordinates of $P(u,v)$ can be calculated by the coordinate transformation:

$$P'' = \mathbb{R}_z \times P'$$

where $$\mathbb{R}_z = \begin{pmatrix} \cos\theta & -\sin\theta & 0 \\ \sin\theta & \cos\theta & 0 \\ 0 & 0 & 1 \end{pmatrix}$$

and $\mathbb{R}_z$ is the rotational transformation matrix about the Z axis (assuming column vector notation), $\theta$ is the gantry angle.

The source position is transformed similarly.

$$S' = \mathbb{R}_z \times S$$

Since the position of the source and the image points can be determined for every view, the backprojection can be applied to perform the three dimensional reconstruction. This technique will be particularly useful for rotational angiography, where the digital images (after correction for image warping) and the gantry angle can be directly fed to the reconstruction algorithm. The fast image acquisition can be very useful for time-series studies or to eliminate the time dependency factors that are often unavoidable in slower sequential imaging technique. The images at different instances in time can also be used to perform digital subtraction to eliminate unwanted signals, as in digital subtraction angiography, thus further enhancing the angiography.

Source Code Implementation of the Preferred Embodiment

The present invention may be implemented in a computer program. An example of such an implementation is provided herewith. In this example, the computer program is written in the C programming language, and may be compiled and executed on a workstation. Example workstations include those made by Hewlett-Packard Company of Palo Alto, Calif. Silicon Graphics, Inc. of Mountain View, Calif.; and Sun Microsystems of Mountain View, Calif.

The source code provided herewith includes several subroutines for implementing the present invention. Example.c is an excerpt of a main program which can be used to call the appropriate subroutines to perform the three dimensional reconstruction process. All the subroutines ending in defs.h contain definitions of data structures and constants used in the program. All the subroutines ending in .h contain definitions of variables used in the program. A computer programmer skilled in the relevant art could easily interpret and implement the present invention based on the disclosed source code. A listing of source code used in implementation of the present invention is provided in the program code listing below.

While the invention has been particularly shown and described with reference to preferred embodiments thereof, it will be understood by those skilled in the art that various changes in form and details may be made therein without departing from the spirit and scope of the invention.

*Program Code Listing*

1. AVM.h include "AVMDefs.h"

ifdef INIT_DECLARATION int            NAngioPair;
    ANGIO_VIEW AngioView[2*MXN_ANGIO_FILM_PAIR];

endif ifdef EXT_DEF_ONLY extern  int         NAngioPair;
    extern  ANGIO_VIEW   AngioView[2*MXN_ANGIO_FILM_PAIR];

endif

---

2. AVMDefs.h define    MXN_ANGIO_FILM_PAIR    5

---

3. Angio.h

```
/****************************************************************************
*  Module Name: Angio.h                                                     *
*  Module Type: Include file.                                               *
*  Included in: 1) xbeam.c                                                  *
*               2) TxtPlanLib.h                                             *
*                                                                           *
*  Purpose:    Declaration and definitions for CT <-> BRW coordinate        *
*              transformations.                                             *
*                                                                           *
****************************************************************************/

/*  **  Include Constants and typedefs */ include "AngioDefs.h"
```

```
/************** DECLARATIONS - In 3D_MODULE ONLY ************/
ifdef INIT_DECLARATION ANGIO_DATA        AngioData;

ANGIO_TARGET      AngioTarget;

ANGIO_LOC_DATA    AngioLocData;

ANGIO_XFORM       AngioXform;

SOURCE_IMG_DATA   SrcImgData;

float    MagRefLeng, TrueRefLeng, FilmDistUnit;

/*                              LAT     AP      VERT       */
    Point3d LAT_Fiducials[8] = {  135.0,  -30.0,   30.0,   /* R */
                                  135.0,  -30.0,  -30.0,   /* S */
                                  135.0,   30.0,  -30.0,   /* T */
                                  135.0,   30.0,   30.0,   /* T */
                                 -135.0,  -30.0,   30.0,   /* V */
                                 -135.0,  -30.0,  -30.0,   /* W */
                                 -135.0,   30.0,  -30.0,   /* X */
                                 -135.0,   30.0,   30.0    /* Y */
                                };

/*                              LAT     AP      VERT       */
    Point3d AP_Fiducials[8] = {   30.0,  135.0,   30.0,    /* A */
                                  30.0,  135.0,  -30.0,    /* B */
                                 -30.0,  135.0,  -30.0,    /* C */
                                 -30.0,  135.0,   30.0,    /* D */
                                  30.0, -135.0,   30.0,    /* E */
                                  30.0, -135.0,  -30.0,    /* F */
                                 -30.0, -135.0,  -30.0,    /* G */
                                 -30.0, -135.0,   30.0     /* H */
                               };

float   *RefMarkBrw[4] = {LAT_Fiducials[S_idx], /* Rt Face S */
                              LAT_Fiducials[W_idx], /* Lt Face W */
                              AP_Fiducials[C_idx],  /* Ant Face C */
                              AP_Fiducials[G_idx]   /* Pos Face G */
                             };

int LatFiduPairIdx[NFIDU_MRKS] = { R_idx, S_idx, T_idx, U_idx,
                                       X_idx, Y_idx, V_idx, W_idx
                                     };
```

```
    int AP_FiduPairIdx[NFIDU_MRKS] = { A_idx, B_idx, C_idx, D_idx,
                     G_idx, H_idx, E_idx, F_idx
                   };

int NAngioPair;
        ANGIO_VIEW    AngioView[2*MXN_ANGIO_FILM_PAIR];

#endif

/******* EXTERNAL REFERNCING In EXT_DEF_ONLY ***********/ ifdef EXT_DEF_ONLY extern  ANGIO_DATA          AngioData;
    extern  ANGIO_TARGET        AngioTarget;
    extern  ANGIO_LOC_DATA      AngioLocData;
    extern  ANGIO_XFORM         AngioXform;
    extern  SOURCE_IMG_DATA     SrcImgData;

extern  Point3d      *RefMarkBrw[4];
    extern  Point3d      LAT_Fiducials[8], AP_Fiducials[8];
    extern  float        MagRefLeng, TrueRefLeng, FilmDistUnit;

extern  int      LatFiduPairIdx[NFIDU_MRKS],
                     AP_FiduPairIdx[NFIDU_MRKS];

extern  int          NAngioPair;
    extern  ANGIO_VIEW   AngioView[2*MXN_ANGIO_FILM_PAIR];

endif
```

4. AngioDefs.h

```
/***********************************************************************
 * Module Name: AngioDefs.h                                            *
 * Module Type: Include file.                                          *
 * Included in: 1) Angio.h                                             *
 *                                                                     *
 * Purpose:    Constants and typedefs for Angio -> BRW coordinate      *
 *             transformations.  All measurements in mm.               *
 *                                                                     *
 ***********************************************************************/ include "./VolumeDefs.h"
include "./BackProjDefs.h"

#define    MXN_ANGIO_FILM_PAIR   5
```

```
define      IN_TO_MM              25.4 define      MXN_TARGET    10
define      NFIDU_MRKS    8     /* No of fiducial marks per view */ define      MARKER_DIST 60.0
/* dist (mm) between fiducial marks */ define      AP            0
define      LAT           1 define      MARKER_POS_1  135.0
define      MARKER_POS_2  30.0

/*  LATERAL FUDUCIALS indices */
#define      R_idx  0
#define      S_idx  1
#define      T_idx  2
#define      U_idx  3
#define      V_idx  4
#define      W_idx  5
#define      X_idx  6
#define      Y_idx  7

/*  AP FUDUCIALS indices */
#define      A_idx  0
#define      B_idx  1
#define      C_idx  2
#define      D_idx  3
#define      E_idx  4
#define      F_idx  5
#define      G_idx  6
define      H_idx  7 define      RT_FACE_ID    1
define      LT_FACE_ID    2
#define      ANT_FACE_ID   3
define      POST_FACE_ID  4 define      AP_VIEW_ID    1
define      LAT_VIEW_ID   2 define      LAT_IDX       0
define      AP_IDX        1
#define      VERT_IDX      2

/*   ** Structures for Angio Fuducials */
```

```c
typedef struct { int Display2D;      /* On/Off Switch for 2D Display */
    int Display3D;      /* On/Off Switch for 3D Display */
    Point2d AP_Marks[8];   /* x, y coords of AP fiducials
                  A, B, C, D; E, F, G, H;    */
    Point2d LAT_Marks[8];  /* x, y coords of LAT fiducials
                  R, S, T, U; V, W, X, Y;    */

} ANGIO_DATA;

typedef struct { int     Display2D;       /* On/Off Switch for 2D Display */
    int     Display3D;       /* On/Off Switch for 3D Display */ int Ntarget;

Point2d AP_Targets[MXN_TARGET]; /* x, y coords of Targets in AP */
    Point2d LAT_Targets[MXN_TARGET]; /* x, y coords of Targets in LAT */
    Point3d RtFaceBrw[MXN_TARGET]; /* BRW coords of targets onto Rt Face*/
    Point3d LtFaceBrw[MXN_TARGET]; /* BRW coords of targets onto Lt Face*/
    Point3d AntFaceBrw[MXN_TARGET]; /* BRW coords of targets onto Ant Face*/
    Point3d PostFaceBrw[MXN_TARGET];/*BRW coords of targets onto Post Face*/
    Point3d TargetBrw[MXN_TARGET]; /* Brw coords of target */
    float TargetBrwError[MXN_TARGET];/* Error estimate of target coords*/ float   RtFaceMag[MXN_TARGET];     /* Mag factor of targets on Rt Face*/
    float   LtFaceMag[MXN_TARGET];     /* Mag factor of targets on Lt Face*/
    float   AntFaceMag[MXN_TARGET];  /* Mag factor of targets on Ant Face*/
    float   PostFaceMag[MXN_TARGET];/* Mag factor of targets on Post Face*/
    Point2d TargetMagFactor[MXN_TARGET];/* Mag Factor for target LAT/AP */ float   POST_Tdist[2];    /* dist from ref marker to projected
                                 target point for S1 and S2 (POST) */
    float   ANT_Tdist[2];     /* dist from ref marker to projected
                                 target point for S1 and S2 (ANT) */
    float   LT_Tdist[2];      /* dist from ref marker to projected
                                 target point for S1 and S2 (LT) */
    float   RT_Tdist[2];      /* dist from ref marker to projected
                                 target point for S1 and S2 (RT) */ float   POST_TMdist[2];      /* same as _Tdist except for the */
    float   ANT_TMdist[2];       /* reference point used for mag */
    float   LT_TMdist[2];        /* factor determination */
    float   RT_TMdist[2];

Point2d TargetDeltaDist[MXN_TARGET];/* fractional dist from ref face* */
```

```
    Point3d LAT_SrcPos[MXN_TARGET];    /* Lateral Source Pos (BRW) */
    Point3d AP_SrcPos[MXN_TARGET];     /* AP Source Pos (BRW) */

Point3d LAT_ImgPos[MXN_TARGET];    /* Lateral Image Pos (BRW) */
    Point3d AP_ImgPos[MXN_TARGET];     /* AP Image Pos (BRW) */

} ANGIO_TARGET;

typedef struct {

Point3d RtFaceBrw[NFIDU_MRKS];     /* BRW coords of R,S,T,U, V,W,X,Y */
    Point3d LtFaceBrw[NFIDU_MRKS];     /* projected to rt & lt face of frame */
    Point2d RT_Tdist[NFIDU_MRKS];      /* A, B, C for AP used for mag factor*/
    Point2d LT_Tdist[NFIDU_MRKS];      /* determination */

Point2d RT_TMdist[NFIDU_MRKS];     /* A, B, C for AP) used for mag factor*/
    Point2d LT_TMdist[NFIDU_MRKS];     /* determination */ float   RtFaceMag[NFIDU_MRKS];     /* Mags for R,S,T,U V,W,X,Y on rt face*/
    float   LtFaceMag[NFIDU_MRKS];     /* Mags for R,S,T,U V,W,X,Y on lt face*/

Point3d LAT_SrcPos[NFIDU_MRKS];    /* Source pos in BRW coords, should */
    Point3d LAT_ImgPos[NFIDU_MRKS];    /* LAT Image pos in BRW coords */

Point3d LatMS_Brw;      /* Mean BRW pos for source in lat view*/
    Point3d LatMFI_Brw;     /* Mean BRW pos for lat fidu image pts*/
    Point2d LatMFI_2D;      /* Mean 2D pos for lat fidu image pts*/

Point3d LatX_UnitVec;   /* Unit vector in BRW space for 2D dx*/
    Point3d LatY_UnitVec;   /* Unit vector in BRW space for 2D dy*/

Point3d AntFaceBrw[NFIDU_MRKS];    /* BRW coords of A,B,C,D E,F,G,H
                                          projected to the anterior face */
    Point3d PostFaceBrw[NFIDU_MRKS];   /* BRW coords of A,B,C,D E,F,G,H
                                          projected to the posterior face */

Point2d POST_Tdist[NFIDU_MRKS];    /* same as _Tdist except for the */
    Point2d ANT_Tdist[NFIDU_MRKS];     /* fiducial points (R, S, T for LAT; */

Point2d POST_TMdist[NFIDU_MRKS];   /* same as _Tdist except for the */
    Point2d ANT_TMdist[NFIDU_MRKS];    /* fiducial points (R, S, T for LAT; */ float   AntFaceMag[NFIDU_MRKS];    /*Mags for A,B,C,D E,F,G,H on ant face*/
    float   PostFaceMag[NFIDU_MRKS];   /*Mags for A,B,C,D E,F,G,H on pos face*/

Point3d AP_SrcPos[NFIDU_MRKS];     /* be the same for all IMG_PT */
    Point3d AP_ImgPos[NFIDU_MRKS];     /* AP Image pos in BRW coords */
```

```
    Point3d AP_MS_Brw;       /* Mean BRW pos for source in AP view*/
    Point3d AP_MFI_Brw;       /* Mean BRW pos for AP fidu image pts*/
    Point2d AP_MFI_2D;       /* Mean 2D pos for AP fidu image pts*/

Point3d AP_X_UnitVec;    /* Unit vector in BRW space for 2D dx*/
    Point3d AP_Y_UnitVec;    /* Unit vector in BRW space for 2D dy*/

} SOURCE_IMG_DATA;

typedef struct {

Point2d SrcPos[2];       /* x, y coords of virtual source pos
                    (S1 and S2) for each face of frame */
    Point2d S1S2DirVec;      /* norm. direction vector of S1 to S2 */
    Point2d MarkerCtr;       /* x, y coords of projected ctr */

Point2d RefDist;         /* Dist from ref markers */

Point2d RefToCtrDist;    /* Dist from ref marker to SC1 and SC2
                    for each face of frame */
} ANGIO_LOC_DATA;

typedef struct {

ANGIO_LOC_DATA POST_FACE;
    ANGIO_LOC_DATA ANT_FACE;
    ANGIO_LOC_DATA LT_FACE;
    ANGIO_LOC_DATA RT_FACE;

} ANGIO_XFORM;

typedef struct { int          FilmType;    /* AP or LAT */
    ANGIO_DATA   AngioData;   /* Angio fiducials */
    CONTOUR_LIST Contours;    /* Angio contours */
    FILM_IMG     Film;        /* Angio film for backprojection */

} ANGIO_VIEW;
```

5. AVM.c

```
/************************************************************************
 * Module Name:  AVM.c                                                    *
 * Module Type:  C program                                                *
 * Subroutines:  1) CompAngioFilmsUnitVec()                               *
 *               2) PrintLocParms() - for debug only                      *
 *               3) SolveQuadratic()                                      *
 *                                                                        *
 * Purpose:   A set of functions to determine the coordinate transformation*
 *            between points in image plane and BRW space for either a LAT *
 *            or AP radiograph with the BRW angio frame.  All eight       *
 *            fiducials of the corresponding view (R,S,T,U,V,W,X,Y) for LAT*
 *            and (A,B,C,D,E,F,G,H) for AP must be present.               *
 *                                                                        *
 ************************************************************************/ include <stdio.h>
include <string.h>
include <math.h> include "../INCLUDE/UserDefs.h"

define    INIT_DECLARATION 1 include "../INCLUDE/Angio.h"

undef INIT_DECLARATION define    EXT_DEF_ONLY    1 include "../INCLUDE/Debug.h"

undef EXT_DEF_ONLY int  SolveQuadratic (Point3d    , Point3d , float *, float *);
```

```
/****************************************************************************
* Module Name: CompAngioFilmsUnitVec()                                      *
* Module Type: C program                                                     *
* Subroutines: 1) AngioLocalize()                                            *
*              2) AngioTargets()                                             *
*              3) CompSourceImgPos()                                         *
*              4) MeanVar()                                                  *
*              5) SolveQuadratic()                                           *
*              5) VecNorm()                                                  *
*                                                                            *
* Purpose:  Compute the unit vectors in the radiographic film (a view - AP   *
*           LAT or AP) of the digitizer 2D coordinate system.  The unit      *
*           vectors correlates the 2D coordinate axes in film with 3D BRW    *
*           (LAT, AP, VERT) in stereotactic space.  The current program      *
*           is structured that both LAT and AP fiducials must be present     *
*                                                                            *
****************************************************************************/ int CompAngioFilmsUnitVec (ANGIO_VIEW *pAngioView,
        SOURCE_IMG_DATA *pSrcImgData)

{

ANGIO_DATA    *pAngioData;
    ANGIO_XFORM   AngioXform;

int i, j, m, n;
    int ViewType;

float    LatSrcPos[NFIDU_MRKS], AP_SrcPos[NFIDU_MRKS];
    float    LatImgPos[NFIDU_MRKS], AP_ImgPos[NFIDU_MRKS];
    float    var1, var2;

Point2d *LAT_Marks, *AP_Marks;
    Point3d *LAT_BrwImgPos, *AP_BrwImgPos;
    Point3d QE1, QE2;       /* coeffs of quadratic equations */
    Point3d U[2], V[2];     /* BRW unit vectors for image grid */
    int Fidx_A1, Fidx_A2, Fidx_B1, Fidx_B2;

float    *UnitVec;

fprintf (stderr, "\tIn CompAngioFilmsUnitVec\n");

pAngioData = &pAngioView->AngioData;

LAT_Marks = pAngioData->LAT_Marks;
    AP_Marks  = pAngioData->AP_Marks;

/*  ** Output Film Data */ if (DEBUG > 1)
```

```
{
printf ("\nLAT Fiducials\n");
for (i = 0; i < NFIDU_MRKS; i++)
    printf ("%2i  %7.3f %7.3f\n", i+1, LAT_Marks[i][0], LAT_Marks[i][1]);
printf ("\nAP Fiducials\n");
for (i = 0; i < NFIDU_MRKS; i++)
    printf ("%2i  %7.3f %7.3f\n", i+1, AP_Marks[i][0], AP_Marks[i][1]);
}

/*  ** Perform Localization */

AngioLocalize (pAngioData, &AngioXform);

AngioTargets (&AngioData, &AngioXform, &AngioTarget);  /*NEEDED since
        TrueRefLeng is calculated here */

CompSourceImgPos (pAngioData, &AngioXform, pSrcImgData);

/*  ** Calculate mean source and position for each LAT and AP view */

/*
    fprintf (stderr, "  i   j    LatSrc    AP_Src    LatImg    AP_Img\n");
*/ for (j = 0; j < 3; j++)           /* BRW Coords */
    {
        for (i = 0; i < NFIDU_MRKS; i++)
        {
        LatSrcPos[i] = pSrcImgData->LAT_SrcPos[i][j];
        AP_SrcPos[i] = pSrcImgData->AP_SrcPos[i][j];
        LatImgPos[i] = pSrcImgData->LAT_ImgPos[i][j];
        AP_ImgPos[i] = pSrcImgData->AP_ImgPos[i][j];
        }

MeanVar (LatSrcPos, NFIDU_MRKS, &pSrcImgData->LatMS_Brw[j],
            &var1, &var2);
        MeanVar (AP_SrcPos, NFIDU_MRKS, &pSrcImgData->AP_MS_Brw[j],
            &var1, &var2);
        MeanVar (LatImgPos, NFIDU_MRKS, &pSrcImgData->LatMFI_Brw[j],
            &var1, &var2);
        MeanVar (AP_ImgPos, NFIDU_MRKS, &pSrcImgData->AP_MFI_Brw[j],
            &var1, &var2);

}
```

```
    for (j = 0; j < 2; j++)        /* 2D Image Coords */
    {
      for (i = 0; i < NFIDU_MRKS; i++)
      {
        LatImgPos[i] = LAT_Marks[i][j];
        AP_ImgPos[i] = AP_Marks[i][j];
      }

MeanVar (LatImgPos, NFIDU_MRKS, &pSrcImgData->LatMFI_2D[j],
         &var1, &var2);
      MeanVar (AP_ImgPos, NFIDU_MRKS, &pSrcImgData->AP_MFI_2D[j],
         &var1, &var2);

} fprintf (stderr, "\nMean Source Pos.:\t\tBRW\n");
    fprintf (stderr, "\tLAT\t");
    fprintf (stderr, "%9.3f %9.3f %9.3f\n", pSrcImgData->LatMS_Brw[0],
       pSrcImgData->LatMS_Brw[1], pSrcImgData->LatMS_Brw[2]);

fprintf (stderr, "\n\tAP\t");
    fprintf (stderr, "%9.3f %9.3f %9.3f\n", pSrcImgData->AP_MS_Brw[0],
       pSrcImgData->AP_MS_Brw[1], pSrcImgData->AP_MS_Brw[2]);

fprintf (stderr, "\nMean Image Pos.:\t\tBRW\t\t\t2D\n");
    fprintf (stderr, "\tLAT\t");
    fprintf (stderr, "%9.3f %9.3f %9.3f        %7.3f %7.3f\n",
       pSrcImgData->LatMFI_Brw[0], pSrcImgData->LatMFI_Brw[1],
       pSrcImgData->LatMFI_Brw[2], pSrcImgData->LatMFI_2D[0],
       pSrcImgData->LatMFI_2D[1]);
    fprintf (stderr, "\n\tAP\t");
    fprintf (stderr, "%9.3f %9.3f %9.3f        %7.3f %7.3f\n",
       pSrcImgData->AP_MFI_Brw[0], pSrcImgData->AP_MFI_Brw[1],
       pSrcImgData->AP_MFI_Brw[2], pSrcImgData->AP_MFI_2D[0],
       pSrcImgData->AP_MFI_2D[1]);

/*  ** Compute unit vectors for dx and dy (2D image grid) in 3D BRW
       coords
*/
/*  ** LATERAL - RT FACE & LT FACE */
/*  ** The following pairs are used: { (R-X), (S-Y)} & {(T-V), (U-W)} */

LAT_BrwImgPos = pSrcImgData->LAT_ImgPos;

for (m = 0; m < 2; m++)
```

```
        {
        Fidx_A1 = LatFiduPairIdx[m];      /* (R-X) and (S-Y) */
        Fidx_A2 = LatFiduPairIdx[m+4];

for (i = 0; i < 2; i++)      /* 2D dx and dy */
            QE1[i] = LAT_Marks[Fidx_A2][i] - LAT_Marks[Fidx_A1][i];

n = m + 2;
        Fidx_B1 = LatFiduPairIdx[n];      /* (T-V) and (U-W) */
        Fidx_B2 = LatFiduPairIdx[n+4];

for (i = 0; i < 2; i++)      /* 2D dx and dy */
            QE2[i] = LAT_Marks[Fidx_B2][i] - LAT_Marks[Fidx_B1][i];

for (j = 0; j < 3; j++)      /* LAT, AP and VERT coords */
        {
            QE1[2]=LAT_BrwImgPos[Fidx_A2][j]-LAT_BrwImgPos[Fidx_A1][j];
            QE2[2]=LAT_BrwImgPos[Fidx_B2][j]-LAT_BrwImgPos[Fidx_B1][j];

SolveQuadratic (QE1, QE2, &U[m][j], &V[m][j]);
        }

} fprintf (stderr, "\nLateral Unit Vectors:\n");
/*
    fprintf (stderr,"\tU = %7.3f, %7.3f, %7.3f\tV = %7.3f, %7.3f, %7.3f\n",
        U[0][0], U[0][1], U[0][2], V[0][0], V[0][1], V[0][2]);
    fprintf(stderr,"\tU = %7.3f, %7.3f, %7.3f\tV = %7.3f, %7.3f, %7.3f\n\n",
        U[1][0], U[1][1], U[1][2], V[1][0], V[1][1], V[1][2]);
*/

UnitVec = pSrcImgData->LatX_UnitVec;
    for (i = 0; i < 3; i++)          /* Calc mean vector */
        UnitVec[i] = U[0][i] + U[1][i];

VecNorm (UnitVec);          /* Normalized it */ fprintf(stderr,"\tNorm U = %7.3f, %7.3f, %7.3f\n",
        UnitVec[0], UnitVec[1], UnitVec[2]);

UnitVec = pSrcImgData->LatY_UnitVec;
    for (i = 0; i < 3; i++)          /* Calc mean vector */
        UnitVec[i] = V[0][i] + V[1][i];

VecNorm (UnitVec);          /* Normalized it */ fprintf(stderr,"\tNorm V = %7.3f, %7.3f, %7.3f\n",
        UnitVec[0], UnitVec[1], UnitVec[2]);
```

```
/*  **  AP - ANT FACE & POST FACE */
/*  **  The following pairs are used: { (A-G), (B-H)} & {(C-E), (D-F)} */

AP_BrwImgPos = pSrcImgData->AP_ImgPos;

for (m = 0; m < 2; m++)

{
        Fidx_A1 = AP_FiduPairIdx[m];      /* (A-G) and (B-H) */
        Fidx_A2 = AP_FiduPairIdx[m+4];

for (i = 0; i < 2; i++)      /* 2D dx and dy */
            QE1[i] = AP_Marks[Fidx_A2][i] - AP_Marks[Fidx_A1][i];

n = m + 2;
        Fidx_B1 = AP_FiduPairIdx[n];      /* (C-E) and (D-F) */
        Fidx_B2 = AP_FiduPairIdx[n+4];

for (i = 0; i < 2; i++)      /* 2D dx and dy */
            QE2[i] = AP_Marks[Fidx_B2][i] - AP_Marks[Fidx_B1][i];

for (j = 0; j < 3; j++)      /* LAT, AP and VERT coords */
        {
            QE1[2]=AP_BrwImgPos[Fidx_A2][j]-AP_BrwImgPos[Fidx_A1][j];
            QE2[2]=AP_BrwImgPos[Fidx_B2][j]-AP_BrwImgPos[Fidx_B1][j];

SolveQuadratic (QE1, QE2, &U[m][j], &V[m][j]);
        }

} fprintf (stderr, "\nAP Unit Vectors:\n");
/*
    fprintf (stderr,"\tU = %7.3f, %7.3f, %7.3f\tV = %7.3f, %7.3f, %7.3f\n",
        U[0][0], U[0][1], U[0][2], V[0][0], V[0][1], V[0][2]);
    fprintf(stderr,"\tU = %7.3f, %7.3f, %7.3f\tV = %7.3f, %7.3f, %7.3f\n\n",
        U[1][0], U[1][1], U[1][2], V[1][0], V[1][1], V[1][2]);
*/

UnitVec = pSrcImgData->AP_X_UnitVec;
    for (i = 0; i < 3; i++)             /* Calc mean vector */
        UnitVec[i] = U[0][i] + U[1][i];

VecNorm (UnitVec);          /* Normalized it */ fprintf(stderr,"\tNorm U = %7.3f, %7.3f, %7.3f\n",
        UnitVec[0], UnitVec[1], UnitVec[2]);
```

```
        UnitVec = pSrcImgData->AP_Y_UnitVec;
        for (i = 0; i < 3; i++)         /* Calc mean vector */
            UnitVec[i] = V[0][i] + V[1][i];

VecNorm (UnitVec);              /* Normalized it */ fprintf(stderr,"\tNorm V = %7.3f, %7.3f, %7.3f\n\n",
            UnitVec[0], UnitVec[1], UnitVec[2]);

/*  ** AP - ANT FACE & POST FACE */
/*  ** The following pairs are used: { (A-G), (B-H)} & {(C-E), (D-F)} */

/*  ** Output Right Face Localization Parameters */ if (DEBUG > 1)

{ printf ("\n\nRIGHT FACE\n\n");
        printf ("S1 = %7.3f, %7.3f,\t\tS2 = %7.3f, %7.3f\n",
         AngioXform.RT_FACE.SrcPos[0][0],AngioXform.RT_FACE.SrcPos[0][1],
         AngioXform.RT_FACE.SrcPos[1][0],AngioXform.RT_FACE.SrcPos[1][1]);
        printf ("Marker Ctr = %7.3f, %7.3f\n",AngioXform.RT_FACE.MarkerCtr[0],
            AngioXform.RT_FACE.MarkerCtr[1]);
        printf ("Ref Dist = %7.3f, %7.3f\n", AngioXform.RT_FACE.RefDist[0],
                AngioXform.RT_FACE.RefDist[1]);
        printf ("RefToCtr Dist = %7.3f, %7.3f\n",
        AngioXform.RT_FACE.RefToCtrDist[0], AngioXform.RT_FACE.RefToCtrDist[1]);

}

/*  ** Output Left Face Localization Parameters */ if (DEBUG > 1)

{ printf ("\n\nLEFT FACE\n\n");
        printf ("S1 = %7.3f, %7.3f,\t\tS2 = %7.3f, %7.3f\n",
         AngioXform.LT_FACE.SrcPos[0][0],AngioXform.LT_FACE.SrcPos[0][1],
         AngioXform.LT_FACE.SrcPos[1][0],AngioXform.LT_FACE.SrcPos[1][1]);
        printf ("Marker Ctr = %7.3f, %7.3f\n",AngioXform.LT_FACE.MarkerCtr[0],
            AngioXform.LT_FACE.MarkerCtr[1]);
        printf ("Ref Dist = %7.3f, %7.3f\n", AngioXform.LT_FACE.RefDist[0],
                AngioXform.LT_FACE.RefDist[1]);
        printf ("RefToCtr Dist = %7.3f, %7.3f\n",
        AngioXform.LT_FACE.RefToCtrDist[0], AngioXform.LT_FACE.RefToCtrDist[1]);
```

}

/* ** Output Anterior Face Localization Parameters */ if (DEBUG > 1)
{ printf ("\n\nANTERIOR FACE\n\n");
printf ("S1 = %7.3f, %7.3f,\t\tS2 = %7.3f, %7.3f\n",
 AngioXform.ANT_FACE.SrcPos[0][0],AngioXform.ANT_FACE.SrcPos[0][1],
 AngioXform.ANT_FACE.SrcPos[1][0],AngioXform.ANT_FACE.SrcPos[1][1]);
printf ("Marker Ctr = %7.3f, %7.3f\n",AngioXform.ANT_FACE.MarkerCtr[0],
    AngioXform.ANT_FACE.MarkerCtr[1]);
printf ("Ref Dist = %7.3f, %7.3f\n", AngioXform.ANT_FACE.RefDist[0],
        AngioXform.ANT_FACE.RefDist[1]);
printf ("RefToCtr Dist = %7.3f, %7.3f\n",
AngioXform.ANT_FACE.RefToCtrDist[0], AngioXform.ANT_FACE.RefToCtrDist[1]);
}

/* ** Output Posterior Face Localization Parameters */ if (DEBUG > 1)

{
printf ("\n\nPOSTERIOR FACE\n\n");
printf ("S1 = %7.3f, %7.3f,\t\tS2 = %7.3f, %7.3f\n",
 AngioXform.POST_FACE.SrcPos[0][0],AngioXform.POST_FACE.SrcPos[0][1],
 AngioXform.POST_FACE.SrcPos[1][0],AngioXform.POST_FACE.SrcPos[1][1]);
printf ("Marker Ctr = %7.3f, %7.3f\n",AngioXform.POST_FACE.MarkerCtr[0],
    AngioXform.POST_FACE.MarkerCtr[1]);
printf ("Ref Dist = %7.3f, %7.3f\n", AngioXform.POST_FACE.RefDist[0],
        AngioXform.POST_FACE.RefDist[1]);
printf ("RefToCtr Dist = %7.3f, %7.3f\n",
AngioXform.POST_FACE.RefToCtrDist[0], AngioXform.POST_FACE.RefToCtrDist[1]);

} printf ("\n\t\t   AP     LAT     VERT\n");

/* ** Output Source Positions */ if (DEBUG > 1)

{
fprintf (stderr, "LAT Source Position\n\n");

```
        for (i = 0; i < 8; i++)
                fprintf (stderr, "%2d:  %9.3f,  %9.3f,  %9.3f\n", i+1,
                        pSrcImgData->LAT_SrcPos[i][0],
                        pSrcImgData->LAT_SrcPos[i][1],
                        pSrcImgData->LAT_SrcPos[i][2]);

fprintf (stderr, "\nLAT Image Position\n\n");
        for (i = 0; i < 8; i++)
                fprintf (stderr, "%2d:  %9.3f,  %9.3f,  %9.3f\n", i+1,
                        pSrcImgData->LAT_ImgPos[i][0],
                        pSrcImgData->LAT_ImgPos[i][1],
                        pSrcImgData->LAT_ImgPos[i][2]);

fprintf (stderr, "\n\nAP Source Position\n\n");

fprintf (stderr, "\n");
        for (i = 0; i < 8; i++)
                fprintf (stderr, "%2d:  %9.3f,  %9.3f,  %9.3f\n", i+1,
                        pSrcImgData->AP_SrcPos[i][0],
                        pSrcImgData->AP_SrcPos[i][1],
                        pSrcImgData->AP_SrcPos[i][2]);

fprintf (stderr, "\nAP Image Position\n\n");

fprintf (stderr, "\n");
        for (i = 0; i < 8; i++)
                fprintf (stderr, "%2d:  %9.3f,  %9.3f,  %9.3f\n", i+1,
                        pSrcImgData->AP_ImgPos[i][0],
                        pSrcImgData->AP_ImgPos[i][1],
                        pSrcImgData->AP_ImgPos[i][2]);

} fprintf (stderr, "\t--> Exit CompAngioFilmsUnitVec\n");
}

/* PrintLocParms.c */

PrintLocParms()

{ int i;

int Ntarget;

float    *RtFaceBrw, *LtFaceBrw, *AntFaceBrw, *PostFaceBrw;
```

```
        Ntarget = AngioTarget.Ntarget;

/*    ** Output Right Face Localization Parameters */ printf ("\n\nRIGHT FACE\n\n");
        printf ("S1 = %7.3f, %7.3f,\t\tS2 = %7.3f, %7.3f\n",
          AngioXform.RT_FACE.SrcPos[0][0],AngioXform.RT_FACE.SrcPos[0][1],
          AngioXform.RT_FACE.SrcPos[1][0],AngioXform.RT_FACE.SrcPos[1][1]);
        printf ("Marker Ctr = %7.3f, %7.3f\n",AngioXform.RT_FACE.MarkerCtr[0],
                AngioXform.RT_FACE.MarkerCtr[1]);
        printf ("Ref Dist = %7.3f, %7.3f\n", AngioXform.RT_FACE.RefDist[0],
                AngioXform.RT_FACE.RefDist[1]);
      . printf ("RefToCtr Dist = %7.3f, %7.3f\n",
        AngioXform.RT_FACE.RefToCtrDist[0], AngioXform.RT_FACE.RefToCtrDist[1]);

for (i = 0; i < Ntarget; i++)
                printf ("Target Dist = %7.3f, %7.3f\n", AngioTarget.RT_Tdist[0],
                        AngioTarget.RT_Tdist[1]);

/*    ** Output Left Face Localization Parameters */ printf ("\n\nLEFT FACE\n\n");
        printf ("S1 = %7.3f, %7.3f,\t\tS2 = %7.3f, %7.3f\n",
          AngioXform.LT_FACE.SrcPos[0][0],AngioXform.LT_FACE.SrcPos[0][1],
          AngioXform.LT_FACE.SrcPos[1][0],AngioXform.LT_FACE.SrcPos[1][1]);
        printf ("Marker Ctr = %7.3f, %7.3f\n",AngioXform.LT_FACE.MarkerCtr[0],
                AngioXform.LT_FACE.MarkerCtr[1]);
        printf ("Ref Dist = %7.3f, %7.3f\n", AngioXform.LT_FACE.RefDist[0],
                AngioXform.LT_FACE.RefDist[1]);
        printf ("RefToCtr Dist = %7.3f, %7.3f\n",
        AngioXform.LT_FACE.RefToCtrDist[0], AngioXform.LT_FACE.RefToCtrDist[1]);

for (i = 0; i < Ntarget; i++)
                printf ("Target Dist = %7.3f, %7.3f\n", AngioTarget.LT_Tdist[0],
                        AngioTarget.LT_Tdist[1]);

/*    ** Output Anterior Face Localization Parameters */ printf ("\n\nANTERIOR FACE\n\n");
        printf ("S1 = %7.3f, %7.3f,\t\tS2 = %7.3f, %7.3f\n",
          AngioXform.ANT_FACE.SrcPos[0][0],AngioXform.ANT_FACE.SrcPos[0][1]

AngioXform.ANT_FACE.SrcPos[1][0],AngioXform.ANT_FACE.SrcPos[1][1]
);
        printf ("Marker Ctr = %7.3f, %7.3f\n",AngioXform.ANT_FACE.MarkerCtr[0],
                AngioXform.ANT_FACE.MarkerCtr[1]);
        printf ("Ref Dist = %7.3f, %7.3f\n", AngioXform.ANT_FACE.RefDist[0],
                AngioXform.ANT_FACE.RefDist[1]);
        printf ("RefToCtr Dist = %7.3f, %7.3f\n",
```

```
                AngioXform.ANT_FACE.RefToCtrDist[0], AngioXform.ANT_FACE.RefToCtrDist[1]
);
                printf ("Tdist = %7.3f, %7.3f\n",
                AngioTarget.ANT_Tdist[0], AngioTarget.ANT_Tdist[1]);

/*       ** Output Posterior Face Localization Parameters */ printf ("\n\nPOSTERIOR FACE\n\n");
                printf ("S1 = %7.3f, %7.3f,\t\tS2 = %7.3f, %7.3f\n",
                 AngioXform.POST_FACE.SrcPos[0][0],AngioXform.POST_FACE.SrcPos[0][
1],
                 AngioXform.POST_FACE.SrcPos[1][0],AngioXform.POST_FACE.SrcPos[1][
1]);
                printf ("Marker Ctr = %7.3f, %7.3f\n",AngioXform.POST_FACE.MarkerCtr[0],
                        AngioXform.POST_FACE.MarkerCtr[1]);
                printf ("Ref Dist = %7.3f, %7.3f\n", AngioXform.POST_FACE.RefDist[0],
                        AngioXform.POST_FACE.RefDist[1]);
                printf ("RefToCtr Dist = %7.3f, %7.3f\n",
                AngioXform.POST_FACE.RefToCtrDist[0], AngioXform.POST_FACE.RefToCtrDist[
1]);
                printf ("Tdist = %7.3f, %7.3f\n",
                AngioTarget.POST_Tdist[0], AngioTarget.POST_Tdist[1]);

printf ("\n\t\t   AP      LAT     VERT\n");

for (i = 0; i < Ntarget; i++)
                   {

/*       ** Output Target intercepts for each face */

RtFaceBrw = AngioTarget.RtFaceBrw[i];
                   printf ("\nRt face\t\t%9.2f, %9.2f, %9.2f\n",
                        RtFaceBrw[1], AngioTarget.RtFaceBrw[i][0], RtFaceBrw[2]);

LtFaceBrw = AngioTarget.LtFaceBrw[i];
                   printf ("Lt face\t\t%9.2f, %9.2f, %9.2f\n",
                        LtFaceBrw[1], AngioTarget.LtFaceBrw[i][0], LtFaceBrw[2]);

AntFaceBrw = AngioTarget.AntFaceBrw[i];
                   printf ("Ant face\t%9.2f, %9.2f, %9.2f\n",
                AntFaceBrw[1], AngioTarget.AntFaceBrw[i][0], AntFaceBrw[2]);

PostFaceBrw = AngioTarget.PostFaceBrw[i];
                   printf ("Post face\t%9.2f, %9.2f, %9.2f\n",
                PostFaceBrw[1], PostFaceBrw[0], PostFaceBrw[2]);
                   }
```

}
/*************************************************************************
 * Module Name:   SolveQuadratic()                                        *
 * Module Type:   C program                                               *
 *                                                                        *
 * Purpose: Solve quadratic equation.                                     *
 *                                                                        *
 *************************************************************************/ int SolveQuadratic (Point3d   QE1, Point3d QE2, float *pu, float *pv)

{
    float    det, inv_det;

if (DEBUG > 1)
        fprintf (stderr, "\tIn SolveQuadratic\n");

det = QE1[0] * QE2[1] - QE1[1] * QE2[0];

if (fabs (det) < 1.0e-6)
       {
       fprintf (stderr, "ERROR in SolveQuadratic:  Zero derterminant\n");
       exit (-1);
       } inv_det = 1.0 / det;

*pu = inv_det * (QE2[1] * QE1[2] - QE1[1] * QE2[2]);
    *pv = inv_det * (-QE2[0] * QE1[2] + QE1[0] * QE2[2]);

if (DEBUG > 1)
        fprintf (stderr, "\t-->Exit SolveQuadratic\n");

return (0);
}
```

6. Angio.c

```
/***********************************************************************
 *  Module Name:   Angio.c                                              *
 *  Module Type:   C programs                                           *
 *  Subroutines:   1) AngioLocalize()                                   *
 *                 2) AngioLocFace()                                    *
 *                 3) AngioLocTarget()                                  *
 *                 4) AngioTargets()                                    *
 *                 5) CompTargetMag()                                   *
 *                 6) LocTargetBrw()                                    *
 *                 7) ReadAngioFilmData()                               *
 *                 8) SetFaceIntercept()                                *
 *                 9) SetRefMarksIdx()                                  *
 *                                                                      *
 *  Purpose:   A library of C routines for radiographic localization    *
 *             using the BRW angio frame.                               *
 *                                                                      *
 ***********************************************************************/ include <stdio.h>
include <string.h>
include <math.h>
include "../INCLUDE/UserDefs.h"

define    EXT_DEF_ONLY    1 include "../INCLUDE/Angio.h"
include "../INCLUDE/File_IO_Lib.h"
include "../INCLUDE/Debug.h"

undef EXT_DEF_ONLY static   int   Colon = ':';
static   int   Equal = '=';

char     *MatchChar();

/***********************************************************************
 *  Module Name: AngioLocalize.c                                        *
 *  Module Type: C program                                              *
 *  Subroutines: 1) AngioLocFace()                                      *
 *                                                                      *
 *                                                                      *
 *  Purpose:   Function to perform angio localization.  This computes the *
 *             virtual source positions and the ray intercepts to determine *
 *             alpha, beta and gamma parameters.                        *
 ***********************************************************************/

AngioLocalize (pAngioData, pAngioXform)

/*  ** INPUT */
ANGIO_DATA      *pAngioData;

/*  ** OUTPUT */
ANGIO_XFORM     *pAngioXform;    /* struct to store parameters determined by
                 AngioLocFace( ) */

{
```

```
    ANGIO_LOC_DATA  *pAngioLocData;
    Point2d  *AngioMarks;

if (DEBUG)
        fprintf (stderr, "\tIn AngioLocalize\n");

/* ** LATERAL VIEW */
    AngioMarks = pAngioData->LAT_Marks;      /* LAT MARKS */

/* * Right Face */
    pAngioLocData = &pAngioXform->RT_FACE;    /* RT FACE - R,S,T,U */
    AngioLocFace (AngioMarks, pAngioLocData, RT_FACE_ID);

/* * Left Face */
    pAngioLocData = &pAngioXform->LT_FACE;    /* LT FACE - V,W,X,Y */
    AngioLocFace (AngioMarks, pAngioLocData, LT_FACE_ID);

/* ** AP VIEW */
    AngioMarks = pAngioData->AP_Marks;       /* AP MARKS */

/* * Anterior Face */
    pAngioLocData = &pAngioXform->ANT_FACE;   /* ANT FACE - D,C,B,A */
    AngioLocFace (AngioMarks, pAngioLocData, ANT_FACE_ID);

/* * Posterior Face */
    pAngioLocData = &pAngioXform->POST_FACE;  /* POS FACE - H,G,F,E */
    AngioLocFace (AngioMarks, pAngioLocData, POST_FACE_ID);

if (DEBUG)
        fprintf (stderr, "\t--> Exit AngioLocalize\n");
}

/******************************************************************************
 *  Module Name:  AngioLocFace.c                                              *
 *  Module Type:  C program                                                   *
 *                                                                            *
 *  Purpose:  Function to perform angio localization of the given face of     *
 *            the angio frame.                                                *
 *                                                                            *
 *  Subroutines: 1) SetRefMarksIdx()                                          *
 *               2) LineIntercept()                                           *
 *               3) ComputeDist_2D()                                          *
 *                                                                            *
 ******************************************************************************/

AngioLocFace (AngioMarks, pAngioLocData, FaceId)

/* ** INPUT */
Point2d    *AngioMarks;
int        FaceId;
```

```
int     FaceId;

/* ** OUTPUT */
ANGIO_LOC_DATA *pAngioLocData;   /* struct to store S1, S2, S1S2, Dist(SC1),
                Dist(SC2) */

{
static  int     SetMagRefLeng = 1;

int i;
        int Idir;
        int V1_idx, V2_idx, V3_idx, V4_idx;

Point2d TmpPoint;
        float   *Source_1, *Source_2, *MarkerCtr;
        float   d1, d2;
        double  delta, sum, sf;

if (DEBUG > 1)
            fprintf (stderr, "\t\tIn AngioLocFace\n");

/* ** Set up indices for fiducial markers for the given angio face */

SetRefMarksIdx (&V1_idx, &V2_idx, &V3_idx, &V4_idx, FaceId);

/* ** Set length of reference line segment (arbitrarily decided) to be
        used for computing mag factor for target point. Physical dimension
        of distances in the digitized film must be known for correct mag
        factor computation.
*/
        if (SetMagRefLeng)
            {
            CompDist_2D (AngioMarks[V1_idx], AngioMarks[V3_idx], &d1);
            CompDist_2D (AngioMarks[V2_idx], AngioMarks[V4_idx], &d2);
            MagRefLeng = 0.3 * MAX(d1,d2);  /* approx 1/3 of diagonal dist */

SetMagRefLeng = 0;  /* set once only */
            }

/* ** N.B. Idir not utilized here */
/* ** Compute S1 */
        Source_1 = pAngioLocData->SrcPos[0];    /* S1 */
        LineIntercept (AngioMarks[V2_idx], AngioMarks[V3_idx],
            AngioMarks[V1_idx], AngioMarks[V4_idx], Source_1, &Idir);

/* ** Compute SC */
        MarkerCtr = pAngioLocData->MarkerCtr;
        LineIntercept (AngioMarks[V1_idx], AngioMarks[V3_idx],
            AngioMarks[V2_idx], AngioMarks[V4_idx], MarkerCtr, &Idir);
```

```
/*  ** Compute SC1 */
    LineIntercept (AngioMarks[V1_idx], AngioMarks[V2_idx], Source_1,
        MarkerCtr, TmpPoint, &ldir);

CompDist_2D (AngioMarks[V2_idx], AngioMarks[V1_idx], &d1);
    CompDist_2D (AngioMarks[V2_idx], TmpPoint, &d2);

pAngioLocData->RefDist[0] = d1;
    pAngioLocData->RefToCtrDist[0] = d2;

/*  ** Compute S2 */
    Source_2 = pAngioLocData->SrcPos[1];      /* S2 */
    LineIntercept (AngioMarks[V1_idx], AngioMarks[V2_idx],
        AngioMarks[V4_idx], AngioMarks[V3_idx], Source_2, &ldir);

/*  ** Compute SC2 */
    LineIntercept (AngioMarks[V2_idx], AngioMarks[V3_idx], Source_2,
        MarkerCtr, TmpPoint, &ldir);

CompDist_2D (AngioMarks[V2_idx], AngioMarks[V3_idx], &d1);
    CompDist_2D (AngioMarks[V2_idx], TmpPoint, &d2);

pAngioLocData->RefDist[1] = d1;
    pAngioLocData->RefToCtrDist[1] = d2;

/*  ** Compute normalized direction vector for S1 to S2 - (needed for
       mag factor determination of targets)
*/
    sum = 0.0;
    for (i = 0; i < 2; i++)
        {
        delta = Source_1[i] - Source_2[i];
        pAngioLocData->S1S2DirVec[i] = delta;
        sum += delta * delta;
        } sf = 1.0 / sqrt (sum);

for (i = 0; i < 2; i++)
        pAngioLocData->S1S2DirVec[i] *= sf;

if (DEBUG > 1)
        fprintf (stderr, "\t\t--> Exit AngioLocFace\n");
}
```

```
/****************************************************************************
* Module Name:  AngioLocTarget.c                                            *
* Module Type:  C program                                                   *
*                                                                            *
* Subroutines: 1) SetRefMarksIdx()                                          *
*              2) LineIntercept()                                           *
*              3) ComputeDist_2D()                                          *
*                                                                            *
* Purpose:     Function to perform localization of an angio target. The     *
*              virtual source positions were used to determine the fractional*
*              distance of the projected target point from the reference    *
*              fiducial mark on each of the face for both LAT and AP views. *
*              The same is done for an arbitraily selected point (along a   *
*              line originating from the projected target and parallel to the*
*              line joining the two virtual sources). This information is   *
*              used in SetFaceIntercept() to determine the BRW coordinates of*
*              the intercepts that the rayline through the target made to each*
*              face.                                                         *
*                                                                            *
****************************************************************************/

AngioLocTarget (AngioMarks, pAngioLocData, TargetPos, TargetDist,
        MagRefDist, FaceId)

/* ** INPUT */
Point2d     *AngioMarks;
ANGIO_LOC_DATA *pAngioLocData;
float       *TargetPos;
int     FaceId;

/* ** OUTPUT */
float       *TargetDist, *MagRefDist;

{
    int i;
    int V1_idx, V2_idx, V3_idx, V4_idx;
    int Idir1, Idir2;

Point2d MagRefPt;
    Point2d TmpPoint;
    float   *Source_1, *Source_2;
    float   d1, d2;

if (DEBUG > 1)
        fprintf (stderr, "\t\t\tIn AngioLocTarget\n");

/* ** Set up indices for fiducial markers for the given angio face */

SetRefMarksIdx (&V1_idx, &V2_idx, &V3_idx, &V4_idx, FaceId);

/* ** Compute ST1 */
    Source_1 = pAngioLocData->SrcPos[0];    /* S1 */
    LineIntercept (AngioMarks[V2_idx], AngioMarks[V1_idx], Source_1,
        TargetPos, TmpPoint, &Idir1);
```

```
        CompDist_2D (AngioMarks[V2_idx], TmpPoint, &d1);

/*  ** Compute ST2 */
        Source_2 = pAngioLocData->SrcPos[1];      /* S2 */
        LineIntercept (AngioMarks[V2_idx], AngioMarks[V3_idx], Source_2,
            TargetPos, TmpPoint, &ldir2);

CompDist_2D (AngioMarks[V2_idx], TmpPoint, &d2);

TargetDist[0] = (ldir1 > 0) ? d1 : -d1;
        TargetDist[1] = (ldir2 > 0) ? d2 : -d2;

/*  ** Repeat above for Referece point for mag factor determination */ for (i = 0; i < 2; i++)
            MagRefPt[i] = TargetPos[i] + MagRefLeng*pAngioLocData->S1S2DirVec[i];

/*  ** Compute STM1 */
        LineIntercept (AngioMarks[V2_idx], AngioMarks[V1_idx], Source_1,
            MagRefPt, TmpPoint, &ldir1);

CompDist_2D (AngioMarks[V2_idx], TmpPoint, &d1);

/*  ** Compute STM2 */
        LineIntercept (AngioMarks[V2_idx], AngioMarks[V3_idx], Source_2,
             MagRefPt, TmpPoint, &ldir2);

CompDist_2D (AngioMarks[V2_idx], TmpPoint, &d2);

MagRefDist[0] = (ldir1 > 0) ? d1 : -d1;
        MagRefDist[1] = (ldir2 > 0) ? d2 : -d2;

if (DEBUG > 1)
        fprintf (stderr, "\t\t\t-->Exit AngioLocTarget\n");

}
```

```
/***************************************************************************
* Module Name:  AngioTargets.c                                             *
* Module Type:  C program                                                  *
*                                                                          *
* Subroutines: 1) AngioLocTarget()                                         *
*              2) SetFaceIntercept()                                       *
*              3) LocTargetBrw()                                           *
*              4) CompDist()                                               *
*              5) CompTargetMag()                                          *
*                                                                          *
* Purpose:  Function to perform localization of angio targets.  For each   *
*           target, the subroutine AngioLocTarget() is called to compute   *
*           the distances from the reference marker to the intercepts      *
*           (ST1 and SP2). Alpha, beta and gamma factors are then          *
*           determined, the BRW coordinates of the intercepts to each      *
*           angio face are calculated by SetFaceIntercept().  The BRW      *
*           coordinates of the best estimated target position is           *
*           determined by LocTargetBrw().  The target magnification is     *
*           computed by CompTargetMag().                                   *
*                                                                          *
***************************************************************************/

AngioTargets (pAngioData, pAngioXform, pAngioTarget)

/* ** INPUT */
ANGIO_DATA      *pAngioData;
ANGIO_XFORM     *pAngioXform;

/* ** OUTPUT */
ANGIO_TARGET    *pAngioTarget;

{
    int i;
    int Ntarget, TargetIdx;
    float   dist;

ANGIO_LOC_DATA *pAngioLocData;

Point3d MagRefPtBrw;
    Point2d *LAT_Marks, *AP_Marks;
    Point2d *LAT_Targets, *AP_Targets;
    Point2d TmpPoint;

if (DEBUG);
        fprintf (stderr, "\t\tIn AngioTargets\n");

Ntarget = pAngioTarget->Ntarget;

LAT_Marks = pAngioData->LAT_Marks;      /* LAT MARKS */
    AP_Marks  = pAngioData->AP_Marks;       /* AP MARKS */

LAT_Targets = pAngioTarget->LAT_Targets;
    AP_Targets  = pAngioTarget->AP_Targets;
```

```
/*  ** Set up true physical distance for reference line in film */
    TrueRefLeng = MagRefLeng * FilmDistUnit;

for (i = 0; i < Ntarget; i++)
    {

TargetIdx = i;

/*      ** LATERAL VIEW */

/*      ** Right Face */
        pAngioLocData = &pAngioXform->RT_FACE;  /* RT FACE - R,S,T,U */

AngioLocTarget (LAT_Marks, pAngioLocData, LAT_Targets[i],
            pAngioTarget->RT_Tdist, pAngioTarget->RT_TMdist,
            RT_FACE_ID);

SetFaceIntercept (pAngioLocData->RefToCtrDist,
            pAngioLocData->RefDist, pAngioTarget->RT_Tdist,
            RefMarkBrw[RT_FACE_ID-1], pAngioTarget->RtFaceBrw[i],
            LAT_VIEW_ID);

/*      ** Repeat for mag factor reference point */
        SetFaceIntercept (pAngioLocData->RefToCtrDist,
            pAngioLocData->RefDist, pAngioTarget->RT_TMdist,
            RefMarkBrw[RT_FACE_ID-1], MagRefPtBrw, LAT_VIEW_ID);

ComputeDist (pAngioTarget->RtFaceBrw[i], MagRefPtBrw,
            &dist);

/*      ** Compute and save mag factor for each face */
        pAngioTarget->RtFaceMag[i] = TrueRefLeng / dist;

/*      ** Left Face */
        pAngioLocData = &pAngioXform->LT_FACE;  /* LT FACE - V,W,X,Y */

AngioLocTarget (LAT_Marks, pAngioLocData, LAT_Targets[i],
            pAngioTarget->LT_Tdist, pAngioTarget->LT_TMdist,
            LT_FACE_ID);

SetFaceIntercept (pAngioLocData->RefToCtrDist,
            pAngioLocData->RefDist, pAngioTarget->LT_Tdist,
            RefMarkBrw[LT_FACE_ID-1], pAngioTarget->LtFaceBrw[i],
            LAT_VIEW_ID);

/*      ** Repeat for mag factor reference point */
        SetFaceIntercept (pAngioLocData->RefToCtrDist,
            pAngioLocData->RefDist, pAngioTarget->LT_TMdist,
            RefMarkBrw[LT_FACE_ID-1], MagRefPtBrw, LAT_VIEW_ID);
```

```
            ComputeDist (pAngioTarget->LtFaceBrw[i], MagRefPtBrw,
                &dist);

/*      ** Compute and save mag factor for each face */
            pAngioTarget->LtFaceMag[i] = TrueRefLeng / dist;

/*      ** AP VIEW */

/*      ** Anterior Face */
            pAngioLocData = &pAngioXform->ANT_FACE; /* ANT FACE - D,C,B,A */

AngioLocTarget (AP_Marks, pAngioLocData, AP_Targets[i],
                pAngioTarget->ANT_Tdist, pAngioTarget->ANT_TMdist,
                ANT_FACE_ID);

SetFaceIntercept (pAngioLocData->RefToCtrDist,
                pAngioLocData->RefDist, pAngioTarget->ANT_Tdist,
                RefMarkBrw[ANT_FACE_ID-1], pAngioTarget->AntFaceBrw[i],
                AP_VIEW_ID);

/*      ** Repeat for mag factor reference point */
            SetFaceIntercept (pAngioLocData->RefToCtrDist,
                pAngioLocData->RefDist, pAngioTarget->ANT_TMdist,
                RefMarkBrw[ANT_FACE_ID-1], MagRefPtBrw, AP_VIEW_ID);

ComputeDist (pAngioTarget->AntFaceBrw[i], MagRefPtBrw,
                &dist);

/*      ** Compute and save mag factor for each face */
            pAngioTarget->AntFaceMag[i] = TrueRefLeng / dist;

/*      ** Posterior Face */
            pAngioLocData = &pAngioXform->POST_FACE; /* POST FACE-H,G,F,E */

AngioLocTarget (AP_Marks, pAngioLocData, AP_Targets[i],
                pAngioTarget->POST_Tdist, pAngioTarget->POST_TMdist,
                POST_FACE_ID);

SetFaceIntercept (pAngioLocData->RefToCtrDist,
                pAngioLocData->RefDist, pAngioTarget->POST_Tdist,
                RefMarkBrw[POST_FACE_ID-1], pAngioTarget->PostFaceBrw[i],
                AP_VIEW_ID);

/*      ** Repeat for mag factor reference point */
            SetFaceIntercept (pAngioLocData->RefToCtrDist,
                pAngioLocData->RefDist, pAngioTarget->POST_TMdist,
                RefMarkBrw[POST_FACE_ID-1], MagRefPtBrw, AP_VIEW_ID);
```

```
            ComputeDist (pAngioTarget->PostFaceBrw[i], MagRefPtBrw,
                    &dist);

/*      ** Compute and save mag factor for each face */
        pAngioTarget->PostFaceMag[i] = TrueRefLeng / dist;

/*          ** Now determine the originating target position */

LocTargetBrw (pAngioTarget, TargetIdx);

/*      ** Determine mag factor for target */

CompTargetMag (pAngioTarget, TargetIdx);

} if (DEBUG)
        fprintf (stderr, "\t\t--> Exit AngioTargets\n");

}

/*************************************************************************
 *  Module Name:  CompSourceImgPos.c                                      *
 *  Module Type:  C program                                               *
 *                                                                        *
 *  Subroutines:  1) AngioLocTarget()                                     *
 *                2) SetFaceIntercept()                                   *
 *                3) ComputeDist()                                        *
 *                                                                        *
 *  Purpose:      Function to determine source and image positions for each view *
 *                in BRW coords.  For the LAT VIEW, the fiducials R, S, T are    *
 *                used, whereas for AP VIEW, A, B, C are used.  The Source and   *
 *                Image positions are calculated from the front/back mag factors *
 *                and the boundary conditions for Source Point and Image Point   *
 *                                                                        *
 *************************************************************************/

CompSourceImgPos (pAngioData, pAngioXform, pSourceImgData)

/* ** INPUT */
ANGIO_DATA      *pAngioData;
ANGIO_XFORM     *pAngioXform;

/* ** OUTPUT */
SOURCE_IMG_DATA     *pSourceImgData;

{
    ANGIO_LOC_DATA *pAngioLocData;

int i, j, k;
```

```
        Point2d  *LAT_Marks, *AP_Marks;

Point3d  *RtFaceBrw, *LtFaceBrw, *AntFaceBrw, *PostFaceBrw;
    float    RtFaceMag, LtFaceMag, AntFaceMag, PostFaceMag;
    float    InvMag, delta_S, delta_I, dist;

Point3d MagRefPtBrw;
    float   *SrcPos, *ImagePos;

if (DEBUG)
        fprintf (stderr, "\t\tIn CompSourceImgPos\n");

/*  ** LAT VIEW, use right face fiducials R, S, T */

LAT_Marks = pAngioData->LAT_Marks;          /* LAT MARKS */

RtFaceBrw = pSourceImgData->RtFaceBrw;
    LtFaceBrw = pSourceImgData->LtFaceBrw;

for (i = 0; i < 8; i++)         /* R, S, T, U, V, W, X, Y */

{
    SrcPos   = pSourceImgData->LAT_SrcPos[i];
    ImagePos = pSourceImgData->LAT_ImgPos[i];

/*      ** Rt Face */
    pAngioLocData = &pAngioXform->RT_FACE;

AngioLocTarget (LAT_Marks, pAngioLocData, LAT_Marks[i],
        pSourceImgData->RT_Tdist[i], pSourceImgData->RT_TMdist[i],
        RT_FACE_ID);

/*      ** Determine intercepts on Rt Face (only needed for V,W,X,Y */
    if (i < 4)              /* R,S,T,U just copy its BRW coords */
        for (j = 0; j < 3; j++)
            RtFaceBrw[i][j] = LAT_Fiducials[i][j];

else        /* V,W,X,Y - needs calculation */

SetFaceIntercept (pAngioLocData->RefToCtrDist,
                pAngioLocData->RefDist, pSourceImgData->RT_Tdist[i],
                RefMarkBrw[RT_FACE_ID-1], RtFaceBrw[i], LAT_VIEW_ID);

/*      ** Determine intercept of reference point for mag factor
        determination */

SetFaceIntercept (pAngioLocData->RefToCtrDist,
            pAngioLocData->RefDist, pSourceImgData->RT_TMdist[i],
            RefMarkBrw[RT_FACE_ID-1], MagRefPtBrw, LAT_VIEW_ID);
```

```
         ComputeDist (RtFaceBrw[i], MagRefPtBrw, &dist);

RtFaceMag = pSourceImgData->RtFaceMag[i] = TrueRefLeng / dist;

/*    ** Lt Face */
         pAngioLocData = &pAngioXform->LT_FACE;

AngioLocTarget (LAT_Marks, pAngioLocData, LAT_Marks[i],
            pSourceImgData->LT_Tdist[i], pSourceImgData->LT_TMdist[i],
            LT_FACE_ID);

/*    ** Determine intercepts on Lt Face (only needed for R,S,T,U */
         if (i >= 4)            /* V,W,X,Y just copy its BRW coords */
            for (j = 0; j < 3; j++)
               LtFaceBrw[i][j] = LAT_Fiducials[i][j];

else                   /* V,W,X,Y - needs calculation */

SetFaceIntercept (pAngioLocData->RefToCtrDist,
               pAngioLocData->RefDist, pSourceImgData->LT_Tdist[i],
               RefMarkBrw[LT_FACE_ID-1], LtFaceBrw[i], LAT_VIEW_ID);

/*    ** Repeat with reference point for mag factor determination */

SetFaceIntercept (pAngioLocData->RefToCtrDist,
            pAngioLocData->RefDist, pSourceImgData->LT_TMdist[i],
            RefMarkBrw[LT_FACE_ID-1], MagRefPtBrw, LAT_VIEW_ID);

ComputeDist (LtFaceBrw[i], MagRefPtBrw, &dist);

LtFaceMag = pSourceImgData->LtFaceMag[i] = TrueRefLeng / dist;

/*    ** Compute Source and Image Positions */

InvMag = 1.0 / RtFaceMag;

delta_S = -InvMag / (1.0 / LtFaceMag - InvMag);
         delta_I = (1.0 - InvMag) / (1.0 / LtFaceMag - InvMag);

for (j = 0; j < 3; j++)
         SrcPos[j] = RtFaceBrw[i][j] + delta_S *
            (LtFaceBrw[i][j] - RtFaceBrw[i][j]);

for (j = 0; j < 3; j++)
         ImagePos[j] = RtFaceBrw[i][j] + delta_I *
            (LtFaceBrw[i][j] - RtFaceBrw[i][j]);
      }
```

```
/*      ** AP VIEW, use anterior face fiducials A, B, C */

AP_Marks = pAngioData->AP_Marks;           /* AP MARKS */

AntFaceBrw = pSourceImgData->AntFaceBrw;
        PostFaceBrw = pSourceImgData->PostFaceBrw;

for (i = 0; i < 8; i++)       /* A, B, C, D, E, F, G, H */

{
        SrcPos = pSourceImgData->AP_SrcPos[i];
        ImagePos = pSourceImgData->AP_ImgPos[i];

/*      ** Anterior Face */
        pAngioLocData = &pAngioXform->ANT_FACE;

AngioLocTarget (AP_Marks, pAngioLocData, AP_Marks[i],
                pSourceImgData->ANT_Tdist[i], pSourceImgData->ANT_TMdist[i],
                ANT_FACE_ID);

if (i < 4)       /* A,B,C,D -just copied its BRW coords*/
            for (j = 0; j < 3; j++)
                pSourceImgData->AntFaceBrw[i][j] = AP_Fiducials[i][j];

else    /* E,F,G,H - needs calculation */

SetFaceIntercept (pAngioLocData->RefToCtrDist,
                    pAngioLocData->RefDist, pSourceImgData->ANT_Tdist[i],
                    RefMarkBrw[ANT_FACE_ID-1], AntFaceBrw[i], AP_VIEW_ID);

/*      ** Determine intercept of reference point for mag factor
           determination */

SetFaceIntercept (pAngioLocData->RefToCtrDist,
                pAngioLocData->RefDist, pSourceImgData->ANT_TMdist[i],
                RefMarkBrw[ANT_FACE_ID-1], MagRefPtBrw, AP_VIEW_ID);

ComputeDist (AntFaceBrw[i], MagRefPtBrw, &dist);

AntFaceMag = pSourceImgData->AntFaceMag[i] = TrueRefLeng / dist;

/*      ** Posterior Face */
        pAngioLocData = &pAngioXform->POST_FACE;

AngioLocTarget (AP_Marks, pAngioLocData, AP_Marks[i],
                pSourceImgData->POST_Tdist[i], pSourceImgData->POST_TMdist[i],
                POST_FACE_ID);
```

```
        if (i > = 4)        /* E,F,G,H -just copied its BRW coords*/
            for (j = 0; j < 3; j++)
                    pSourceImgData->PostFaceBrw[i][j] = AP_Fiducials[i][j];

else        /* A,B,C,D - needs calculation */

SetFaceIntercept (pAngioLocData->RefToCtrDist,
                pAngioLocData->RefDist, pSourceImgData->POST_Tdist[i],
                RefMarkBrw[POST_FACE_ID-1], PostFaceBrw[i], AP_VIEW_ID);

/*      ** Repeat with reference point for mag factor determination */

SetFaceIntercept (pAngioLocData->RefToCtrDist,
                pAngioLocData->RefDist, pSourceImgData->POST_TMdist[i],
                RefMarkBrw[POST_FACE_ID-1], MagRefPtBrw, AP_VIEW_ID);

ComputeDist (PostFaceBrw[i], MagRefPtBrw, &dist);

PostFaceMag = pSourceImgData->PostFaceMag[i] = TrueRefLeng / dist;

/*      ** Compute Source and Image Positions */

InvMag = 1.0 / AntFaceMag;
        delta_S = -InvMag / (1.0 / PostFaceMag - InvMag);
        delta_I = ( 1.0 - InvMag) / (1.0 / PostFaceMag - InvMag);

for (j = 0; j < 3; j++)
                SrcPos[j] = AntFaceBrw[i][j] + delta_S *
                (PostFaceBrw[i][j] - AntFaceBrw[i][j]);

for (j = 0; j < 3; j++)
                ImagePos[j] = AntFaceBrw[i][j] + delta_I *
                    (PostFaceBrw[i][j] - AntFaceBrw[i][j]);
        } if (DEBUG)
        fprintf (stderr, "\t\t-->Exit CompSourceImgPos\n");
}
```

```
/****************************************************************************
*   Module Name:   CompTargetMag.c                                          *
*   Module Type:   C program                                                *
*                                                                           *
*   Subroutines: NONE                                                       *
*                                                                           *
*   Purpose:  Function to determine mag factor for target                   *
*                                                                           *
****************************************************************************/
```

CompTargetMag (pAngioTarget, TargetIdx)

```
/*  ** INPUT */
ANGIO_TARGET    *pAngioTarget;
int     TargetIdx;

/*  ** OUTPUT */
/*
ANGIO_TARGET    *pAngioTarget;
*/

{
    int j;

float   LAT_Mag, AP_Mag;
    float   AntMagInv, PostMagInv, RtMagInv, LtMagInv;

float   delta_S, delta_I;
    float   *SrcPos, *ImagePos;
    float   *RtFaceBrw, *LtFaceBrw, *AntFaceBrw, *PostFaceBrw;

float   *DeltaDist;

if (DEBUG)
        fprintf (stderr, "\t\tIn CompTargetMag\n");

/*  ** Mag factors for each face have already been determined, now
        compute mag factor at target point for AP and LAT views
*/

DeltaDist = pAngioTarget->TargetDeltaDist[TargetIdx];

/*  ** LATERAL Mag factor */
    RtMagInv = 1.0 / pAngioTarget->RtFaceMag[TargetIdx];
    LtMagInv = 1.0 / pAngioTarget->LtFaceMag[TargetIdx];

LAT_Mag = 1.0 / (RtMagInv + DeltaDist[0] * (LtMagInv - RtMagInv));

/*  ** AP Mag factor */
    AntMagInv = 1.0 / pAngioTarget->AntFaceMag[TargetIdx];
    PostMagInv = 1.0 / pAngioTarget->PostFaceMag[TargetIdx];
```

```
    AP_Mag = 1.0 / (AntMagInv + DeltaDist[1] * (PostMagInv - AntMagInv));

/* ** Save mag factors */
    pAngioTarget->TargetMagFactor[TargetIdx][0] = LAT_Mag;
    pAngioTarget->TargetMagFactor[TargetIdx][1] = AP_Mag;

/* ** Compute Source and Image Positions for target */

/* ** Lateral View */

RtFaceBrw = pAngioTarget->RtFaceBrw[TargetIdx];
    LtFaceBrw = pAngioTarget->LtFaceBrw[TargetIdx];

SrcPos = pAngioTarget->LAT_SrcPos[TargetIdx];
    ImagePos = pAngioTarget->LAT_ImgPos[TargetIdx];

delta_S = -RtMagInv / (LtMagInv - RtMagInv);

for (j = 0; j < 3; j++)
      SrcPos[j] = RtFaceBrw[j] + delta_S * (LtFaceBrw[j] - RtFaceBrw[j]);

delta_I = (1.0 - RtMagInv) / (LtMagInv - RtMagInv);

for (j = 0; j < 3; j++)
      ImagePos[j] = RtFaceBrw[j] + delta_I * (LtFaceBrw[j] - RtFaceBrw[j]);

/* ** AP View */

AntFaceBrw = pAngioTarget->AntFaceBrw[TargetIdx];
    PostFaceBrw = pAngioTarget->PostFaceBrw[TargetIdx];

SrcPos = pAngioTarget->AP_SrcPos[TargetIdx];
    ImagePos = pAngioTarget->AP_ImgPos[TargetIdx];

delta_S = -AntMagInv / (PostMagInv - AntMagInv);

for (j = 0; j < 3; j++)
      SrcPos[j] = AntFaceBrw[j] + delta_S *
            (PostFaceBrw[j] - AntFaceBrw[j]);

delta_I = (1.0 - AntMagInv) / (PostMagInv - AntMagInv);

for (j = 0; j < 3; j++)
      ImagePos[j] = AntFaceBrw[j] + delta_I *
            (PostFaceBrw[j] - AntFaceBrw[j]);

if (DEBUG)
        fprintf (stderr, "\t\t--> Exit CompTargetMag\n");
```

}

```
/*****************************************************************************
 * Module Name:  LocTargetBrw.c                                              *
 * Module Type:  C program                                                   *
 *                                                                           *
 * Subroutines:  1) VecCrossProd()                                           *
 *               2) ComputeDist()                                            *
 *                                                                           *
 * Purpose:  Function to determine the most probable position of the         *
 *           target in BRW space.  This pertains to finding the              *
 *           intersection of the AP and LAT raylines passing through the     *
 *           target.  If the two lines don't meet, the midpoint along the    *
 *           shortest distance joining the two lines is taken as the         *
 *           target point.                                                   *
 *                                                                           *
 *           Algorithm:                                                      *
 *           1) Determine vector normal to both lines C = A X B              *
 *           2) Define plane P containing vector B and parallel to vector C* *
 *              P = funct (B, C)                                             *
 *           3) Find intercept D of plane P with vector A                    *
 *           4) Define vector C' with origin D and dir vector C              *
 *           5) Find intercept E between vector A and C' (coplanar)          *
 *           6) Target Position T = 1/2 (D + E)                              *
 *           7) Localization accuracy = 1/2 DIST (D,E)                       *
 *                                                                           *
 *****************************************************************************/

LocTargetBrw (pAngioTarget, TargetIdx)

/* ** INPUT */
ANGIO_TARGET  *pAngioTarget;
int           TargetIdx;

/* ** OUTPUT */
/*
ANGIO_TARGET  *pAngioTarget;
*/

{
    int i;

float   *A1, *A2, *B1, *B2;
    Point3d A, B, C, D, E;      /* A, B rayline vectors, C = A X B */ float   p, q, r, s;    /* plane Eq. p x + q y + r z + s = 0 */
    float   m, sf, t;
    float   dist;

double  denom;

if (DEBUG)
        fprintf (stderr, "\t\tIn LocTargetBrw\n");

/* ** Set up vectors of two raylines */
```

```
    A1 = pAngioTarget->RtFaceBrw[TargetIdx];
    A2 = pAngioTarget->LtFaceBrw[TargetIdx];

B1 = pAngioTarget->AntFaceBrw[TargetIdx];
    B2 = pAngioTarget->PostFaceBrw[TargetIdx];

for (i = 0; i < 3; i++)
       {
       A[i] = A2[i] - A1[i];       /* LATERAL Ray */
       B[i] = B2[i] - B1[i];       /* AP Ray */
       }
```

/* ** Determine vector perpendicular to both A and B */

```
    VecCrossProd (A, B, C);
```

/* ** Set up plane through rayline B and parallel to vector C */

```
    p = C[2] * B[1] - C[1] * B[2];
    q = C[0] * B[2] - C[2] * B[0];
    r = C[1] * B[0] - C[0] * B[1];

denom = p * p + q * q + r * r;
    sf = 1.0 / sqrt (denom);

p *= sf;
    q *= sf;
    r *= sf;

s = -(p * B2[0] + q * B2[1] + r * B2[2]);
```

/* ** Now find intercept between rayline A with Plane - Point D */

```
    denom = A[0] * p + A[1] * q + A[2] * r;

t = -(p * A1[0] + q * A1[1] + r * A1[2] + s) / denom;

for (i = 0; i < 3; i++)
       D[i] = A1[i] + A[i] * t;
```

/* ** Save parameter for mag factor determination */
```
    pAngioTarget->TargetDeltaDist[TargetIdx][0] = t;
```

/* ** Now the vector originating from point D with direction vector C
      the vector B are coplanar and are normal to each other,
      find their intersection
*/
/*

```
    sf = 1.0 / (C[0] * B[1] - C[1] * B[0]);
    m = sf * (B[1] * B1[0] - B[0] * B1[1] + B[0] * D[1] - B[1] * D[0]);

for (i = 0; i < 3; i++)
        E[i] = D[i] + m * C[i];
*/
    sf = 1.0 / (C[1] * B[0] - C[0] * B[1]);
    m = sf * (C[1] * D[0] - C[0] * D[1] + C[0] * B1[1] - C[1] * B1[0]);

for (i = 0; i < 3; i++)
        E[i] = B1[i] + m * B[i];

for (i = 0; i < 3; i++)
        pAngioTarget->TargetBrw[TargetIdx][i] = 0.5 * (D[i] + E[i]);

/* ** Compute estimated accuracy (half the dist of the line segment) */
    ComputeDist (D, E, &dist);

pAngioTarget->TargetBrwError[TargetIdx] = 0.5 * dist;

/* ** Save parameter for mag factor determination */
    pAngioTarget->TargetDeltaDist[TargetIdx][0] = t;
    pAngioTarget->TargetDeltaDist[TargetIdx][1] = m;

if (DEBUG)
        fprintf (stderr, "\t\t-->ExitLocTargetBrw\n");
}

/****************************************************************************
*  Module Name:   ReadAngioFilmData                                         *
*  Module Type:   C program                                                 *
*                                                                            *
*  Subroutines:  1) SkipComment()                                           *
*                2) GetLabel()                                              *
*                3) LowerToUpper()                                          *
*                4) MatchChar()                                             *
*                                                                            *
*  Purpose:  Function to read input data of digitized angio fuducials and   *
*            target coordinates.                                            *
*                                                                            *
****************************************************************************/

ReadAngioFilmData (FilmData_fptr, pAngioData, pAngioTarget)

/* ** INPUT */
FILE         *FilmData_fptr;

/* ** OUTPUT */
ANGIO_DATA    *pAngioData;
ANGIO_TARGET  *pAngioTarget;
```

```
{
    int i;
    int Ntarget;

char    text[MxnStringLeng], *CharPtr;
    char    text1[MxnStringLeng];
    char    StrngEntry[MxnStringLeng];

Point2d *LAT_Marks, *AP_Marks;
    Point2d *LAT_Targets, *AP_Targets;

SkipComment (FilmData_fptr);  /* Skip Comment lines */

/*  ** Read distance unit of digitized coords */
/*  ** N.B. Film Distance unit will be after the first "=" sign, in the
       form:      ......... = 0.1 "in"
       the unit for inch is either "in", "IN" and must be in double quote,
       unit other than that will be assummed in mm
*/
    if ((CharPtr = MatchChar (FilmData_fptr, Equal)) == NULL)
        {
        fprintf (stderr, "%cERRROR in \"ReadAngioFilmData\": ", BELL);
        fprintf (stderr, "Distance unit missing\n");
        return (-1);
        } sscanf (CharPtr+1, "%f%s", &FilmDistUnit, StrngEntry);

if (GetLabel (StrngEntry, '"') < 0)
        fprintf (stderr, "%cWARNING - unit not found, mm assumed\n",
            BELL);

LowerToUpper (StrngEntry);

if (strncmp (StrngEntry, "IN", 2) == 0)
        FilmDistUnit *= IN_TO_MM;

/*  ** Read LAT fuducials - R, S, T, U; V, W, X, Y; */
/*  ** Data area are assummed to begin after the first colon symbol (:) */

SkipComment (FilmData_fptr);  /* Skip Comment lines */

LAT_Marks = pAngioData->LAT_Marks;

if ((CharPtr = MatchChar (FilmData_fptr, Colon)) == NULL)
        {
        fprintf (stderr, "%cERRROR in \"ReadAngioFilmData\": ", BELL);
            fprintf (stderr, "LATERAL FIDUCIALS missing\n");
```

```c
            return (-1);
        } for (i = 0; i < 8; i++)
        fscanf (FilmData_fptr, "%f %f", &LAT_Marks[i][0], &LAT_Marks[i][1]);

/* ** Read AP fiducials - A, B, C, D; E, F, G, H; */

SkipComment (FilmData_fptr);  /* Skip Comment lines */

/* ** Data area are assummed to begin after the first colon symbol (:) */

AP_Marks = pAngioData->AP_Marks;

if ((CharPtr = MatchChar (FilmData_fptr, Colon)) == NULL)
        {
        fprintf (stderr, "%cERRROR in \"ReadAngioFilmData\": ", BELL);
            fprintf (stderr, "LATERAL FIDUCIALS missing\n");
            return (-1);
        } for (i = 0; i < 8; i++)
        fscanf (FilmData_fptr, "%f %f", &AP_Marks[i][0], &AP_Marks[i][1]);

/* ** Read LAT Targets */

SkipComment (FilmData_fptr);  /* Skip Comment lines */

/* ** Data area are assummed to begin after the first colon symbol (:) */ if ((CharPtr = MatchChar (FilmData_fptr, Colon)) == NULL)
        {
        fprintf (stderr, "%cERRROR in \"ReadAngioFilmData\": ", BELL);
            fprintf (stderr, "LATERAL FIDUCIALS missing\n");
            return (-1);
        } fscanf (FilmData_fptr, "%d", &Ntarget);
    if (Ntarget < 1)
        {
        fprintf (stderr, "%cERROR in \"ReadAngioFilmData\": ", BELL);
        fprintf (stderr, "TARGET missing\n");
        return (-1);
        }

LAT_Targets = pAngioTarget->LAT_Targets;
    for (i = 0; i < Ntarget; i++)
```

```
        fscanf (FilmData_fptr, "%f %f", &LAT_Targets[i][0],
            &LAT_Targets[i][1]);

/*  ** Read AP Targets */

AP_Targets = pAngioTarget->AP_Targets;
    for (i = 0; i < Ntarget; i++)
        fscanf (FilmData_fptr, "%f %f", &AP_Targets[i][0],
            &AP_Targets[i][1]);

pAngioTarget->Ntarget = Ntarget;

}

/************************************************************************
* Module Name:  SetFaceIntercept.c                                      *
* Module Type:  C program                                               *
*                                                                       *
* Subroutines: NONE                                                     *
*                                                                       *
* Purpose:  Function to compute the intercepts on the two parallel faces *
*           of the rayline joining the Source and Point of Interest for  *
*           the given view (either a "AP" or "LATERAL").                 *
*           The calculation is based on computed parameters performed    *
*           earlier by other routines.                                   *
*                                                                       *
************************************************************************/

SetFaceIntercept (RefToCtrDist, RefDist, TargetDist, RefBrw, TargetBrw, ViewId)

/*  ** INPUT */
float   *RefToCtrDist, *RefDist, *TargetDist;
int ViewId;

/*  OUTPUT */
float   *RefBrw, *TargetBrw;
{ int i;
    int BrwIdx;
    float   alpha[2], beta, beta_half, gamma;

for (i = 0; i < 3; i++)
        TargetBrw[i] = RefBrw[i];

BrwIdx = (ViewId == AP_VIEW_ID) ? LAT_IDX : AP_IDX;

for (i = 0; i < 2; i++)
```

```
        {
        beta_half = RefToCtrDist[i] / RefDist[i];

gamma = 1.0 / beta_half - 1.0;

beta = TargetDist[i] / RefDist[i];

alpha[i] = gamma * beta / (1.0 + (gamma - 1.0) * beta);
        }

TargetBrw[VERT_IDX] += alpha[0] * MARKER_DIST;
    TargetBrw[BrwIdx] += alpha[1] * MARKER_DIST;

}

/****************************************************************************
 * Module Name:  SetRefMarksIdx.c                                           *
 * Module Type:  C program                                                  *
 *                                                                          *
 * Subroutines: NONE                                                        *
 *                                                                          *
 * Purpose:  Function to set indices of fiducial marks for each face of     *
 *           the angio frame.                                               *
 *                                                                          *
 ****************************************************************************/

SetRefMarksIdx (V1_idx, V2_idx, V3_idx, V4_idx, FaceId)

/* ** INPUT */
int FaceId;

/* ** OUTPUT */
int *V1_idx, *V2_idx, *V3_idx, *V4_idx;

{
    switch (FaceId)

{
        case RT_FACE_ID:
            *V1_idx = R_idx;
            *V2_idx = S_idx;
            *V3_idx = T_idx;
            *V4_idx = U_idx;
            break;

case LT_FACE_ID:
            *V1_idx = V_idx;
            *V2_idx = W_idx;
            *V3_idx = X_idx;
            *V4_idx = Y_idx;
            break;
```

```
        case ANT_FACE_ID:
            *V1_idx = D_idx;
            *V2_idx = C_idx;
            *V3_idx = B_idx;
            *V4_idx = A_idx;
            break;

case POST_FACE_ID:
            *V1_idx = H_idx;
            *V2_idx = G_idx;
            *V3_idx = F_idx;
            *V4_idx = E_idx;
            break;
    }

}
```

7. BackProj.c

```
/******************************************************************************
* Module Name:  BackProj.c                                                    *
* Module Type:  Program file of C programs.                                   *
* Functions:    1) BackProj()                                                 *
*               2) MergeList()                                                *
*               3) RayBackTrace()                                             *
*                                                                             *
* Purpose:  A library of routines to perform backprojection of defined        *
*           region on films.                                                  *
*                                                                             *
******************************************************************************/ include <stdio.h>
include <string.h>
include <math.h>
include <avs/avs.h>
include <avs/field.h>
include <avs/geom.h>
include <avs/udata.h> include "../INCLUDE/UserDefs.h"
include "../INCLUDE/UdataContur.h"
include "../INCLUDE/VolumeSzDefs.h"

define    EXT_DEF_ONLY    1
include "../INCLUDE/Debug.h"

undef EXT_DEF_ONLY
```

```
define    INIT_DECLARATION  1 include "../INCLUDE/BackProj.h"
include "../INCLUDE/ImageVol.h"

undef INIT_DECLARATION

/******************************************************************************
 * Module Name:  BackProj.c                                                    *
 * Module Type:  C program.                                                    *
 * Function calls: 1) RayBackTrace()                                           *
 *                                                                             *
 * Purpose:   Function to perform backprojection to reconstruct 3D volume      *
 *            of region defined in 2D projection on films.                     *
 *            NOTE: Current implementation in "Angio.c" assumes the films      *
 *                  are always in pairs (i.e. one with fiducials of "AP"       *
 *                  View, the other with fiducials of "LATERAL" VIEW).         *
 *                  The reconstruction technique does not require films to     *
 *                  be paired, i.e. one can have N "AP" views and M "LAT"      *
 *                  views where N, M can be from 0 to any integer value.       *
 *                  To patch the code to deal with films not paired up,        *
 *                  a look up table "SkipView" is used to skip missing         *
 *                  views in the pairs so that only views that are actually    *
 *                  taken are used for backprojection.                         *
 *                                                                             *
 ******************************************************************************/
void    BackProj (int nfilms, FILM_IMG **FilmLst, BACKPROJ_VOL *BP_VolPtr)

{
FILM_IMG *FilmImgPtr;

register i, j, k, m;

int nx, ny, nvoxel, idx, npt;
    char    *FilmImg;

float   PixelSz;

Point3d LineStartPt, DxVector, DyVector;

float   SF;

int i1, j1, k1;
int IDX;
int NX, NY, NZ, NPT;
static  char bitmap[512][512];
char    bitmap_name[20], bitmap_no[8];

/* ** SkipView[] is A HARDCODED LOOK UP TABLE TO SKIP VIEWS THAT ARE NOT
    ACTUALLY TAKEN, A PATCH TO THE FACT THAT CURRENT IMPLEMENTATION OF
       (ANGIO.C (A LIBRARY) EXPECTS A PAIR OF FILM (A REQUIREMENT FOR
          ORIGINAL PURPOSE OF TARGET LOCALIZATION)
```

```
*/ static   SkipView[8] = { 0, 0, 0, 0, 0, 0, 0, 0 };

if (DEBUG)
         fprintf (stderr, "\t\tIn BackProj\n");

/*   ** Set up temporary backproj volume */
    nvoxel = BP_VolPtr->Nvoxel;

if (ProjBuffer != NULL)
         free ((char *) ProjBuffer);

ProjBuffer = calloc (nvoxel, sizeof(char));

for (m = 0; m < nvoxel; m++)
         BP_VolPtr->VolImg[m] = 0;

for (k = 0; k < nfilms; k += 1)

{
        if (SkipView[k])         /* skip view */
        continue;

npt = 0;

/*      ** Clear backprojection buffer */ for (m = 0; m < nvoxel; m++)
        ProjBuffer[m] = 0;

FilmImgPtr = FilmLst[k];
        FilmImg = FilmImgPtr->FilmImg;

nx = FilmImgPtr->nx;
        ny = FilmImgPtr->ny;

PixelSz = FilmImgPtr->PixelSz;

SF = 0.1;       /* DY HARDCODE convert mm to cm */
              /* DY factor 2.54 to convert "in" to "cm"
                 Digitizer currently used inches as unit */

FilmSource = FilmImgPtr->SourcePos;

for (m = 0; m < 3; m++)
        FilmSource[m] = FilmSource[m] * SF;
        for (m = 0; m < 3; m++)
        FilmTarget[m] = LineStartPt[m] = FilmImgPtr->TLC_Pos[m] * SF;
```

```
    for (m = 0; m < 3; m++)
    {
    DxVector[m] = PixelSz * FilmImgPtr->x_unit_vec[m] * SF * 2.54;
    DyVector[m] = -PixelSz * FilmImgPtr->y_unit_vec[m] * SF * 2.54;
                        /*from top*/
    } idx = 0;

for (i = 0; i < ny; i++)
        {
        for (j = 0; j < nx; j++)
        { if (FilmImg[idx] != 0)    /* backproject if needed */
          {
          RayBackTrace ();
          npt++;
          }
/*      ** Increment by DxVector to get new coords for next pt */ for (m = 0; m < 3; m++)
          FilmTarget[m] += DxVector[m];

idx++;
        }

/*      ** Increment by DyVector to get new coords for next pt */ for (m = 0; m < 3; m++)
          {
          LineStartPt[m] += DyVector[m];
          FilmTarget[m] = LineStartPt[m];
          }
    }

/*  ** Save as bitmap - for debugging only */

/*
    strcpy (bitmap_name, "view");
    sprintf (bitmap_no, "%d", k);
    strcat (bitmap_name, bitmap_no);

NX = BP_VolPtr->VolDim[0];
    NY = BP_VolPtr->VolDim[1];
    NZ = BP_VolPtr->VolDim[2];
```

```
        for (i1 = 0; i1 < NX; i1++)
            for (j1 = 0; j1 < NZ; j1++)
                bitmap[i1][j1] = 0;

NPT = 0;
    for (k1 = 0; k1 < NZ; k1++)
    {
        for (j1 = 0; j1 < NY; j1++)
        {
            for (i1 = 0; i1 < NX; i1++)
            {
                IDX = k1 * NX * NY + j1 * NX + i1;
                if (ProjBuffer[IDX] == 1)
                {
                    NPT++;
                    if (k % 2 == 0)
                        bitmap[k1][j1] = 1;
                    else
                        bitmap[k1][i1] = 1;
                }
            }
        }
    } save_as_bitmap ((char *)bitmap, NX, NZ, bitmap_name);
*/

/*      ** Update composite backproj volume */
        for (m = 0; m < nvoxel; m++)
            BP_VolPtr->VolImg[m] += ProjBuffer[m];

}

/* For debugging only for (m = 0; m < 2; m++)
    {
    for (i1 = 0; i1 < NZ; i1++)
        for (j1 = 0; j1 < NX; j1++)
            bitmap[i1][j1] = 0;

strcpy (bitmap_name, "view_");
        sprintf (bitmap_no, "%d", m);
        strcat (bitmap_name, bitmap_no);

for (k1 = 0; k1 < NZ; k1++)
        {
            for (j1 = 0; j1 < NY; j1++)
```

```
                    {
                    for (i1 = 0; i1 < NX; i1++)
                        {
                        IDX = k1 * NX * NY + j1 * NX + i1;
                        if (BP_VolPtr->VolImg[IDX] == k)
                            {
                            NPT++;
                            if (m % 2 == 0)
                                    bitmap[k1][j1] = 1;
                            else
                                    bitmap[k1][i1] = 1;
                            }
                        }
                    }
            } save_as_bitmap ((char *)bitmap, NX, NZ, bitmap_name);
    }
*/ fprintf (stderr, "\t-->Exit BackProj\n");

}

/********************************************************************************
*  Module Name:  RayBackTrace.c                                                 *
*  Module Type:  C program                                                      *
*  Subroutines:  1) MergeList()                                                 *
*                                                                               *
*  Purpose:   Function to compute intercepts for a set of parallel lines        *
*             with a rayline.  For each of set of the orthogonal planes,        *
*             the spacing (a signed value indicating direction as well) and     *
*             the coordinates of the planes are given in the structure          *
*             "BackProjVol", the rayline is defined by its two end points p1    *
*             and p2, i.e. p1-->p2.  Fix size local arrays are also used in     *
*             place of dynamic memory allocation.                               *
*                                                                               *
********************************************************************************/
void    RayBackTrace ()

/*  ** INPUT */
/* float   *FilmSource, *FilmTarget;
BACKPROJ_VOL *pBackProjVol;

*/

/*  ** OUTPUT */
```

```
/*
char    *ProjBuffer;
*/

{ define    M_MATRIX_SZ    1024 static  int   counter = 0;
int k;
        int   i, j, m;
        int   i0, j0, k0;
        int   nvoxel;
        int   ibeg, iend;
        int   nx, ny, nz, npt, Npt;
        long  idx;
        int   ns;
        int   PlaneMinIdx, PlaneMaxIdx, nplane;
        int   iray_span;
        int   NpixelPerLine, NpixelPerSlice;
        int   nalpha;
static  int   Nalpha[3];

float s0, sn, ds, ds_inv;
        float *s_coord, *AlphaList;
        float alpha_p1, alpha_pn;
        float alpha_value, delta_alpha;
        float AlphaMin, AlphaMax;
        float r1, ray_span, ray_span_inv, ray_dir;

static  float alpha_min[3], alpha_max[3];
static  float AlphaLists[3][M_MATRIX_SZ+1];
static  float TmpList[2*M_MATRIX_SZ+2];
static  float G_AlphaList[3*M_MATRIX_SZ+3];

float VoxelSz, vs_inv, S0[3], sf[3];
        float AlphaSum;

/*
    fprintf (stderr, "\tIn RayBackTrace.c\n");
*/ for (i = 0; i < 3; i++)
        {
        ns = pBackProjVol->VolDim[i];

ibeg = pBackProjVol->VolLimits[i][0];
```

```
        iend = pBackProjVol->VolLimits[i][1] + 1;   /* ns + 1 planes */ s0 = pBackProjVol->coord[i][ibeg];     /* coord of 1st req plane */
        sn = pBackProjVol->coord[i][iend];     /* coord of last req plane */ r1 = FilmSource[i];
        ray_span = FilmTarget[i] - r1;

/*      ** Make sure ray is not parallel to the grid */ iray_span = ray_span * 1000;

if (iray_span == 0)
        {
        alpha_min[i] = 0.0;
        alpha_max[i] = 1.0;
        continue;           /* exit to next loop */
        } ray_span_inv = 1.0 / ray_span;

alpha_p1 = (s0 - r1) * ray_span_inv;
        alpha_pn = (sn - r1) * ray_span_inv;

if (alpha_pn > alpha_p1)
        {
            alpha_min[i] = alpha_p1;
            alpha_max[i] = alpha_pn;
        }
        else
        {
            alpha_min[i] = alpha_pn;
            alpha_max[i] = alpha_p1;
            }
        }

/*  ** Determine the global min and max for ALPHA, intercepts to the
        box faces
    */

AlphaMin = MAX (alpha_min[0], MAX (alpha_min[1], alpha_min[2]));
    AlphaMin = MAX (0.0, AlphaMin);

AlphaMax = MIN (alpha_max[0], MIN (alpha_max[1], alpha_max[2]));

AlphaMax = MIN (1.0, AlphaMax);   /* Film plane must be outside volume */ if (AlphaMin > AlphaMax)
```

```
        {
        return;
        }

/*  ** Determine the plane indices for the corresponding ray intercepts */ for (i = 0; i < 3; i++)

{
        ns = pBackProjVol->VolDim[i];
        ds = pBackProjVol->VoxelSz[i];   /* ds is signed for dir */
        ds_inv = 1.0 / ds;

s_coord = pBackProjVol->coord[i];
        s0 = s_coord[0];
        sn = s_coord[ns];          /* ns + 1 planes */ r1 = FilmSource[i];
        ray_span = FilmTarget[i] - r1;

ray_dir = ray_span / ds;

/*  ** Make sure ray is not parallel to the grid */ iray_span = ray_span * 1000;

if (iray_span == 0)
            {
            Nalpha[i] = 0;
            continue;          /* skip the rest of loop */
            } ray_span_inv = 1.0 / ray_span;

if (ray_dir > 0)
            {
            PlaneMinIdx = ns - (sn - AlphaMin * ray_span - r1) * ds_inv
                 + 0.01;
            PlaneMaxIdx = (r1 + AlphaMax * ray_span - s0) * ds_inv + 0.01;
                alpha_value = (s_coord[PlaneMinIdx] - r1) * ray_span_inv;
            }
        else
            {
                PlaneMinIdx = ns - (sn - AlphaMax * ray_span - r1) * ds_inv
                 + 0.01;
                PlaneMaxIdx = (r1 + AlphaMin * ray_span - s0) * ds_inv + 0.01;
                alpha_value = (s_coord[PlaneMaxIdx] - r1) * ray_span_inv;
            }
```

```
            nplane = PlaneMaxIdx - PlaneMinIdx + 1;

if (nplane < 0)
            nplane = 0;

Nalpha[i] = nplane;

/*       ** Set up alpha values */

AlphaList = AlphaLists[i];

nalpha = 0;

if (nplane > 0)
               {
               delta_alpha = fabs (ds * ray_span_inv);

for (j = 0; j < nplane; j++)
                  {
/*             ** Skip alphas that are outside limits (rounding error) */
/*             ** DELTA_ALPHA added to avoid rounding error  DY 9/27/94 */
                  if ((alpha_value + DELTA_ALPHA) < AlphaMin ||
                      (alpha_value - DELTA_ALPHA) > AlphaMax)
                     {
                     alpha_value += delta_alpha;
                     continue;
                     }

AlphaList[nalpha] = alpha_value;
                  alpha_value += delta_alpha;
                  nalpha++;
                  }

Nalpha[i] = nalpha;
               }

}

/*    ** Merge alpha's for all three dimensions */ nx = Nalpha[0];
      ny = Nalpha[1];
      nz = Nalpha[2];

Npt = nx + ny + nz;

/*
      fprintf (stderr, "\n\n");
      fprintf (stderr, "Alpha X\n");
```

```
            for (k = 0; k < nx; k++)
            fprintf (stderr, "%9.5f ", AlphaLists[0][k]);

fprintf (stderr, "\nAlpha Y\n");
            fprintf (stderr, "%9.5f ......%9.5f", AlphaLists[1][0],
                AlphaLists[1][ny-1]);

fprintf (stderr, "\nAlpha Z\n");
            for (k = 0; k < nz; k++)
            fprintf (stderr, "%9.5f ", AlphaLists[2][k]);
            fprintf (stderr, "\n");
*/

MergeList (AlphaLists[0], AlphaLists[1], nx, ny, TmpList, &npt);

MergeList (AlphaLists[2], TmpList, nz, npt, G_AlphaList, &npt);

Npt = npt;       /* update Npt in case npt is less due
                        to duplication in alphas */
/*
            if (counter < 10)
            fprintf (stderr, "Npt = %d ", Npt);
            if (counter == 10)
                fprintf (stderr, "\n");
*/
/* for (k = 0; k < Npt; k++)
                fprintf (stderr, "%9.5f ", G_AlphaList[k]);
            fprintf (stderr, "\n");
*/

/*  **  Backproj ray. Any voxel traversed by rayline is set to 1  */ for (i = 0; i < 3; i++)
                {
                VoxelSz = pBackProjVol->VoxelSz[i];
                vs_inv = 1.0 / VoxelSz;
                S0[i]=(FilmSource[i]-pBackProjVol->coord[i][0])*vs_inv;
                sf[i] = 0.5 * (FilmTarget[i] - FilmSource[i]) * vs_inv;
                }

NpixelPerLine = pBackProjVol->VolDim[0];
            NpixelPerSlice = NpixelPerLine * pBackProjVol->VolDim[1];

for (m = 0; m < Npt - 1; m++)
                {
                AlphaSum = G_AlphaList[m] + G_AlphaList[m+1];
```

```
        i0 = S0[0] + AlphaSum * sf[0];
        j0 = S0[1] + AlphaSum * sf[1];
        k0 = S0[2] + AlphaSum * sf[2];
/*
        fprintf (stderr, "\ti0 = %3d, j0 = %3d, k0 = %3d\n",
            i0, j0, k0);
*/
        idx = i0 + j0 * NpixelPerLine + k0 * NpixelPerSlice;

if (idx > 67108863)
            idx = 67108863;

ProjBuffer[idx] = 1;

}

/*
    fprintf (stderr, "\t--> Exit RayBackTrace.c\n");
*/

}

/********************************************************************************
*   Module Name: SetBackProjVol()                                               *
*   Module Type: C program                                                      *
*                                                                               *
*   Purpose:    Function to set up Volume Data for backprojection.              *
*                                                                               *
********************************************************************************/ void    SetBackProjVol (OutLine *Outline, BACKPROJ_VOL *pBackProjVol,
            float xmin, float xmax, float ymin, float ymax, float zmin,
            float ymax, int MatSz)

{
float   OFFSET;
        int     i;
    int nvoxel;
        float   *VolImgCoord[3], HalfPixelSz, HalfThickness;

float   VoxelSz, VoxelHt;

int nx, ny, nz;
        float   x, y, z;
        int nslice;

if (DEBUG)
            fprintf (stderr, "\t\tIn SetBackProjVol\n");
```

```
VoxelSz = (xmax - xmin ) / (MatSz - 1);

VoxelHt = VoxelSz * 2.0;

nslice = (zmax - zmin) / VoxelHt + 1;

/*    ** Set up Volume Data for Backprojection */ pBackProjVol->VolDim[0] = pBackProjVol->VolDim[1] = MatSz;
    pBackProjVol->VolDim[2] = nslice;

/*    ** Default volume limits for backprojection is whole vol */
    pBackProjVol->VolLimits[0][0] = pBackProjVol->VolLimits[1][0] =
        pBackProjVol->VolLimits[2][0] = 0;

pBackProjVol->VolLimits[0][1] = pBackProjVol->VolLimits[1][1] =
        MatSz - 1;
    pBackProjVol->VolLimits[2][1] = nslice - 1;

nvoxel = MatSz * MatSz * nslice;
    pBackProjVol->Nvoxel = nvoxel;

/*    ** Free previous coord space if allocated */
    for (i = 0; i < 3; i++)
        if (pBackProjVol->coord[i] != NULL)
            free ((char *) pBackProjVol->coord[i]);

/*    ** Allocate space for coordinate data for DRR */
    for (i = 0; i < 2; i++)
        VolImgCoord[i] = (float *)calloc (MatSz + 1, sizeof(float));
    VolImgCoord[2] = (float *)calloc (nslice + 1, sizeof(float));

for (i = 0; i < 3; i++)
        pBackProjVol->coord[i] = VolImgCoord[i];

/*    ** Set up coordinate data */

HalfPixelSz = 0.5 * VoxelSz;
    HalfThickness = 0.5 * VoxelHt;

x = VolImgCoord[0][0] = xmin - HalfPixelSz;
    y = VolImgCoord[1][0] = ymax + HalfPixelSz;

for (i = 1; i <= MatSz; i++)
    {
    x += VoxelSz;
    y -= VoxelSz;
```

```
      VolImgCoord[0][i] = x;
      VolImgCoord[1][i] = y;
   } z = VolImgCoord[2][0] = zmin - HalfThickness;

for (i = 0; i <= nslice; i++)
   {
   z += VoxelHt;
   VolImgCoord[2][i] = z;
   } pBackProjVol->VoxelSz[0] = VolImgCoord[0][1] - VolImgCoord[0][0];
      pBackProjVol->VoxelSz[1] = VolImgCoord[1][1] - VolImgCoord[1][0];
      pBackProjVol->VoxelSz[2] = VolImgCoord[2][1] - VolImgCoord[2][0];

pBackProjVol->VolImg = calloc (nvoxel, sizeof(char));

for (i = 0; i < nvoxel; i++)
         pBackProjVol->VolImg[i] = 0;

fprintf (stderr, "Volume Sz = %d, %d, %d\n", pBackProjVol->VolDim[0],
    pBackProjVol->VolDim[1], pBackProjVol->VolDim[2]);

fprintf (stderr, "Volume corners: TLC : %7.3f, %7.3f, %7.3f\n",
    VolImgCoord[0][0], VolImgCoord[1][0], VolImgCoord[2][0]);
fprintf (stderr, "Volume corners: BRC : %7.3f, %7.3f, %7.3f\n",
    VolImgCoord[0][MatSz], VolImgCoord[1][MatSz],
    VolImgCoord[2][nslice]);

if (DEBUG)
        fprintf (stderr, "\t\t--> Exit SetBackProjVol\n");

}

/****************************************************************************
*  Module Name: MergeList.c                                                 *
*  Module Type: C program                                                   *
*                                                                           *
*  Purpose:    Function to merge two lists.  Both lists are assumed to be   *
*              arranged in ascending order.  All items will be in ascending *
*              order after merging.                                         *
*                                                                           *
****************************************************************************/ void   MergeList (float *List1, float *List2, int n1, int n2, float *NewList,
          int *pNpt)

/*     ** INPUT */
/*
float  *List1, *List2;
int    n1, n2;
```

```
*/
/*      ** OUTPUT */
/*
float   *NewList;
int     *pNpt;
*/

{
        int     i, j, k, m;
        float   alpha_1, alpha_2, alpha_diff;

/*
        fprintf (stderr, "\t\tIn MergeList\n");
*/ i = j = k = 0;

while (i < n1 && j < n2)
                { alpha_1 = List1[i];
                alpha_2 = List2[j];

alpha_diff = fabs (alpha_1 - alpha_2);

if (alpha_2 < alpha_1)
                        {
                        if (alpha_diff > DELTA_ALPHA)   /* avoid duplicate */
                                NewList[k++] = alpha_2;
                        j++;
                        }
                else
                        {
                        if (alpha_diff > DELTA_ALPHA)   /* avoid duplicate */
                                NewList[k++] = alpha_1;
                        i++;
                        }
                } for (m = i; m < n1; m++)
                NewList[k++] = List1[m];

for (m = j; m < n2; m++)
                NewList[k++] = List2[m];

*pNpt = k;      /* output new list length */
```

```
/*
    fprintf (stderr, "\t\t--> Exit MergeList\n");
*/

}
```

8. Example.c

```
/***************************************************************************
 * MainExample.c                                                            *
 *                                                                          *
 *                                                                          *
 * NOTICE:   THIS IS A SAMPLE PORTION OF A PROGRAM TO CALL THE LIBRARY      *
 *           FUNCTIONS TO PERFORM THE 3D RECONSTRUCTION FROM STEREOTACTIC   *
 *           BACKPROJECTIONS                                                *
 *                                                                          *
 ***************************************************************************/ include .......

main()

{
.......
.......

NAngioPair = 3;

ReadAngioPair ();

k = 0;
        for (i = 0; i < NAngioPair; i++)
           {
           for (j = 0; j < 2; j ++)
              {
              CompAngioFilmsUnitVec (&AngioView[k], &SrcImgData);

FilmImgLst[k] = FilmPtr = &AngioView[k].Film;

/*            ** Set up film grid */
              if (AngioView[k].FilmType == AP)
                  {
                  fprintf(stderr,"\tView %d:   AP \n", k);
                  pMS_Brw  = SrcImgData.AP_MS_Brw;
                  pMFI_Brw = SrcImgData.AP_MFI_Brw;
```

```
                pMFI_2D = SrcImgData.AP_MFI_2D;
                FilmDx = SrcImgData.AP_X_UnitVec;
                FilmDy = SrcImgData.AP_Y_UnitVec;
                }
        else
                {
                fprintf (stderr, "\tView %d:   LAT \n", k);
                pMS_Brw = SrcImgData.LatMS_Brw;
                pMFI_Brw = SrcImgData.LatMFI_Brw;
                pMFI_2D = SrcImgData.LatMFI_2D;
                FilmDx = SrcImgData.LatX_UnitVec;
                FilmDy = SrcImgData.LatY_UnitVec;
                }

TLC_Pos = FilmPtr->TLC_Pos;
        for (m = 0; m < 3; m++)
          {
          TLC_Pos[m] = (FilmPtr->Xbounds[0] - pMFI_2D[0]) *
            FilmDx[m]*2.54 + (FilmPtr->Ybounds[1]-pMFI_2D[1]) *
            FilmDy[m] * 2.54 + pMFI_Brw[m];

FilmPtr->x_unit_vec[m] = FilmDx[m];
          FilmPtr->y_unit_vec[m] = FilmDy[m];
          FilmPtr->SourcePos[m] = pMS_Brw[m];
          } k++;

}
    } nview = k;

BackProj (nview, FilmImgLst, &BackProjVol);

}
```

9. ReadAngioFilmContur.c

```c
include <stdio.h>
include "UserDefs.h"

define EXT_DEF_ONLY 1 include "Debug.h"
include "Angio.h"
include "File_IO_Lib.h"

undef EXT_DEF_ONLY static   int   Colon = ':';
static   int   Equal = '=';

/******************************************************************************
 *  ReadAngioFilmContur()                                                     *
 *                                                                            *
 *  Program to read in 2D coordinates of digitized angio fiducials and        *
 *  outlined contours of Regions of Interest (ROI's).                         *
 ******************************************************************************/

ReadAngioFilmContur (FILE *fptr, ANGIO_VIEW *pAngioView)
{
    ANGIO_DATA    *pAngioData    = &(pAngioView->AngioData);
    CONTOUR_LIST  *pAngioConturs = &(pAngioView->Contours);
    int           *pAngioFilmType = &(pAngioView->FilmType);
    int           c;
    char          *CharPtr, StrngEntry[256];
    Point2d       *pConturDat;
    int           i, j, total, nloop, ncontour;
    int           dummy;
    int           x, y;
    float         xmin, xmax, ymin, ymax;

if (DEBUG)
        fprintf (stderr, "In ReadAngioFilmContur()\n");

if (!pAngioData || !pAngioConturs || !pAngioFilmType)
    {
        fprintf (stderr,
            "ReadAngioFilmContur Error: pAngioView nil\n");

exit (-1);
    }

SkipComment (fptr);   /* skip comment lines */

/*   ** Read distance unit of digitized coords */
/*   ** N.B. Film Distance unit will be after the first "=" sign, in the
```

```
                form:     ......... = 0.1 "in"
                the unit for inch is either "in", "IN" and must be in double quote,
                unit other than that will be assummed in mm
 */
        if ((CharPtr = MatchChar (fptr, Equal)) = = NULL)
                {
                fprintf (stderr, "%cERRROR in \"ReadAngioFilmData\": ", BELL);
                fprintf (stderr, "Distance unit missing\n");
                return (-1);
                } sscanf (CharPtr+1, "%f%s", &FilmDistUnit, StrngEntry);

if (GetLabel (StrngEntry, '"') < 0)
                fprintf (stderr, "%cWARNING - unit not found, mm assumed\n",
                        BELL);

LowerToUpper (StrngEntry);

if (strncmp (StrngEntry, "IN", 2) = = 0)
                FilmDistUnit *= IN_TO_MM;

/*      ** Read fuducials - R, S, T, U; V, W, X, Y; on LAT films */
/*      **                  A, B, C, D; E, F, G, H; on AP films */
/*      ** Data area are assummed to begin after the first colon symbol (:) */

SkipComment (fptr);    /* Skip Comment lines */ if ((CharPtr = MatchChar (fptr, Colon)) = = NULL)
                {
                fprintf (stderr, "%cERRROR in \"ReadAngioFilmContur\": ", BELL);
                fprintf (stderr, "Film Type missing\n");
                return (-1);
                } sscanf (CharPtr+1, "%s", StrngEntry);

if (GetLabel (StrngEntry, '"') < 0)
                fprintf (stderr, "%cWARNING - Film type not found, AP assumed\n",
                        BELL);

LowerToUpper (StrngEntry);

if (strncmp (StrngEntry, "LAT", 3) = = 0)
            *pAngioFilmType = LAT;
        else
            *pAngioFilmType = AP;

if (*pAngioFilmType = = AP)
```

```
        for (i = 0; i < 8; i++)
        {
            fscanf (fptr, "%d+%d+%d", &dummy, &x, &y);
            pAngioData->AP_Marks[i][0] = x * 0.01;
            pAngioData->AP_Marks[i][1] = y * 0.01;
        }
    else
    if (*pAngioFilmType == LAT)
        for (i = 0; i < 8; i++)
        {
        fscanf (fptr, "%d+%d+%d", &dummy, &x, &y);
        pAngioData->LAT_Marks[i][0] = x * 0.01;
        pAngioData->LAT_Marks[i][1] = y * 0.01;
        }

/* ** read contour number */
    SkipComment (fptr);   /* Skip Comment lines */
    if ((CharPtr = MatchChar (fptr, Colon)) == NULL)
    {
        fprintf (stderr, "%cERRROR in \"ReadAngioFilmContur\": ", BELL);
        fprintf (stderr, "Contour Number missing\n");
        return (-1);
    } sscanf (CharPtr+1, "%d\n", &nloop);

pAngioConturs->nloop = nloop;

/* ** read in contour data */
    total = 0;
    for (i = 0; i < nloop; i++)
    {
      SkipComment (fptr);
      if ((CharPtr = MatchChar (fptr, Colon)) == NULL)
        {
        fprintf (stderr, "%cERRROR in \"ReadAngioFilmContur\": ",
                BELL);
        fprintf (stderr, "Contour Number missing\n");
        return (-1);
        } sscanf (CharPtr+1, "%d\n", &ncontour);
        total += ncontour;

if (pAngioConturs->ContourPtr[i])
        free (pAngioConturs->ContourPtr[i]);

while (!(pAngioConturs->ContourPtr[i] =
            (CONTOUR *) malloc (sizeof(CONTOUR))))
```

```
    {
    fprintf (stderr,
        "ReadAngioFilmConturs Error: cannot malloc\n");
    } pAngioConturs->ContourPtr[i]->npt = ncontour;

if (pAngioConturs->ContourPtr[i]->ConturDatPtr)
    free (pAngioConturs->ContourPtr[i]->ConturDatPtr);

while (!(pAngioConturs->ContourPtr[i]->ConturDatPtr =
        (Point2d *) malloc (total * sizeof(Point2d))))
    {
    fprintf (stderr,
        "ReadAngioFilmConturs Error: cannot malloc\n");
    } pConturDat = pAngioConturs->ContourPtr[i]->ConturDatPtr;

xmin = ymin = 65536.0;
    xmax = ymax = 0.0;
    for (j = 0; j < ncontour; j++)
    {
    fscanf (fptr, "%c+%d+%d\n", &c, &x, &y);

pConturDat[j][0] = x * 0.01;
    pConturDat[j][1] = y * 0.01;

if (x > xmax) xmax = x;
    if (x < xmin) xmin = x;
    if (y > ymax) ymax = y;
    if (y < ymin) ymin = y;
    } pAngioConturs->ContourPtr[i]->xbounds[0] = xmin * 0.01;
    pAngioConturs->ContourPtr[i]->xbounds[1] = xmax * 0.01;
    pAngioConturs->ContourPtr[i]->ybounds[0] = ymin * 0.01;
    pAngioConturs->ContourPtr[i]->ybounds[1] = ymax * 0.01;

} pAngioConturs->ntotal = total;

if (DEBUG)
        fprintf (stderr, "Exit ReadAngioFilmContur()\n");

}
```

10. ReadAngioPair.c

```c
include <stdio.h>
include <string.h>
include "UserDefs.h"

define EXT_DEF_ONLY 1 include "Angio.h"

undef     INIT_DECLARATION

/****************************************************************************
 * ReadAngioPair()                                                          *
 *                                                                          *
 * Read in a pair (LAT and AP) angio digitized film from files and          *
 * fill in the digitized contour to generate a bitmap for the purpose       *
 * of backprojection.                                                       *
 *                                                                          *
 *     NOTE: THE CURRENT IMPLEMENTATION OF "Angio.c" (library) expects a pair*
 *           OF FILMS, WHEREAS IN BACKPROJECTION, THE FILMS DO NOT HAVE     *
 *           TO BE PAIRED. THE MISSING VIEW OF "A PAIR" IS FAKED BY A DUMMY *
 *           A LOOKUP TABLE IN "SkipView[]" in "BackProj.c"                 *
 *           WILL SKIP THE DUMMY FOR THE VIEW THAT'S WASN'T ACTUALLY TAKEN  *
 *                                                                          *
 ****************************************************************************/ define    LAT_FILM_BASE_NAME    "Angio_LAT"
define AP_FILM_BASE_NAME    "Angio_AP"
define DESIRED_FILM_WIDTH_IN_PIXEL    512
define F_MAX    65595
define F_MIN    -65595

ReadAngioPair ()
{
extern void FillPoly(CONTOUR_LIST*, float, float, float, char*, int);
extern int    DEBUG;

char    LAT_fname[256], AP_fname[256], suffix[10];
    FILE    *fptr_LAT, *fptr_AP;
    int npair = NAngioPair;
    int lat, ap;
    int i, j, npixel;
    float    xspan, yspan;
      float    xmin, xmax, ymin, ymax;
    float    Xspan = 0, Yspan = 0;
    float    filmsz, pixsz;
      Point2d x_bounds[20], y_bounds[20];    /* bounds of one film */
    FILM_IMG *pFilm;
    CONTOUR    *pContur;
```

```
if (DEBUG)
    fprintf (stderr, "In ReadAngioPair()\n");

for (i = 0; i < npair; i++)
{
   lat = 2*i;
   ap = lat+1;

sprintf (suffix, ".%d", i+1);

/* read in LAT film */
   strcpy (LAT_fname, LAT_FILM_BASE_NAME);
   strcat (LAT_fname, suffix);

if ((fptr_LAT = fopen(LAT_fname, "r")) == NULL)
   {
       fprintf (stderr, "ReadAngioPair Error: cannot open file %s\n",
           LAT_fname);
       return (0);
   }

ReadAngioFilmContur (fptr_LAT, &AngioView[lat]);

/* find the min max of x y for calculating Xspan Yspan */
   xmin = ymin = F_MAX;
   xmax = ymax = F_MIN;
   for (j = 0; j < AngioView[lat].Contours.nloop; j++)
      {
      pContur = AngioView[lat].Contours.ContourPtr[j];
      xmin = pContur->xbounds[0]<xmin ? pContur->xbounds[0] : xmin;
      xmax = pContur->xbounds[1]>xmax ? pContur->xbounds[1] : xmax;
      ymin = pContur->ybounds[0]<ymin ? pContur->ybounds[0] : ymin;
      ymax = pContur->ybounds[1]>ymax ? pContur->ybounds[1] : ymax;
      }
   x_bounds[lat][0] = xmin;
   x_bounds[lat][1] = xmax;
   y_bounds[lat][0] = ymin;
   y_bounds[lat][1] = ymax;
   xspan = xmax - xmin;
   yspan = ymax - ymin;
   Xspan = Xspan > xspan ? Xspan : xspan;
   Yspan = Yspan > yspan ? Yspan : yspan;

/* AP film */
   strcpy (AP_fname, AP_FILM_BASE_NAME);
   strcat (AP_fname, suffix);
   if ((fptr_AP = fopen(AP_fname, "r")) == NULL)
   {
       fprintf (stderr, "ReadAngioPair Error: cannot open file %s\n",
```

```
        AP_fname);
    return (0);
}

ReadAngioFilmContur (fptr_AP, &AngioView[ap]);

/* find the min max of x y for calculating Xspan Yspan */
xmin = ymin = F_MAX;
xmax = ymax = F_MIN;
for (j = 0; j < AngioView[ap].Contours.nloop; j++)
   {
   pContur = AngioView[ap].Contours.ContourPtr[j];
   xmin = pContur->xbounds[0]<xmin ? pContur->xbounds[0] : xmin;
   xmax = pContur->xbounds[1]>xmax ? pContur->xbounds[1] : xmax;
   ymin = pContur->ybounds[0]<ymin ? pContur->ybounds[0] : ymin;
   ymax = pContur->ybounds[1]>ymax ? pContur->ybounds[1] : ymax;
   }
x_bounds[ap][0] = xmin;
x_bounds[ap][1] = xmax;
y_bounds[ap][0] = ymin;
y_bounds[ap][1] = ymax;
xspan = xmax - xmin;
yspan = ymax - ymin;
Xspan = Xspan > xspan ? Xspan : xspan;
Yspan = Yspan > yspan ? Yspan : yspan;

/* store AP fiducial points in LAT AngioView and store
 * LAT fiducial points in AP AngioView */
for (j = 0; j < 8; j++)
{
   AngioView[lat].AngioData.AP_Marks[j][0] =
       AngioView[ap].AngioData.AP_Marks[j][0];
   AngioView[lat].AngioData.AP_Marks[j][1] =
       AngioView[ap].AngioData.AP_Marks[j][1];

AngioView[ap].AngioData.LAT_Marks[j][0] =
       AngioView[lat].AngioData.LAT_Marks[j][0];
   AngioView[ap].AngioData.LAT_Marks[j][1] =
       AngioView[lat].AngioData.LAT_Marks[j][1];
} fclose (fptr_LAT);
fclose (fptr_AP);
}

/* calculate pixel size */
filmsz = MAX (Xspan, Yspan);
filmsz += filmsz * 0.1;       /* add margin to film size */
```

```
npixel = DESIRED_FILM_WIDTH_IN_PIXEL;
pixsz = filmsz / npixel;

for (i = 0; i < 2*npair; i++)
{
   pFilm = &(AngioView[i].Film);

pFilm->nx = pFilm->ny = npixel;
   pFilm->Npixel = npixel*npixel;
   pFilm->PixelSz = pixsz;

pFilm->Xbounds[0] = x_bounds[i][0] -
      (filmsz - (x_bounds[i][1] - x_bounds[i][0]))/2.;
   pFilm->Xbounds[1] = x_bounds[i][1] +
      (filmsz - (x_bounds[i][1] - x_bounds[i][0]))/2.;
   pFilm->Ybounds[0] = y_bounds[i][0] -
      (filmsz - (y_bounds[i][1] - y_bounds[i][0]))/2.;
   pFilm->Ybounds[1] = y_bounds[i][1] +
      (filmsz - (y_bounds[i][1] - y_bounds[i][0]))/2.;

/*
fprintf (stderr, "Film No. %d:\n", i);
fprintf (stderr, "\tContour Bounds: X:%f-> %f, Y:%f-> %f\n",
         pContur->xbounds[0], pContur->xbounds[1],
         pContur->ybounds[0], pContur->ybounds[1]);
fprintf (stderr, "\tfilm size=%f, film bounds: X:%f-> %f, Y: %f-> %f\n",
         filmsz, pFilm->Xbounds[0], pFilm->Xbounds[1],
         pFilm->Ybounds[0], pFilm->Ybounds[1]);
*/

/* alloc space for FilmImg */
   while (!(pFilm->FilmImg =
   (char *) calloc (pFilm->Npixel, sizeof(char))))
   {
   fprintf (stderr, "ReadAngioPair Error: cannot alloc\n");
   }

FillPoly (&(AngioView[i].Contours), pFilm->Xbounds[0],
   pFilm->Ybounds[1], pixsz, pFilm->FilmImg, npixel);

{ /* output bitmap */
   char name[30];
   extern save_as_bitmap(char *, int, int, char*);

strcpy (name, "output_bitmap");
   sprintf (suffix, "%d", i);
   strcat (name, suffix);
```

```
            save_as_bitmap(pFilm->FilmImg, pFilm->nx, pFilm->ny, name);
        }
    } if (DEBUG)
        fprintf (stderr, "Exit ReadAngioPair()\n");
}
```

11. AngioViewDefs.h

```
/************************************************************************
 * AngioViewDefs.h                                                       *
 *                                                                       *
 * Structure definitions for ANGIO_VIEW                                  *
 *                                                                       *
 ************************************************************************/ include "VolumeDefs.h"
include "AngioDefs.h"
include "BackProjDefs.h"

define     AP   0
define LAT     1 typedef struct { int     FilmType;       /* AP or LAT */
    ANGIO_DATA    AngioData;    /* Angio fiducials */
    CONTOUR_LIST Contours;     /* Angio contours */
    FILM_IMG    Film;       /* Angio film for backprojection */

} ANGIO_VIEW;
```

12. BackProj.h

```
/****************************************************************************
*   Module Name: BackProj.h                                                 *
*   Module Type: Include file.                                              *
*   Included in: 1) Film.c                                                  *
*                2) xbeam.c                                                 *
*                                                                           *
*   Purpose:    Declarations and definitions for backprojection of regions  *
*               defined on films.                                           *
*                                                                           *
****************************************************************************/

/*   ** Include Constants and tydefs */ include "BackProjDefs.h"

/************* DECLARATIONS - In 3D_MODULE ONLY *********************/ ifdef INIT_DECLARATION

/*   ** Function Prototyping */ void    SetBackProjVol (OutLine *, BACKPROJ_VOL *);
void    BackProj (int, FILM_IMG **, BACKPROJ_VOL *);
void    RayBackTrace ();

/*   ** Variables */

BACKPROJ_VOL    BackProjVol;
BACKPROJ_VOL    *pBackProjVol = &BackProjVol;

char    *ProjBuffer;

float   *FilmSource, FilmTarget[3];

FILM_IMG *FilmImgLst[MXN_FILMS];

int     Nfilms;

endif

/************ EXTERNAL REFERNCING In EXT_DEF_ONLY *******************/ ifdef EXT_DEF_ONLY

/*   ** Function Prototyping */
```

```
extern void    SetBackProjVol (OutLine *, BACKPROJ_VOL *);
extern void    BackProj (int, FILM_IMG **, BACKPROJ_VOL *);
extern void    RayBackTrace ();

extern BACKPROJ_VOL    BackProjVol;

extern BACKPROJ_VOL    *pBackProjVol;

extern char    *ProjBuffer;

extern float   *FilmSource, FilmTarget[3];

extern FILM_IMG  *FilmImgLst[MXN_FILMS];

extern int     Nfilms;

endif
```

13. BackProjDefs.h

```
/***********************************************************************
* Module Name: BackProjDefs.h                                          *
* Module Type: Include file.                                           *
* Included in: 1) BackProj.h                                           *
*                                                                      *
* Purpose:     Constants and typedefs for Backprojection.              *
*                                                                      *
***********************************************************************/ define    MXN_FILMS 16 define    DELTA_ALPHA 0.0001 typedef struct { int    VolDim[3];
    int    VolLimits[3][2];
    float  VoxelSz[3];
    float  *coord[3];
    int    Nvoxel;
    char   *VolImg;

} BACKPROJ_VOL;

typedef struct {
```

```
    int  nx;          /* no of grid points in film image */
    int  ny;
    int  Npixel;      /* nx * ny */ char   *FilmImg;     /* Image data */
    float  PixelSz;      /* pixel size in film image */

Point2d  Xbounds;    /* xmin, xmax of film image */
    Point2d  Ybounds;    /* ymin, ymax of film image */

Point3d  SourcePos;       /* Source Pos of film */
    Point3d  FilmPlaneNorm;   /* Film plane normal */
    Point3d  x_unit_vec;      /* unit vector of film dx */
    Point3d  y_unit_vec;      /* unit vector of film dy */
    Point3d  TLC_Pos;         /* Position of Top Left Corner */

} FILM_IMG;
```

14. ImageVol.h

```
/*******************************************************************************
 * Module Name: ImageVol.h                                                      *
 * Module Type: Include file.                                                   *
 * Included in: 1) xbeam.c                                                      *
 *              2) TxtPlanLib.h                                                 *
 *                                                                              *
 * Purpose:     Declaration and definitions for CT/MR image volume global       *
 *              variables.                                                      *
 *                                                                              *
 *******************************************************************************/

/************* DECLARATIONS - In xbeam_3d ONLY *********************/ ifdef INIT_DECLARATION

/*  ** CT/MR Volume */ int  ImgMatrixSz, Nslice;
    int  OldSliceNo, SliceNo;
    float  *xcoord, *ycoord, *zcoord;

endif

/************ EXTERNAL REFERNCING In EXT_DEF_ONLY ******************/ ifdef EXT_DEF_ONLY

/*  ** CT/MR Volume Volume */
    extern  int    ImgMatrixSz, Nslice;
    extern  int    OldSliceNo, SliceNo;
```

```
extern   float    *xcoord, *ycoord, *zcoord;

endif
```

15. UdataContur.h

```
/**********************************************************************
* File Name:   UdataContur.h                                          *
* File Type:   C include file, AVS runtime include file.              *
* File Name:   UdataContur.h                                          *
* Included in: 1) Display2D.c                                         *
*              2) xbeam.c                                             *
*              3) brachy.c                                            *
*              4) TxtPlanLib.c                                        *
*              5) ViewXform.c                                         *
*                                                                     *
**********************************************************************/ define    MAX_UPCONTUR_SZ    500

/* CONSTANTS FOR CONTOURING */
define    SEARCH_RIGHT    1
define    SEARCH_LEFT     2 define    DISPLAY_MODE      0
define    NEW_IMG_FIELD     1
define    MARK_POINTS       2
define    MARK_LASER        3
define    CUT_CONTOUR       4
define    PASTE_CONTOUR     5
define    AUTO_CONTOUR      6
define    MANUAL_CONTOUR    7
define    METRIC            8
define    AUTO_LOCALIZE     9
define    MANUAL_LOCALIZE        10
define DRR_OP                    11
define DRR_MARK_BLOCK    12
define MARK_FIDUCIAL     13
define SAVE_FIDUCIAL     14
define FIDUCIAL_PT 14
define    DRR_DISPLAY  15 define    SAVE_TARGET   21
define    SAVE_ENTRY    22
define    TARGET_PT     21
define    ENTRY_PT 22
define    CLEAR_PTS     23
define    SAVE_LASER    24
define    SAVE_CONTOUR     25
define    SAVE_BRW 26
define SAVE_BLOCK         27

/* ** Flags for Auto Contour */
define    NEXT    1
define    REDO    2
define    DONE    3
define    QUIT   -1

/* Upstream Point Structure */ define BUTTON_DOWN      0x1
define BUTTON_UP        0x2
```

```
define BUTTON_MOVING   0x4
define VALID_ALPHA     0x8
define VALID_RED       0x10
define VALID_GREEN     0x20
define VALID_BLUE      0x40
define VALID_GREY      0x80 typedef struct _upstream_contur { int     OpMode;         /* 0 - display, 1 - auto contur, 2 - manual contur */
int     DataModify;     /* 1 - if contour data modified */ int     SliceMode;      /* 0 - transverse, 1 - sagittal, 2 - coronal */
int     SliceNo;        /* slice no */ int     nROI;           /* no of ROIs passed (1 contour for each) */
int     CurrentRoi;     /* index of current ROI - (1 to nROI,for Cut&Paste)  */
int     npt[20];        /* no of points in each contour of ROI */
float   x[20][500];     /* x coord of contour, 200 points maximum */
float   y[20][500];     /* y coord of contour, 200 points maximum */
int     color[20];   /* Alpha, Red, Green, Blue in 32 bit word */
int     CurRoiColor;    /* Current ROI's color in 32 bit word */ int     Ncath;          /* no of Catheters to be displayed on this slice */
int     CathColor[20];  /* color of catheter, <0 indicates Cath lies on slice */
float   Cath_x[30];     /* x coordinates of Catheter intercepts */
float   Cath_y[30];     /* y coordinates of Catheter intercepts */ int     Nfidu_2D;       /* No of fiducial points to be on this slice */
float   Fidu_2D_x[30];  /* x coord of fiducial points (world space) */
float   Fidu_2D_y[30];  /* y coord of fiducial points (world space) */
int     Fidu_2D_Color[30];  /* fiducial colors */
int     CurFiduColor;   /* Current fiducial color in 32 bit word */ int     Nfidu_DRR;
float   DRR_Fidu_x[30]; /* x coord of fiducial in DRR image @ isoctr plane */
float   DRR_Fidu_y[30]; /* y coord of fiducial in DRR image @ isoctr plane */
int     DRR_Fidu_Color[30];  /* fiducial colors */
float   DRR_RefPlaneDist;/* Nominal Source to Film dist for DRR display only
            (SAD is used for easy referencing) */
float   Actual_FFD;     /* Actual Source to Film dist requested by user */ int     BrwDisplay;     /* flag for BRW rod 2D display */
float   Brw_x[9];       /* x world coordinates of BRW CT fuducials */
float   Brw_y[9];       /* y world coordinates of BRW CT fuducials */ int     nDspLaser;              /* no of lasers to be displayed in 2D */
int     LaserColor[5];      /* Color of lasers to be displayed */
int     LaserSliceNo[5]; /* Slice no at which laser was defined */
float   LaserXaxis[5][4];       /* End pts of Laser X-axis */
float   LaserYaxis[5][4];       /* End pts of Laser Y-axis */

} upstream_contur;

typedef struct _OutLine { int     OpMode;         /* to signal when to save outline */
int     AutoSearch;     /* flag to signal AutoSearch On */
int     MatrixSize;     /* image matrix size */
int     nslice;         /* no of slices in image volume */
int     SliceMode;          /* 0 - transverse, 1 - sagittal, 2 - coronal */
int     SliceNo;            /* slice no */
float   xcoord[512];    /* x coordinates of image pixel */
float   ycoord[512];    /* y coordinates of image pixel */
float   zcoord[150];    /* z coordinates of slices - starts with 1.0 + */
float   PixelSize;      /* pixel size (cm) */
int     npt;
int     ZoomFactor;     /* zoom factor */
int     ImgXofset;      /* Image x offset for Top Left Corner */
int     ImgYofset;      /* Image y offset for Top Left Corner */
```

```
int    BrwFlag[150];       /* Flag to indicate if BRW is found on slice */
int    ix_win[3000];       /* contour window x coord */
int    iy_win[3000];       /* contour window y coord */
float  x_win[3000];        /* contour window x coord */
float  y_win[3000];        /* contour window y coord */
float  Fiducial[3];        /* mark fiducial point */
int    Target[3];   /* x, y, SliceNo of TARGET PT */
int    Entry[3];   /* x, y, SliceNo of ENTRY PT */
float  LaserXaxis[2][2];   /* End pts of Laser X-axis */
float  LaserYaxis[2][2];   /* End pts of Laser Y-axis */
float  LaserCtr[2];        /* Laser Center */
float  GantryTilt;         /* Tilt for Gantry Axis */

} OutLine;
```

16. UserDefs.h

```
/****************************************************************************
* Module Name:UserDefs.h                                                     *
* Module Type: Include file for user defined type defintions                 *
*                                                                            *
* Purpose:  User defined constants and data types.                           *
*                                                                            *
*                                                                            *
****************************************************************************/ define    PI      3.1415927
define    HALF_PI 1.5707963

/* ** User Defined Constants */
define    NEAR_ZERO 0.0001
define    INFINITY   1.0e30
define ON    1
define OFF   0 define TEMP       0
define PERM       1 define    BELL 7 define    TRUE 1
define FALSE    0 define    NOT_FOUND   0
define    FOUND    1
define    DATA_END  -1 define    DO_NOT_RESTORE 0
define    RESTORE       1
define SAVE      2
define UNSAVE   -1 define RESTORE_ALWAYS         1
define RESTORE_IF_MODIFIED    0
```

```
define     INVIS    0
define     VISIBLE  1
define DELETE   -1

/*  **  For module identification */
define     XBEAM    0
define     BRACHY   1

/*  **  For brachy_3d and RayIntercept() */
define     UNI_SEARCH    1
define     BIDIR_SEARCH  2
define     SEARCH_ALL    4

/*     **  User Defined Macros */ define DTOR(ang)    (0.017453 * ang)
define RTOD(ang)    (57.29578 * ang)
define     MAX(A,B)    ((A > B) ? A : B)
define     MIN(A,B)    ((A < B) ? A : B)
define     SIGN(x)     ((x > 0) ? 1 : -1)

define     SABS(x)    ((x > 0) ? floor((double) (x+0.5)) : ceil((double) (x-0.5)))

define     D_CHAR     0
define     D_SHORT    1
define     D_INTEGER  2
define     D_LONG     3

/*  **  User Defined Data Structures */

/*
union  DATA_WORD { char    char_dat;
    short   short_dat;
    int integer_dat;
    long    long_dat;
};
*/ typedef    int     Ipoint2d[2];
typedef    float   Point2d[2];
typedef    float   Point3d[3];
typedef    float   Point4d[4];
typedef    float   Vector3d[3];
typedef    float   Angle3d[3];        /* angles (deg) to 3 principal axes */
typedef float      RGBcolor[3];       /* RGB color */
```

```
typedef    float    Matrix3x3[3][3];   /* 3x3 matrix */
typedef    float    Matrix4x4[4][4];   /* 4x4 matrix */
```

17. VolumeDefs.h

```
/****************************************************************************
*   Module Name:   VolumeDefs.h                                             *
*   Module Type:   Include file.                                            *
*   Included in:   1) TxtPlanLib.c                                          *
*                  2) ViewXform.c                                           *
*                  3) xbeam.c                                               *
*                                                                           *
*   Purpose:   Constants and type defintions for Volume data structures.    *
*   REMARKS:   !!! ALL length, size and distance measurements are in CM. !!!*
*              !!! ALL angles are in degrees. !!!                           *
*              !!! USER MUST ALSO include "UserDefs.h"                      *
*                                                                           *
****************************************************************************/ include "VolumeSzDefs.h"

define    GENERAL    0
define    ANATOMY    1
define    ISODOSE    2 typedef struct {
          /* N.B. Contours in x,y plane ONLY */
    float    z;      /* z coords of contours */
    int  npt;        /* no of points in each loop */
    Point2d  *ConturDatPtr;   /* contour data pointer */
    Point2d  xbounds;   /* xmin, xmax for contour */
    Point2d  ybounds;   /* ymin, ymax for contour */

} CONTOUR;

typedef struct { int   nloop;           /* no of loops in contour */
    int   ntotal;          /* total no of points in all contours */
    int   SliceNo[MxnLoop];   /* slice no */
    CONTOUR   *ContourPtr[MxnLoop];   /* array of contour pointers */

} CONTOUR_LIST;

/*  **  Structure for surface */
```

```
typedef     struct { int nvert;      /* no of vertices defining surface */
    int ntile;      /* no of surface tiles */
    int nedge;      /* no of edges in surface patch */
    Point3d *Vert;  /* vertice data */
    int *LinkList;  /* connectivity list */

} SURFACE;

/* ** Structure for binary volume */ typedef     struct { int InUse;          /* to flag if this volume is in use */
    char    VolName[30];    /* volume name */
    float   PixelSize;  /* pixel size in cm - for x, y and interp z */
    float   VoxelSize;      /* voxel size in c.c. - always cubic */
    int ixmin, ixmax;   /* x indices of binary vol wrt full cubic vol */
    int iymin, iymax;   /* (e.g. a full vol may be 256x256x256) */
    int izmin, izmax;
    int VolumeSize;     /* volume size in no of voxels */

} BINARY_VOLUME;

/* ** Structure for composite binary volume */ typedef     struct { int InUse;          /* to flag if volume is in use */
    float   VoxelSize;      /* voxel size */
    int VolEntry[2];    /* indices of composite volumes */
    int VolName[2];     /* names of composite volumes */
    int VolumeSize[3];      /* volumes: 1 in 1; 2 in 2; 1 in 2; (2 in 1) */

} COMBINE_VOLUME;

/*   ** Structure for ROI List */ typedef struct { int InUse;          /* to flag if this ROI is in use */
      int    RoiNo;              /* ROI id */
      int    RoiType;            /* ROI type */
    RGBcolor color;     /* color of ROI */
```

```
    int    Icolor;              /* 32 bit integer color of ROI */
    char   RoiObjName[SL_ROI];   /* name of ROI */
    char   ConturObjName[SL_ROI]; /* ROI contour name */
    char   SurfObjName[SL_ROI];  /* ROI surface name */
    char   ConturName[SL_ROI];   /* ROI contour name */
    int    SmoothLineSet;        /* 1 - if Smooth line mode is set */
    int    TileOption;           /* 1 - tiling needed */
    int    TileDone;             /* 1 - if tiling done */
    int    ModifyFlag;           /* 1 if ROI been modified */
    int Display2D;   /* 1 if contour to be displayed in 2D*/
    int Display3D;   /* 1 if ROI to be displayed in 3D*/
    int ConturMode;  /* 1 if contour to be displayed in 3D*/
    int SurfMode;    /* 1 if surface to be displayed in 3D*/
       CONTOUR_LIST ContourList;    /* pointer to contour list struct */
       BINARY_VOLUME Volume;        /* pointer to volume struct */
       SURFACE Surface;             /* pointer to surface struct */
    Point3d MinExt;      /* Minimum extents for x, y, z */
    Point3d MaxExt;      /* Maximum extents for x, y, z */

} ROI;
```

18. VolumeSzDefs.h

```
/******************************************************************************
 * Module Name:  VolumeSzDefs.h                                                *
 * Module Type:  Include file.                                                 *
 * Included in:  1) Roi.h.                                                     *
 *               2) VolumeDefs.h                                               *
 *                                                                             *
 * Purpose:  Constants for maximum dimensions for Volume Data Structures.      *
 *                                                                             *
 ******************************************************************************/ define    MAX_MATRIX_SZ    512 define MxnLoop      150    /* maximum no of loops per contour struct */
define MxnCpt       600    /* maximum no of points per contour */
define MxnROI       20     /* maximum no of ROIs */ define NroiColor    10     /* no of default ROI colors */ define SL_ROI       30     /* string length of ROI name */
define SL_CONTOUR   30     /* string length of contour name */
define SL_VOLUME    30     /* string length of volume name */
define SL_FILE      80     /* string length of file name */
```

What is claimed is:

1. A method for reconstructing a three dimensional image of an object from a plurality of radiographic images, comprising the steps of:

backprojecting each radiographic image through a reconstruction volume to produce a plurality of corresponding backprojected images; and determining an intersection of said plurality of backprojected images in said reconstruction volume, said intersection defining a three dimensional, reconstructed image of the object.

2. The method of claim 1, wherein, for each radiographic image, said backprojecting step comprises:

determining a position, relative to said reconstruction volume, of a point source used to produce said radiographic image;

determining a position, relative to said reconstruction volume, of an image plane containing said radiographic image;

digitizing said radiographic image to produce a digitized image, said digitized image being composed of a plurality of pixels; and backprojecting each pixel of said digitized image through said reconstruction volume to said point source to form raylines.

3. The method of claim 2, wherein said step of determining said intersection comprises:

defining a reconstruction volume in three dimensional space, said reconstruction volume having a plurality of voxels; and determining, for each backprojected image, the intersection of said raylines with said plurality of voxels to provide a plurality of intersected voxels, wherein each intersected voxel defines a portion of the three dimensional, reconstructed image of the object.

4. The method of claim 3, wherein said step of determining the intersection of said raylines with said plurality of voxels comprises:

(a) determining, for one of said plurality of backprojected images, the intersection of said raylines with said plurality of voxels to provide a first set of intersected voxels;

(b) determining, for another of said backprojected images, the intersection of said raylines with said plurality of voxels to provide a second set of intersected voxels;

(c) superimposing said first set of intersected voxels and said second set of intersected voxels to form a subset of shared intersected voxels;

(d) repeating steps (b) and (c) for each of the remaining backprojected images from said plurality of backprojected images, to produce a final subset of shared intersected voxels, wherein said final subset of shared intersected voxels defines the three dimensional, reconstructed image of the object.

5. The method of 1, wherein said backprojecting step comprises:

backprojecting at least six radiographic images through a reconstruction volume to produce at least six corresponding backprojected images.

6. The method of claim 3, further comprising the step of:

displaying the three dimensional, reconstructed image of the object, wherein each intersected voxel is displayed using a first intensity and each voxel that is not intersected by a rayline from each of said plurality of backprojected images is displayed using a second intensity.

7. The method of claim 3, further comprising the step of:

displaying the three dimensional, reconstructed image of the object, wherein each intersected voxel is displayed using a first color and each voxel that is not intersected by a rayline from each of said plurality of backprojected images is displayed using a second color.

8. A method for three dimensional imaging of an object, comprising the steps of:

performing radiography of the object from a point source to produce a radiographic image on an image plane;

backprojecting said radiographic image through a reconstruction volume to said point source to produce a backprojected image;

repeating steps (a) and (b) for a plurality of imaging angles to produce a plurality of backprojected images; and determining an intersection of said plurality of backprojected images in said reconstruction volume, said intersection defining a three dimensional, reconstructed image of the object.

9. The method of claim 8, wherein, for each radiographic image, said backprojecting step comprises:

determining a position, relative to said reconstruction volume, of said point source used to produce said radiographic image;

determining a position, relative to said reconstruction volume, of an image plane containing said radiographic image;

digitizing said radiographic image to produce a digitized image, said digitized image being composed of a plurality of pixels; and backprojecting each pixel of said digitized image through said reconstruction volume to said point source to form raylines.

10. The method of claim 9, wherein said step of determining said intersection comprises:

defining a reconstruction volume in three dimensional space, said reconstruction volume having a plurality of voxels; and determining, for each backprojected image, the intersection of said raylines with said plurality of voxels to provide a plurality of intersected voxels, wherein each voxel that is intersected by a rayline from each of said plurality of backprojected images defines a portion of the three dimensional, reconstructed image of the object.

11. The method of claim 8, wherein said backprojecting step comprises:

backprojecting at least six radiographic images through a reconstruction volume to produce at least six corresponding backprojected images.

12. An apparatus for reconstructing a three dimensional image of an object from a plurality of radiographic images, comprising:

means for backprojecting each radiographic image through a reconstruction volume to produce a plurality of corresponding backprojected images; and means for determining an intersection of said plurality of backprojected images in said reconstruction volume, said intersection defining a three dimensional, reconstructed image of the object.

13. The apparatus of claim 12, wherein said backprojecting means comprises:

means for determining a position, relative to said reconstruction volume, of a point source used to produce said radiographic image;

means for determining a position, relative to said reconstruction volume, of an image plane containing said radiographic image;

means for digitizing said radiographic image to produce a digitized image, said digitized image being composed of a plurality of pixels; and means for backprojecting each pixel of said digitized image through said reconstruction volume to said point source to form raylines.

14. The apparatus of claim 12, wherein said means for determining an intersection comprises:

means for defining a reconstruction volume in three dimensional space, said reconstruction volume having a plurality of voxels; and means for determining, for each backprojected image, the intersection of said raylines with said plurality of voxels to provide a plurality of intersected voxels, wherein each intersected voxel defines a portion of the three dimensional, reconstructed image of the object.

15. The apparatus of claim 14, further comprising:

means for displaying the three, dimensional, reconstructed image of the object, wherein each intersected voxel is displayed using a first intensity and each voxel that is not intersected by a rayline from each of said plurality of backprojected images is displayed using a second intensity.

16. The apparatus of claim 14, further comprising:

means for displaying the three, dimensional, reconstructed image of the object, wherein each intersected voxel is displayed using a first color and each voxel that is not intersected by a rayline from each of said plurality of backprojected images is displayed using a second color.

* * * * *